US012352334B2

(12) United States Patent
Squires et al.

(10) Patent No.: US 12,352,334 B2
(45) Date of Patent: Jul. 8, 2025

(54) TENSIONING DEVICE AND DRIVEN MEMBER THEREOF

(71) Applicant: Revolok USA, LLC, Tampa, FL (US)

(72) Inventors: Timothy P. Squires, Williamsburg, MI (US); Ronald J. Hanna, East Jordan, MI (US); Kenneth J. Lamb, Petoskey, MI (US); Joseph Krumme Bullard, West Chester, OH (US)

(73) Assignee: REVOLOK USA, LLC, Tampa, FL (US)

( * ) Notice: Subject to any disclaimer, the term of this patent is extended or adjusted under 35 U.S.C. 154(b) by 0 days.

(21) Appl. No.: 18/228,008

(22) Filed: Jul. 31, 2023

(65) Prior Publication Data

US 2023/0375072 A1    Nov. 23, 2023

Related U.S. Application Data

(63) Continuation of application No. 17/699,361, filed on Mar. 21, 2022, now Pat. No. 11,713,797, which is a
(Continued)

(51) Int. Cl.
  *F16G 11/12* (2006.01)
  *G01L 5/04* (2006.01)
  *B60P 7/08* (2006.01)

(52) U.S. Cl.
  CPC ............ *F16G 11/12* (2013.01); *G01L 5/047* (2013.01); *B60P 7/0823* (2013.01)

(58) Field of Classification Search
  CPC ......... B60P 7/0823; B60P 3/079; B60P 7/083; F16G 11/12; B25B 25/00; Y10T 24/2175
  See application file for complete search history.

(56) References Cited

U.S. PATENT DOCUMENTS 4,131,264 A * 12/1978 Patterson, III .......... F16G 11/12
    24/68 CT
4,157,171 A * 6/1979 Hasselas ................ F16G 11/12
    254/231
(Continued)

FOREIGN PATENT DOCUMENTS

CN   101590824 A   12/2009
CN   203895859 U   10/2014
(Continued)

OTHER PUBLICATIONS

Larangeira, F; Partial Supplementary European Search Report issued in EP Patent Application No. 20885171.7; Nov. 7, 2023; 12 pages.
(Continued)

*Primary Examiner* — Jack W Lavinder
(74) *Attorney, Agent, or Firm* — Frost Brown Todd LLP

(57) ABSTRACT

A tensioning device includes a housing, a drive member, a sleeve and a driven member. The housing includes a first attachment feature. The driven member includes a second attachment feature. The sleeve is rotatably coupled with the housing. The drive member is rotatably coupled with the housing and is operably coupled with the sleeve such that rotation of the drive member facilitates rotation of the sleeve. The driven member is movable with respect to the guide member between a retracted position and an extended position.

18 Claims, 50 Drawing Sheets

Related U.S. Application Data continuation of application No. 17/090,607, filed on Nov. 5, 2020, now Pat. No. 11,313,436.

(60) Provisional application No. 62/930,710, filed on Nov. 5, 2019.

(56) References Cited

U.S. PATENT DOCUMENTS

| | | | | |
|---|---|---|---|---|
| 4,567,627 | A * | 2/1986 | Patterson, III | B63B 25/28 |
| | | | | 254/231 |
| 9,108,309 | B2 * | 8/2015 | Squires | A44B 11/125 |
| 9,835,236 | B2 * | 12/2017 | Cyrén | F16H 25/20 |
| 10,920,852 | B2 * | 2/2021 | Squires | F16G 11/12 |
| 11,313,436 | B2 | 4/2022 | Squires et al. | |
| 11,713,797 | B2 | 8/2023 | Squires et al. | |
| 2013/0111715 | A1 * | 5/2013 | Squires | B25B 25/00 |
| | | | | 24/68 CD |
| 2013/0283980 | A1 | 10/2013 | Petrak et al. | |

FOREIGN PATENT DOCUMENTS

| | | |
|---|---|---|
| GB | 738421 A | 10/1955 |
| KR | 20110083861 A | 7/2011 |
| WO | 2018126104 A1 | 7/2018 |
| WO | 2018178514 A1 | 10/2018 |

OTHER PUBLICATIONS

Li Yuankang; First Office Action issued in Chinese Patent Application No. 202080092058.7; Sep. 14, 2023; 22 pages including English translation.

Larangeira, F.; Extended European Search Report issued in EP Patent Application No. 20885171.7; Jan. 29, 2024; 10 pages.

Fitz-Hardy, Christopher D.; Office Action; CA Pat. App. No. 3,157,478; Apr. 11, 2024; 5 pages.

* cited by examiner

TENSIONING DEVICE AND DRIVEN MEMBER THEREOF

REFERENCE TO RELATED APPLICATION

This application is a continuation of U.S. patent application Ser. No. 17/699,361, filed Mar. 21, 2022, entitled Tensioning Device and Driven Member Thereof which is a divisional of U.S. patent application Ser. No. 17/090,607, filed Nov. 5, 2020, entitled Tensioning Device and Driven Member Thereof which claims priority of U.S. provisional patent application Ser. No. 62/930,710, entitled Tensioning Device and Driven Member Thereof, filed Nov. 5, 2019, and hereby incorporates these patent applications by reference herein in their respective entireties.

TECHNICAL FIELD

The apparatus and methods described below generally relate to a tensioning device that can be coupled with opposing ends of a lashing member. The tensioning device is operable to adjust the tension on the lashing member.

BACKGROUND

Conventional tensioning devices, such as come-a-longs and turn buckles, are oftentimes too bulky and cumbersome for use in confined areas, such as when lashing a tree stand or securing a load to a vehicle. In addition, tension imparted by the tensioning device is difficult to control and can oftentimes result in significant overtightening or under tightening.

BRIEF DESCRIPTION OF THE DRAWINGS

Various embodiments will become better understood with regard to the following description, appended claims and accompanying drawings wherein:

FIG. 22;

DETAILED DESCRIPTION

Figure 1:
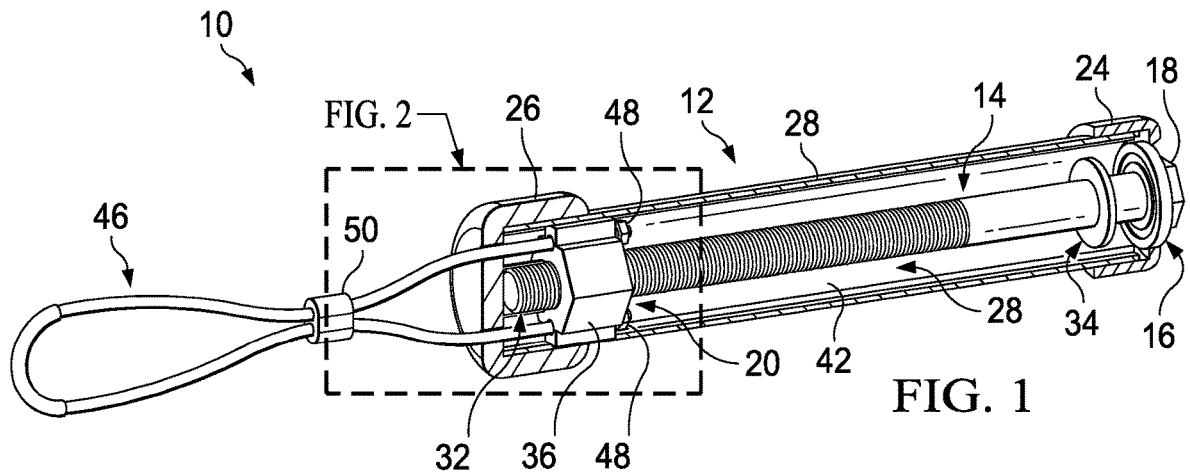
FIG. 1 is an isometric cross sectional view depicting a tensioning device, in accordance with one embodiment.
Figure 2:
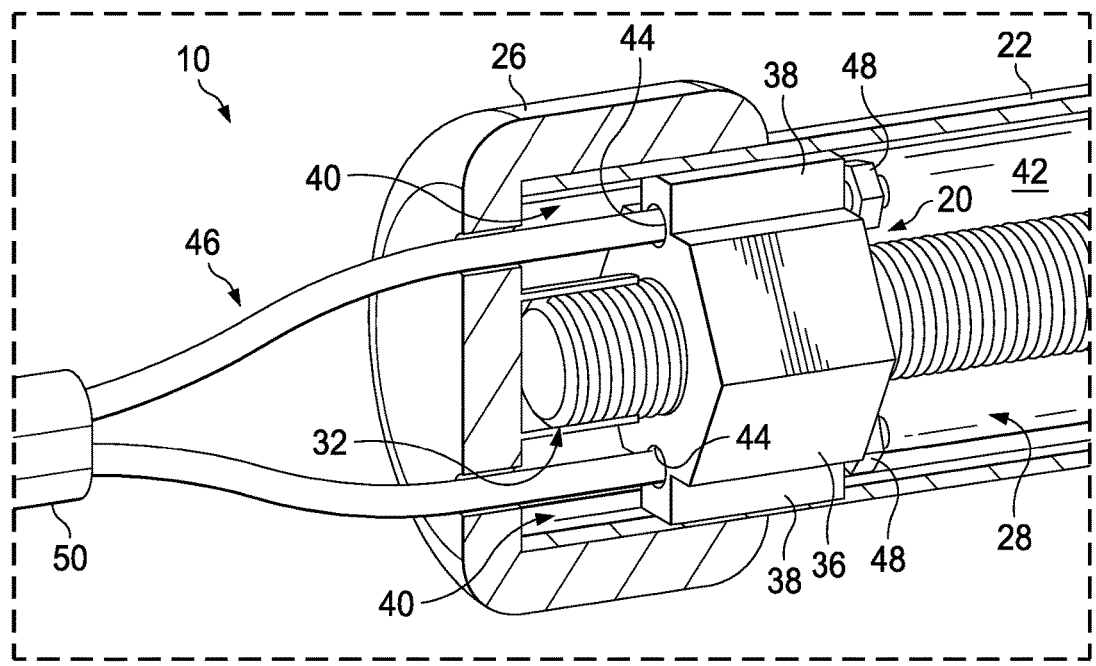
FIG. 2 is an enlarged isometric view of the encircled portion of the tensioning device of FIG. 1.

Embodiments are hereinafter described in detail in connection with the views and examples of FIGS. 1-71, wherein like numbers indicate the same or corresponding elements throughout the views. FIGS. 1 and 2 illustrate a tensioning device 10 that can be attached to opposing ends of a lashing member (e.g., a strap, a rope, a cable, a chain) (not shown) to selectively impart tension thereto as will be described in further detail below. The tensioning device 10 can comprise a housing assembly 12, a drive stem 14, a clutch assembly 16, a drive member 18, and a driven member 20. The housing assembly 12 can comprise a housing 22, a proximal cap 24, and a distal cap 26. The proximal cap 24 and the distal cap 26 can secured to opposing ends of the housing 22 via threaded engagement or any of a variety of suitable alternative securement methods (e.g., welding, adhesive, press-fit). The proximal cap 24 and the distal cap 26 can cooperate to define an interior 28. The housing 22 of the housing assembly 12 is shown to be substantially tubular shaped.

The drive stem 14 can be rotatably coupled to the housing assembly 12 and can comprise a threaded end 32 and a drive end 34. The drive stem 14 can be disposed in the interior 28 and can extend between the proximal cap 24 and the distal cap 26 such that the drive end 34 is located at the proximal cap 24 and the threaded end 32 is located at the distal cap 26. The clutch assembly 16 can be located at the proximal cap 24 and operably coupled with the drive end 34 of the drive stem 14. The drive member 18 can be operably coupled with the clutch assembly 16 and can extend from the proximal cap 24 and can be at least partially external to the interior 28 such that the drive member 18 is accessible along an exterior of the drive stem 14.

The drive member 18 can be rotated which can facilitate rotation of the drive stem 14 via the clutch assembly 16. The clutch assembly 16 can be configured to selectively decouple the drive member 18 from the drive stem 14 when a particular torque is imparted to the drive member 18. The drive member 18 can be shaped to enable mechanical mating with a tool. In one embodiment, as illustrated in FIGS. 1 and 2, the drive member 18 can be hexagonal shaped to allow for selective interaction and with a wrench or socket that can be used to rotate the drive member 18. However, it is to be appreciated that the drive member 18 can be configured to mate with any of a variety of suitable alternative tools, such as an Allen bit, a Torx bit, or pliers, for example.

The driven member 20 can be disposed in the interior 28 and can be slidably coupled with the housing 22 of the housing assembly 12. As illustrated in FIG. 2, the driven member 20 can comprise a central body 36 and a pair of tab members 38 extending from the central body 36. The housing 22 of the housing assembly 12 can define a pair of elongated slots 40 that extend between the proximal cap 24 (FIG. 1) and the distal cap 26. Each of the tab members 38 can extend into one of the elongated slots 40 such that the tab members 38 are nested in the elongated slots 40. The driven member 20 can be configured to slide along the interior 28 of the housing 22 between the proximal cap 24 and the distal cap 26. The tab members 38 can interact with the elongated slots 40 to prevent rotation of the driven member 20 during such sliding. The central body 36 is shown to be substantially hexagonal shaped. An interior surface 42 of the housing 22 can be similarly shaped (e.g., hexagonal shaped) to allow for sliding of the driven member 20 within the interior 28 while also contributing to preventing rotation of the driven member 20.

Still referring to FIG. 2, the driven member 20 can define a pair of passages 44. A cable member 46 can be routed through the passages 44 and secured to the driven member 20 with nuts 48. The cable member 46 can be routed through the distal cap 26 such that it extends from the distal cap 26 and is accessible from the exterior of the tensioning device 10. The cable member 46 is shown to be provided in a looped arrangement with a clamp member 50 that gathers the cable member 46 together. The clamp member 50 can be slidable along the cable member 46 to enable the overall size of the looped arrangement (e.g., an attachment feature) to be varied. It is to be appreciated that although a cable member is described, any of a variety of suitable alternative attachment features can be provided, such as, for example, a rope, a hook, a strap, or a chain.

The threaded end 32 of the drive stem 14 can extend through the central body 36 of the driven member 20 and can be threadably engaged therewith. Rotation of the drive stem 14 (e.g., via rotation of the drive member 18) can cause the driven member 20 to either slide towards the proximal cap 24 or the distal cap 26 depending on the rotational direction of the drive stem 14. Sliding of the driven member 20 towards the proximal cap 24 can cause the cable member 46 to be retracted into the interior 28 thereby decreasing the length of the exterior portion of the cable member 46 that extends from the distal cap 26. Conversely, sliding of the driven member 20 towards the distal cap 26 can cause the cable member 46 to be extended from the interior 28 thereby increasing the length of the exterior portion of the cable member 46 that extends from the distal cap 26. In one embodiment, the threaded end 32 of the drive stem 14 can be right-hand threaded such that rotation of the drive stem 14 in a clockwise direction (when viewing the tensioning device 10 at the proximal cap 24) facilitates sliding the driven member 20 towards the proximal cap 24, and rotation of the drive stem 14 in a counter-clockwise direction facilitates sliding of the driven member 20 towards the distal cap 26.

Use of the tensioning device 10 will now be discussed. The cable member 46 can be attached to one end of a lashing member (not shown) and a hook (e.g., 2129 in FIGS. 41-43) disposed on the housing assembly 12 can be attached to the other end of the lashing member such that the tensioning device 10 is provided in line with the lashing member (as opposed to being a coil-over tensioning member like a ratchet strap). The drive member 18 can then be rotated which can retract the cable member 46 into the interior 28 to pull the ends of the lashing member together thereby increasing the tension on the lashing member. Once the tension on the lashing member reaches a particular tension, the clutch assembly 16 can decouple the drive member 18 from the drive stem 14 (e.g., clutch out) to prevent further tension from being applied to the lashing member. It is to be appreciated that the maximum tension permitted by the clutch assembly 16 can be a function of the design of the clutch assembly 16 and can be either preset or variable (e.g., by a user). It is also to be appreciated that the tensioning device 10 can be considered to apply tension to a lashing strap linearly (e.g., along the same axis of rotation of the drive member 18) as opposed to transversely (e.g., a ratchet strap that applies tension in a direction that is perpendicular to an axis of rotation of a drive member). One example of such a linear tensioning device is described in U.S. Pat. Nos. 9,073,187 and 9,108,309, which are hereby incorporated by reference herein in their respective entireties.

It is to be appreciated that the tensioning device 10 can be equipped with any of a variety of sensors or monitoring devices that facilitate monitoring of an operational parameter of the tensioning device, such as, for example, a strain gage, an accelerometer, a GPS device, or an encoder. These sensors or monitoring devices can communicate with a remote computing device (e.g., a smartphone, a personal computer, a laptop, or a tablet) wirelessly (e.g., via Bluetooth) or through a wired connection, as provided as part of an internet of things (IoT) system.

Figure 3:
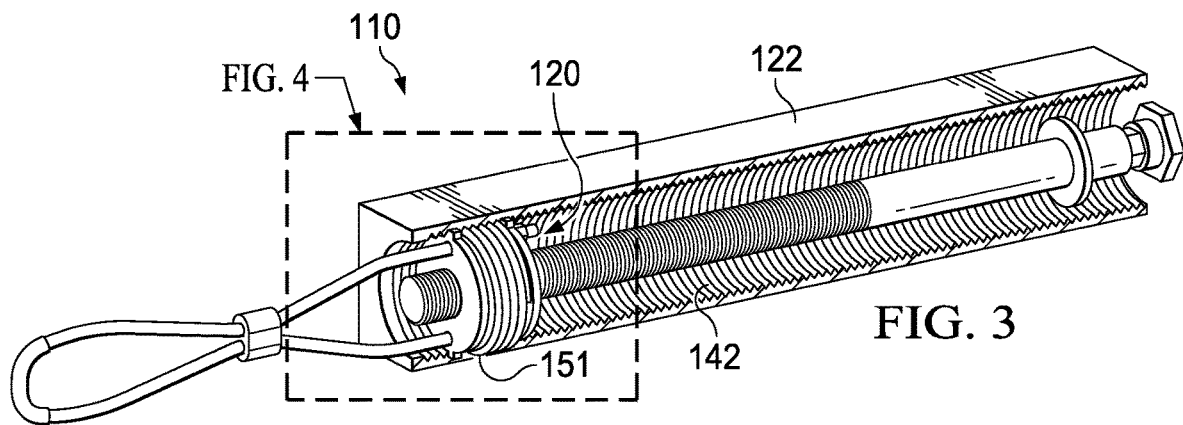
FIG. 3 is an isometric cross sectional view depicting a tensioning device, in accordance with another embodiment.
Figure 4:
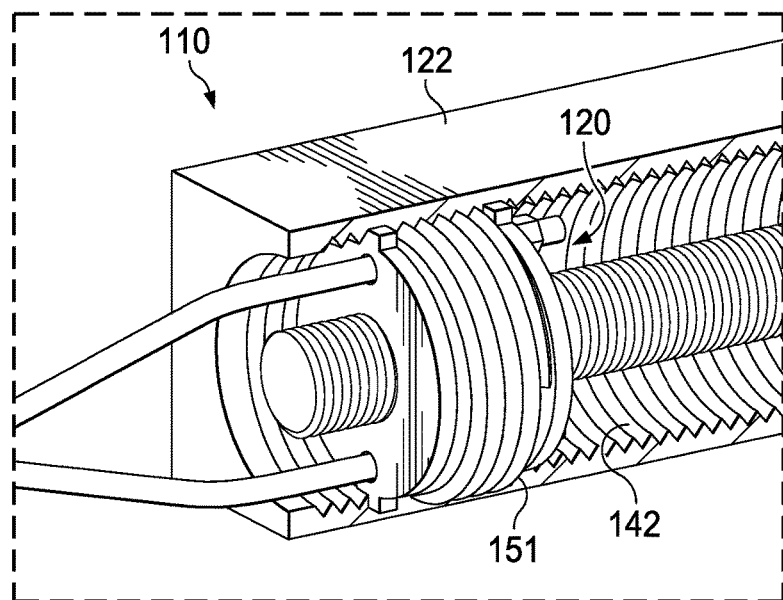
FIG. 4 is an enlarged isometric view of the encircled portion of the tensioning device of FIG. 3.
Figure 5:
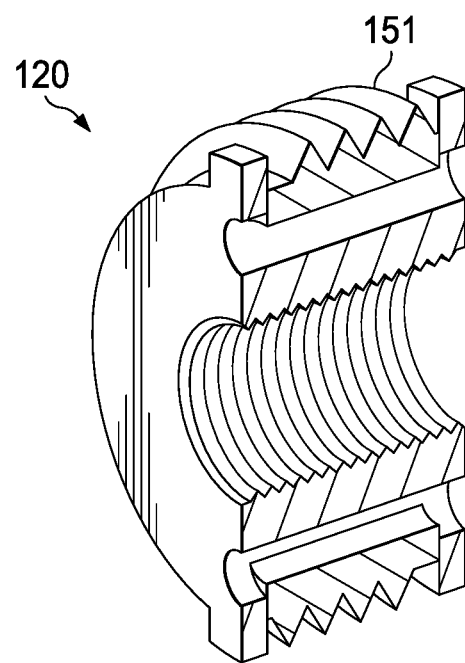
FIG. 5 is an isometric cross sectional view depicting a drive member of the tensioning device of FIG. 3.
Figure 6:
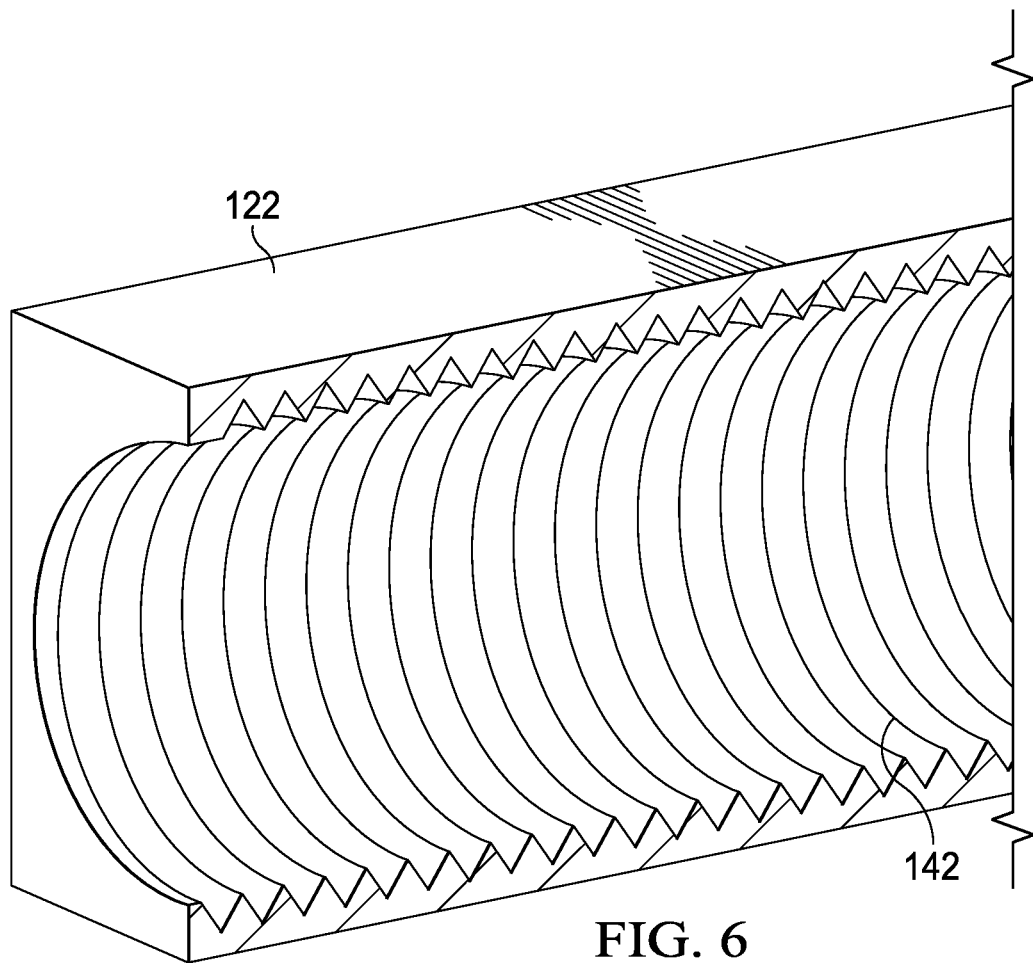
FIG. 6 is an isometric cross sectional view depicting a housing of a housing assembly of the tensioning device of FIG. 3.

FIGS. 3-6 illustrate an alternative embodiment of a tensioning device 110 that can be similar to, or the same in many respects as, the tensioning device 10 illustrated in FIGS. 1 and 2. For example, the tensioning device 110 can include a housing 122 and a driven member 120 disposed in an interior 128 at least partially defined by the housing 122. However, the housing 122 can include a threaded interior surface 142 that can mate with a threaded outer surface 151 of the driven member 120. In one embodiment, the driven member 120 can be a two piece arrangement, one piece of which is illustrated in FIG. 5. As illustrated in FIGS. 3, 4, and 6, the housing 122 can have a substantially square cross-sectional shape.

Figure 7:
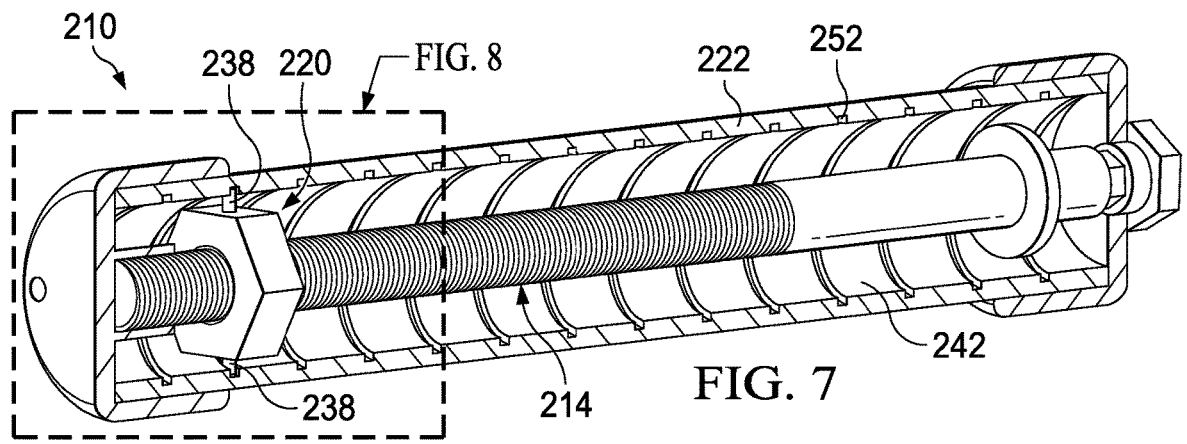
FIG. 7 is an isometric cross sectional view depicting a tensioning device, in accordance with yet another embodiment.
Figure 8:
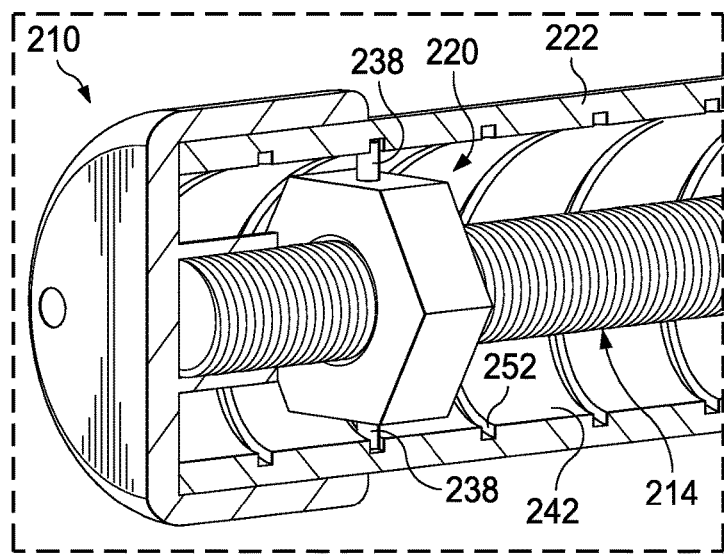
FIG. 8 is an enlarged isometric view of the encircled portion of the tensioning device of FIG. 7.
Figure 9:
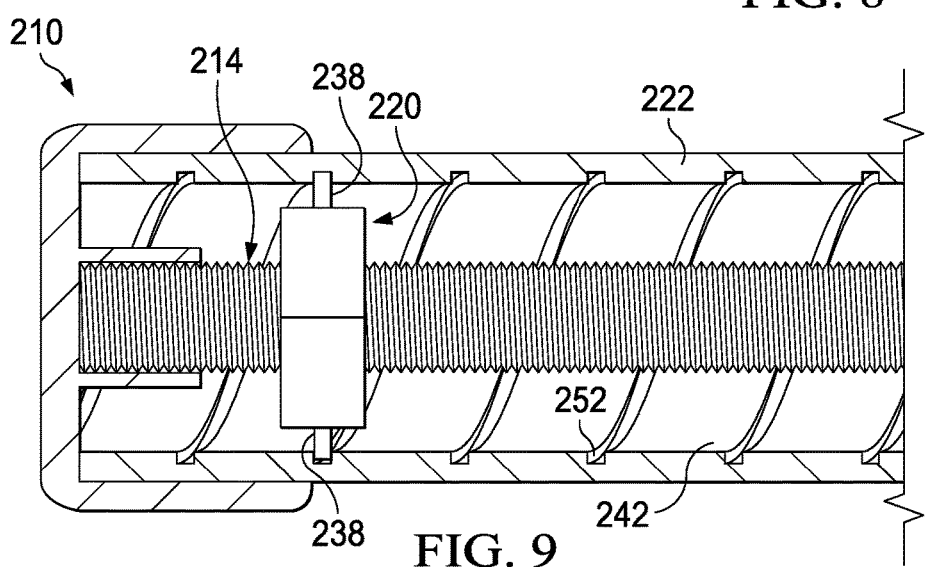
FIG. 9 is an enlarged sectional plan view depicting the tensioning device of FIG. 7.

FIGS. 7-9 illustrate an alternative embodiment of a tensioning device 210 that can be similar to, or the same in many respects as, the tensioning device 10 illustrated in FIGS. 1 and 2. For example, the tensioning device 210 can include a housing 222 and a driven member 220 disposed in an interior 228 at least partially defined by the housing 222. However, the housing 222 can include an interior surface 242 that defines a helical groove 252 that can mate with tab members 238 of the driven member 220. The driven member 220 can be configured for selective rotation with respect to the housing 222. When the driven member 220 is rotated, the interaction between the tab members 238 and the helical groove 252 can cause the driven member 220 to move laterally (e.g., between a proximal cap and a distal cap) within the interior 228. The helical groove 252 can have a greater pitch than the pitch of the threads on a drive stem 214.

The driven member 220 can be rotated in response to rotation of the drive stem 214 in one of a gradual motion mode and a rapid motion mode. When in the gradual motion mode, the drive stem 214 can be rotated with respect to the driven member 220 which can cause the driven member 220 to rotate with respect to the housing 222 (at a slower rotational velocity than the drive stem 214). When in the rapid motion mode, the drive stem 214 and the driven member 220 can rotate together which can cause the driven member 220 to move laterally within the interior 228 more rapidly (for a particular rotational velocity of the drive stem 214) than when the driven member 220 is rotated in the gradual motion mode. In one embodiment, operation of the drive stem 214 and the driven member 220 in either of the gradual motion mode or the rapid motion mode can depend upon the rotational velocity of the drive stem 214. For example, when the drive stem 214 is rotated slowly, the drive stem 214 and the driven member 220 can operate in the gradual motion mode. However, when the drive stem 214 is rotated more rapidly, the drive stem 214 and the driven member 220 can operate in the rapid motion mode.

Figure 10:
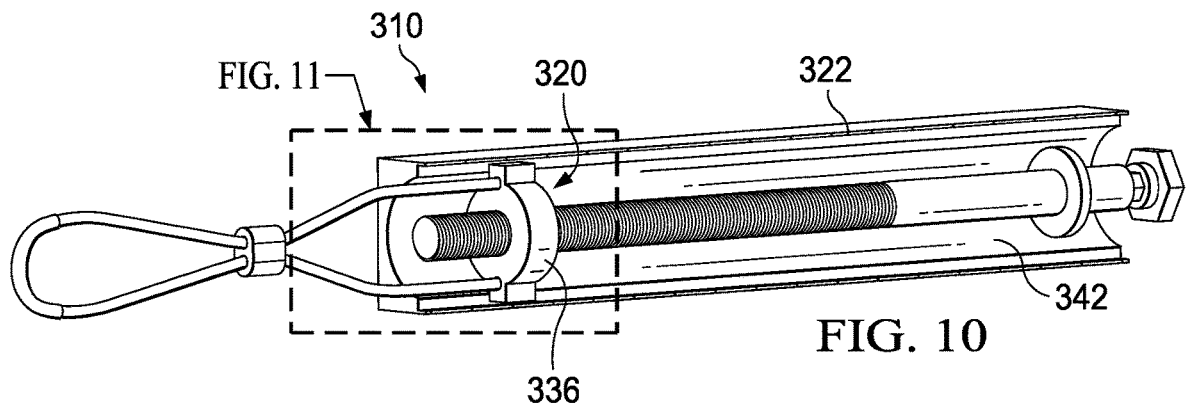
FIG. 10 is an isometric cross sectional view depicting a tensioning device, in accordance with still yet another embodiment.
Figure 11:
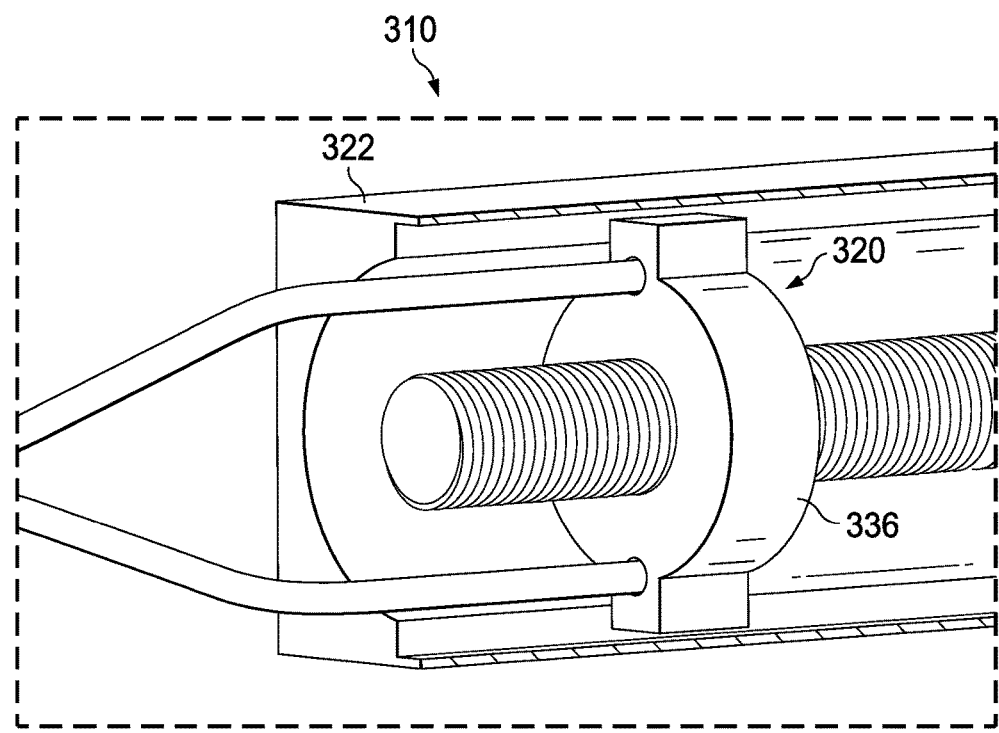
FIG. 11 is an enlarged isometric view of the encircled portion of the tensioning device of FIG. 10.
Figure 12:
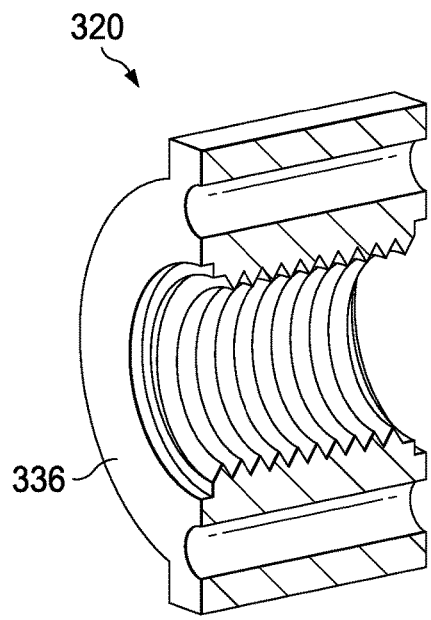
FIG. 12 is an isometric sectional view depicting a drive member of the tensioning device of FIG. 10.

FIGS. 10-12 illustrate another alternative embodiment of a tensioning device 310 that can be similar to, or the same in many respects as, the tensioning device 10 illustrated in FIGS. 1 and 2. For example, the tensioning device 310 can include a housing 322 and a driven member 320 disposed in an interior 328 at least partially defined by the housing 322. The driven member 320 can include a central body 336. However, the central body 336 can be substantially annular shaped, and an interior surface 342 of the housing 322 can be similarly shaped. The housing 322 can have a substantially square cross-sectional shape. In one embodiment, the driven member 320 can be provided in a two piece arrangement, one piece of which is illustrated in FIG. 12.

Figure 13:
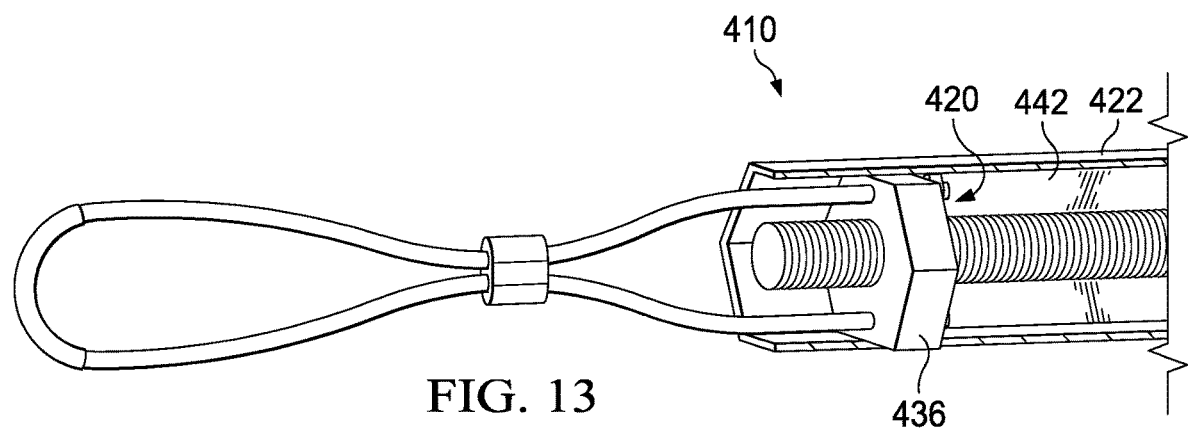
FIG. 13 is an enlarged isometric cross sectional view depicting a tensioning device, in accordance with still yet another embodiment.

FIG. 13 illustrates yet another alternative embodiment of a tensioning device 410 that can be similar to, or the same in many respects as, the tensioning device 10 illustrated in FIGS. 1 and 2. For example, the tensioning device 410 can include a housing 422 and a driven member 420 disposed in an interior 428 at least partially defined by the housing 422. The driven member 420 can include a central body 436. However, the central body 436 can be devoid of tab members (e.g., 38) and instead rely on the interaction between the substantially hexagonal shape of the central body 436 with a similarly-shaped interior surface 442 to prevent rotation of the driven member 420. The housing 422 can have a substantially hexagonal square cross-sectional shape.

Figure 14:
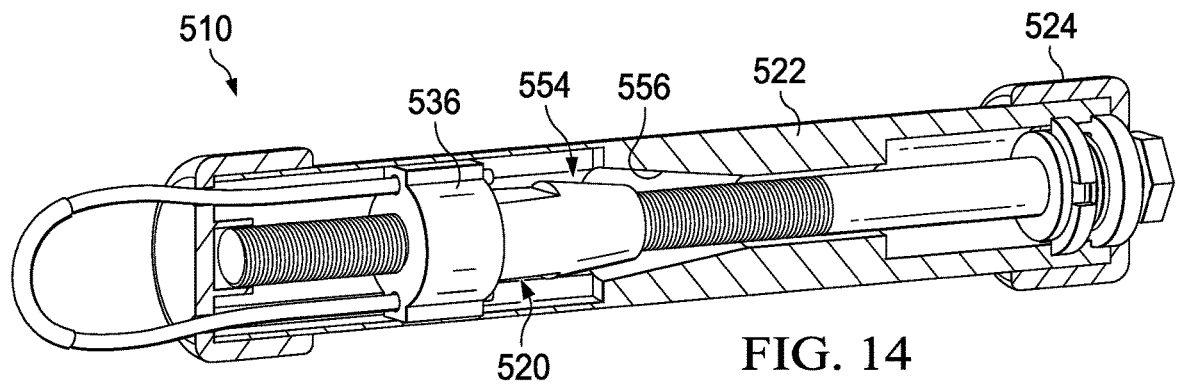
FIG. 14 is an isometric cross sectional view depicting a tensioning device, in accordance with still yet another embodiment.
Figure 15:
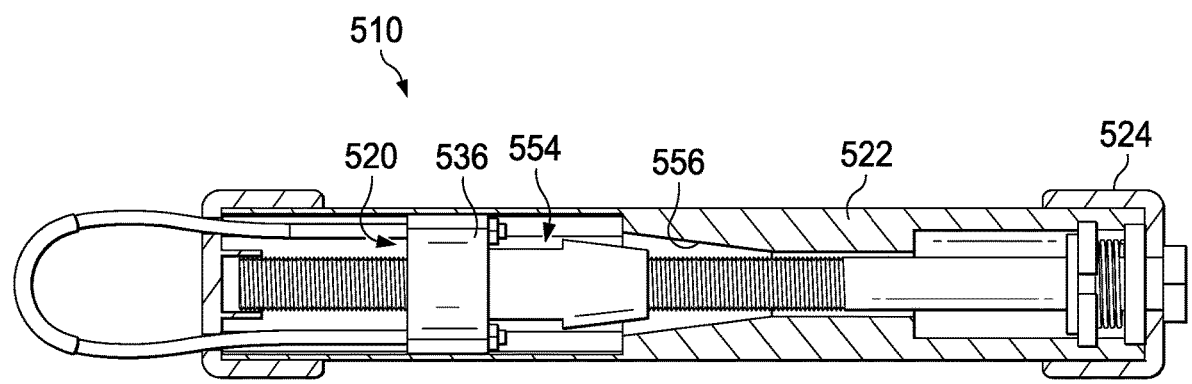
FIG. 15 is a cross sectional plan view depicting the tensioning device of FIG. 14.

FIGS. 14 and 15 illustrate yet another alternative embodiment of a tensioning device 510 that can be similar to, or the same in many respects as, the tensioning device 10 illustrated in FIGS. 1 and 2. For example, the tensioning device 510 can include a housing 522 and a driven member 520 disposed in an interior 528 at least partially defined by the housing 522. The driven member 520 can include a central body 536. However, the central body 536 can include a nose portion 554 that can nest within a narrowed area 556 of the interior 528 when the driven member 520 is slid towards a proximal cap 524. Nesting of the nose portion 554 within the narrowed area 556 can effectively prevent further sliding of the driven member 520 towards the proximal cap 524. When the nose portion 554 is nested within the narrowed area 556, the tapered shape of each of the nose portion 554 and the narrowed area 556 can prevent the nose portion 554 from becoming stuck in the narrowed area 556 thereby allowing for easy sliding of the driven member 520 away from the proximal cap 524.

Figure 16:
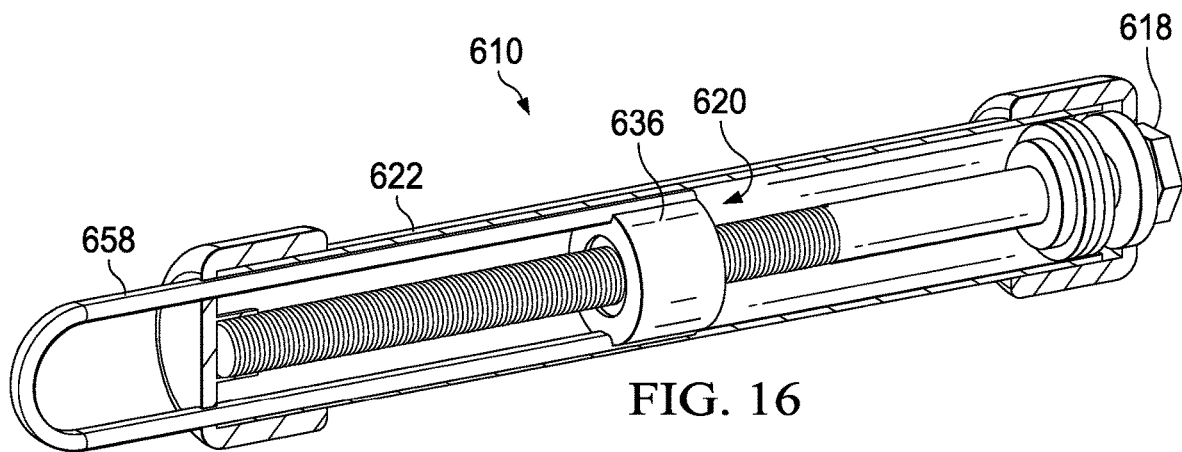
FIG. 16 is an isometric sectional view depicting a tensioning device, in accordance with still yet another embodiment.
Figure 17:
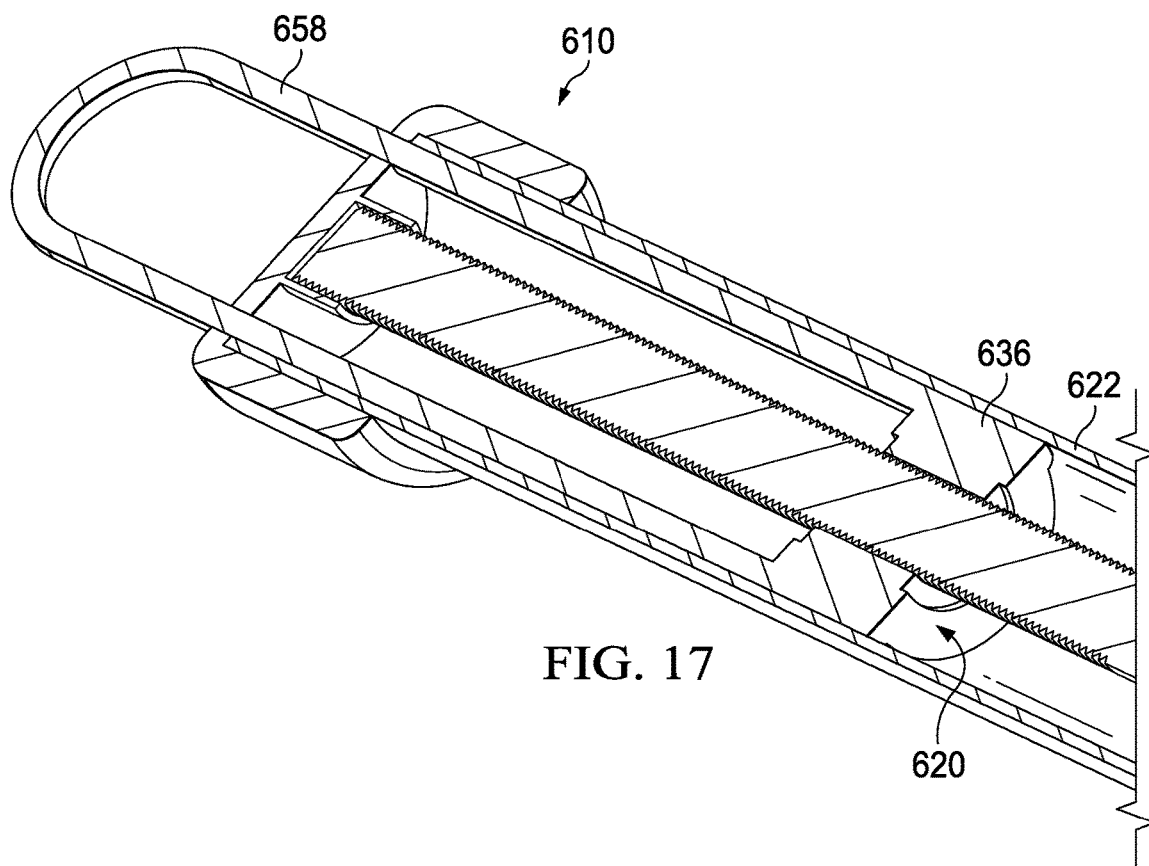
FIG. 17 is an enlarged isometric view depicting the tensioning device of FIG. 16.

FIGS. 16 and 17 illustrate yet another alternative embodiment of a tensioning device 610 that can be similar to, or the same in many respects as, the tensioning device 310 illustrated in FIGS. 10 and 11. For example, the tensioning device 610 can include a housing 622 and a driven member 620 disposed in an interior 628 at least partially defined by the housing 622. The driven member 620 can include a central body 636. However, a rigid loop 658 can be coupled with the central body 636 instead of a cable member (e.g., 46). The rigid loop 658 can facilitate attachment of a lashing member thereto but can be rigid enough to allow the tensioning device 610 to be used to push objects apart. In particular, the tensioning device 610 can be wedged between two objects and a drive member 618 can be rotated to extend the rigid loop 658 with respect to the housing 622 which can urge the two objects apart.

Figure 18:
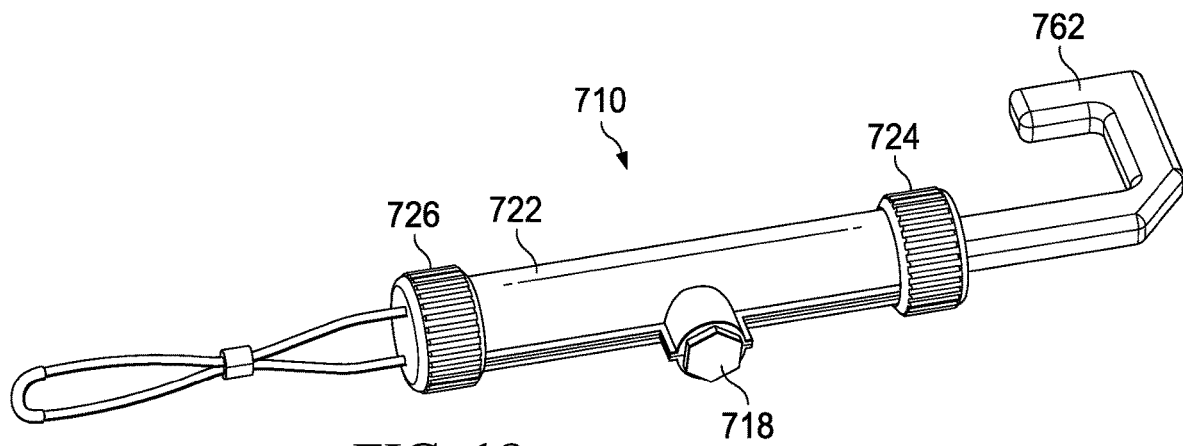
FIG. 18 is an isometric view depicting a tensioning device, in accordance with still yet another embodiment.
Figure 19:
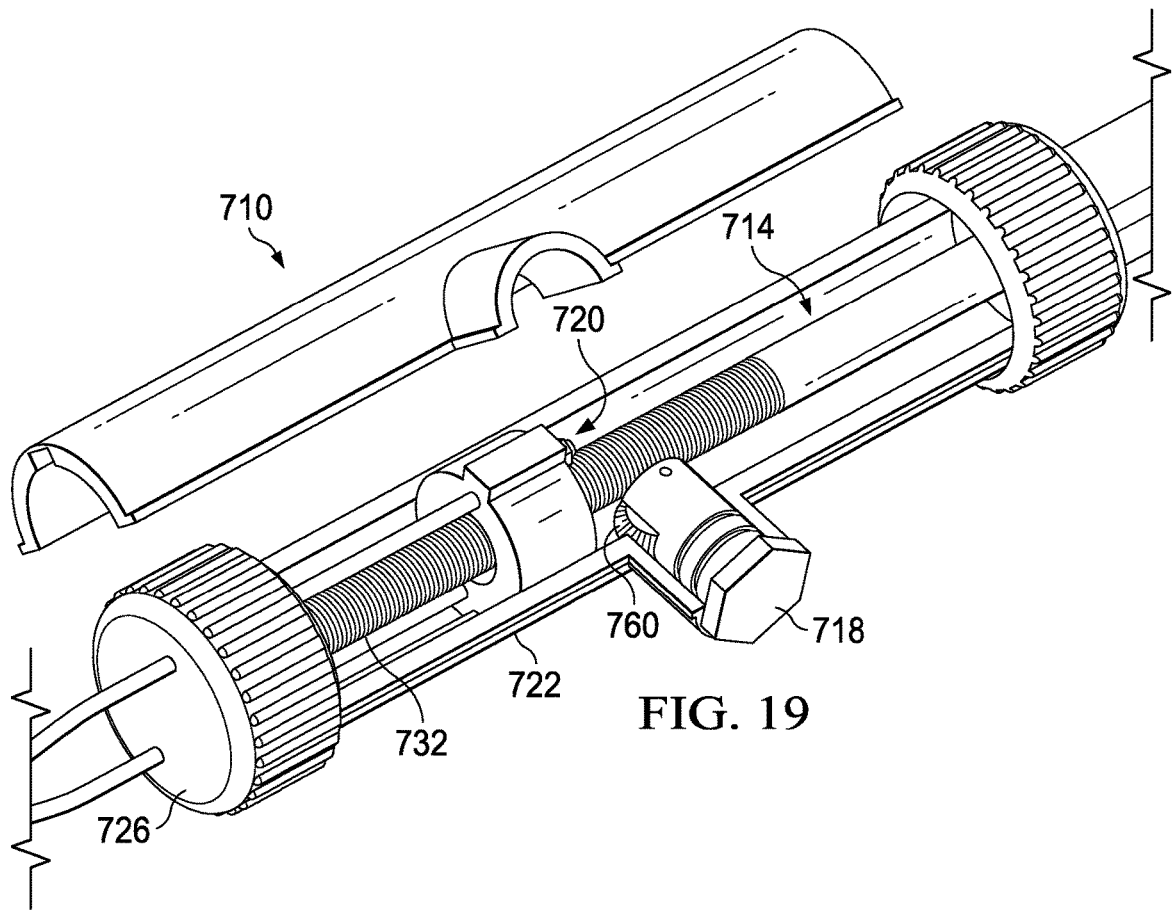
FIG. 19 is an enlarged partially exploded isometric view depicting the tensioning device of FIG. 18.

FIGS. 18 and 19 illustrate yet another alternative embodiment of a tensioning device 710 that can be similar to, or the same in many respects as, the tensioning device 10 illustrated in FIGS. 1 and 2. For example, as illustrated in FIG. 19, the tensioning device 710 can include a housing 722 and a driven member 720 disposed in an interior 728 at least partially defined by the housing 722. However, a drive member 718 can be located on the housing 722 between a proximal cap 724 and a distal cap 726 (FIG. 18) such that the tensioning device 710 is in a "side drive" arrangement. In such an arrangement the driven member 720 can slide along an axis (not shown) that is perpendicular to a rotational axis of the drive member 718. The drive member 718 can be operably coupled with a bevel gear 760 that is intermeshed with a threaded end 732 of a drive stem 714. Rotation of the drive member 718 can rotate the bevel gear 760 which can rotate the drive stem 714 (via the threaded end 732) to facilitate sliding of the driven member 720 within the interior 728. The proximal cap 724 can include a hook member 762 (FIG. 18) or other similar device that allows a lashing member to be secured thereto. It is to be appreciated that the tensioning device 710 can facilitate two-way pulling of a lashing member from opposing ends of the tensioning device 710 rather than from a hook (e.g., 2129 in FIGS. 41-43) disposed on the housing 722.

Figure 20:
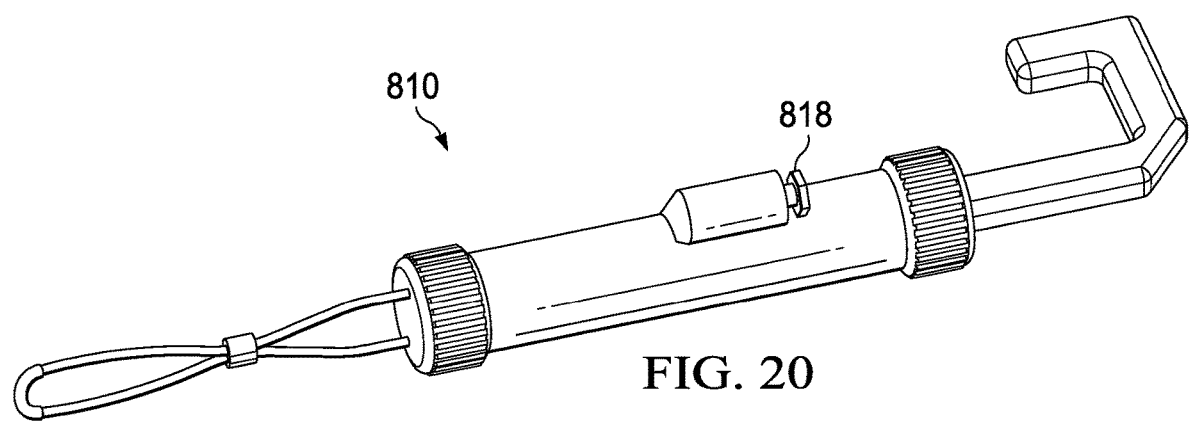
FIG. 20 is an isometric view depicting a tensioning device, in accordance with still yet another embodiment.

FIG. 20 illustrates yet another alternative embodiment of a tensioning device 810 that can be similar to, or the same in many respects as, the tensioning device 710 illustrated in FIGS. 18 and 19. However, a drive member 818 can be angled differently with respect to the rotational axis of the drive stem (e.g., 714).

Figure 21:
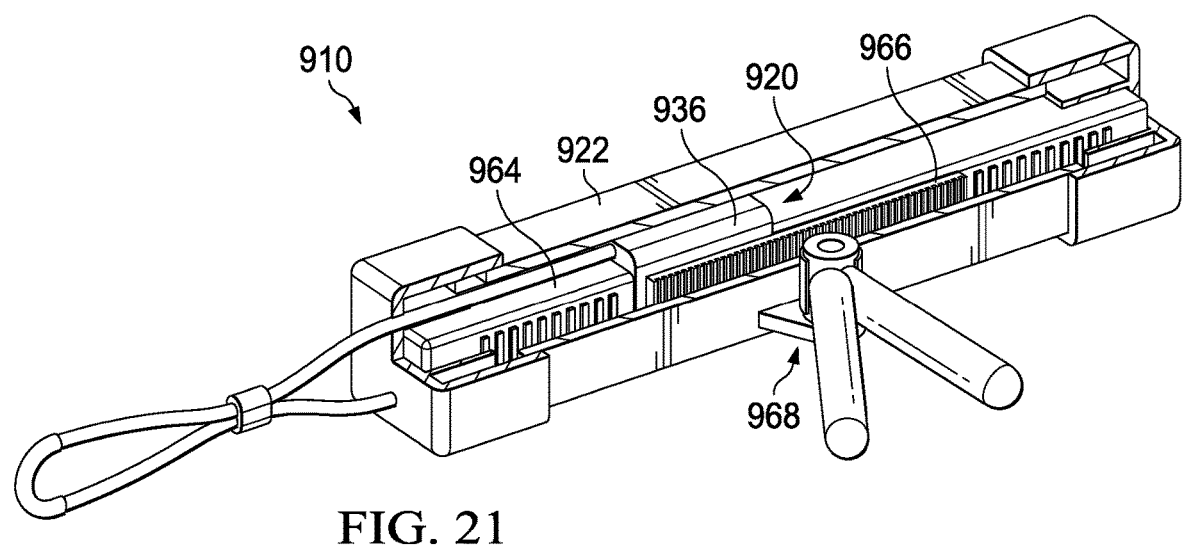
FIG. 21 is an isometric view depicting a tensioning device, in accordance with still yet another embodiment.

FIG. 21 illustrates yet another alternative embodiment of a tensioning device 910 that can be similar to, or the same in many respects as, the tensioning device 10 illustrated in FIGS. 1 and 2. For example, the tensioning device 910 can include a housing 922 and a driven member 920 disposed in an interior 928 at least partially defined by the housing 922. However, the tensioning device 910 can include a bar member 964 that is routed along the interior 928 and through the driven member 920. The driven member 920 can have an elongate gear member 966 that extends from a central body 936 in a cantilevered arrangement. An actuator 968 can be disposed along an exterior of the housing 922 and can interface with the elongate gear member 966 such that actuation of the actuator 968 can cause the driven member 920 to slide within the interior 928.

Figure 22:
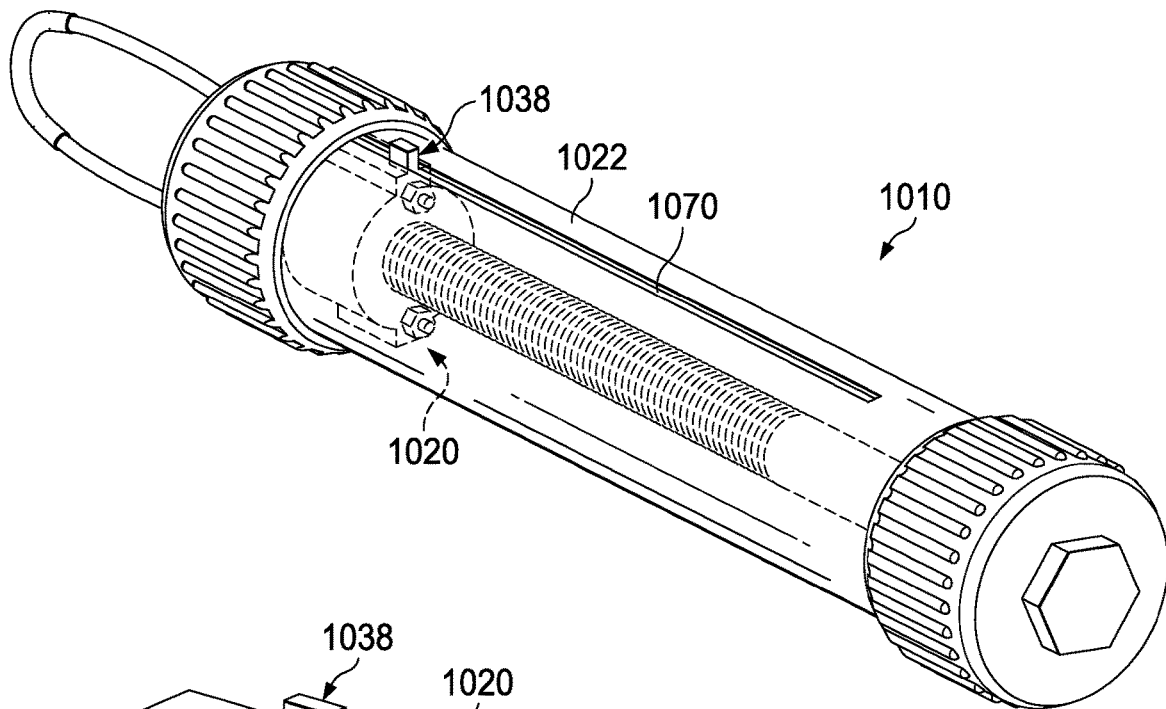
FIG. 22 is an enlarged isometric view depicting a tensioning device, in accordance with still yet another embodiment.
Figure 23:
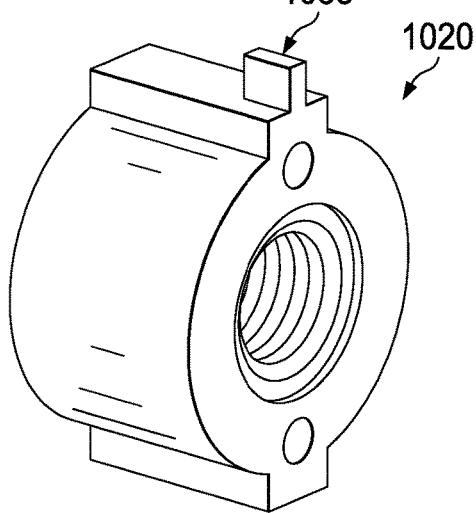
FIG. 23 is an isometric view depicting a drive member of the tensioning device of FIG. 24 is an enlarged isometric view depicting a tensioning device, in accordance with still yet another embodiment.

FIGS. 22 and 23 illustrate yet another alternative embodiment of a tensioning device 1010 that can be similar to, or the same in many respects as, the tensioning device 310 illustrated in FIGS. 10 and 11. For example, as illustrated in FIG. 22, the tensioning device 1010 can include a housing 1022 and a driven member 1020 disposed in an interior 1028 at least partially defined by the housing 1022. The driven member 1020 can include a tab member 1038 (FIG. 23). However, the housing 1022 can define an elongated slot 1070 that extends through the housing 1022. The tab member 1038 can extend through the elongated slot 1070 and to an exterior of the tensioning device 1010 to allow a hook or other device to be attached thereto for engaging a lashing member. The tab member 1038 can also provide a visual indication of the position of the driven member 1020 within the housing 1022.

Figure 24:
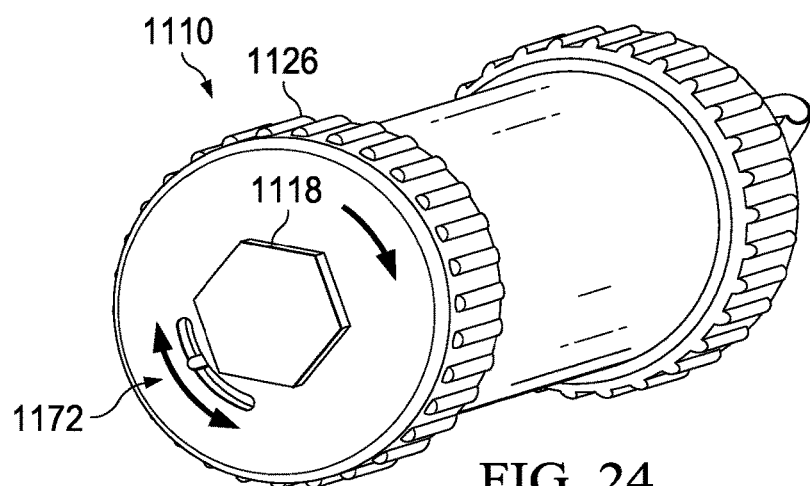

FIG. 24 illustrates yet another alternative embodiment of a tensioning device 1110 that can be similar to, or the same in many respects as, the tensioning device 10 illustrated in FIGS. 1 and 2. For example, the tensioning device 1110 can include a drive member 1118 located at a distal cap 1126. However, the drive member 1118 can be configured as a ratcheting head that only allows the drive stem (e.g., 14) to be rotated in one direction when the drive member 1118 is rotated in different directions. A selector switch 1172 can be provided that extends from the distal cap 1126 and allows a user to select the direction of rotation of the drive stem. The clutch assembly (not shown) can be configured to provide an audible sound (such as a click or a pop) to notify a user when a particular torque value has been reached (similar to a torque wrench).

Figure 25:
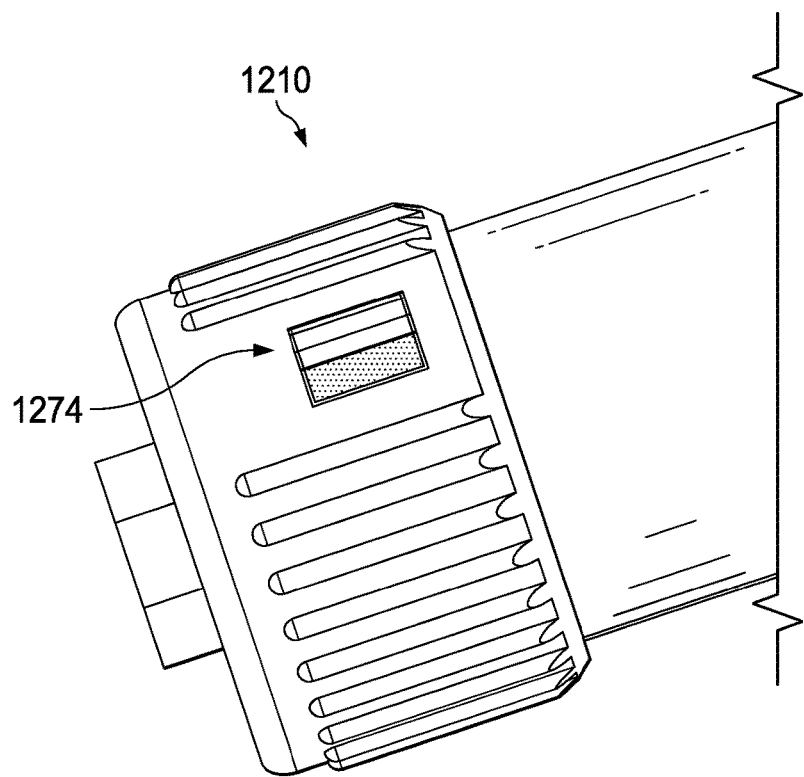
FIG. 25 is an enlarged view depicting a tensioning device, in accordance with still yet another embodiment, and with a visual indicator shown in an under-torque condition.
Figure 26:
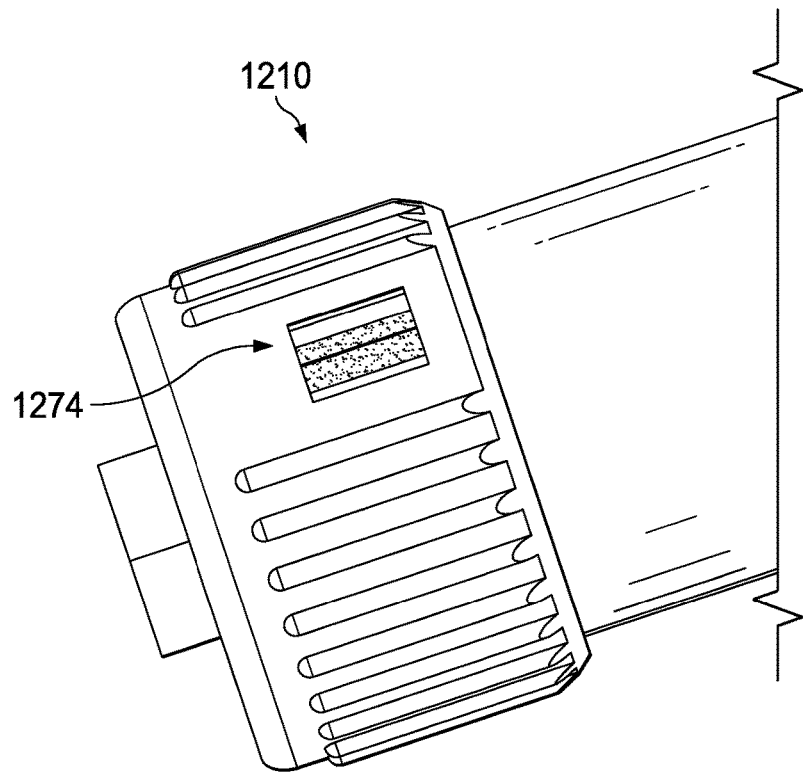
FIG. 26 is an enlarged view depicting the tensioning device of FIG. 25 but with the visual indicator shown in an at-torque or over-torque condition.

FIGS. 25 and 26 illustrate yet another alternative embodiment of a tensioning device 1210 that can be similar to, or the same in many respects as, the tensioning device 10 illustrated in FIGS. 1 and 2. However, the tensioning device 1210 can include a visual indicator 1274 that can notify a user when a particular torque value has been reached (similar to a torque wrench). FIG. 25 illustrates the visual indicator 1274 in an under-torque condition and FIG. 26 illustrates the visual indicator 1274 in an at-torque or over-torque condition.

Figure 27:
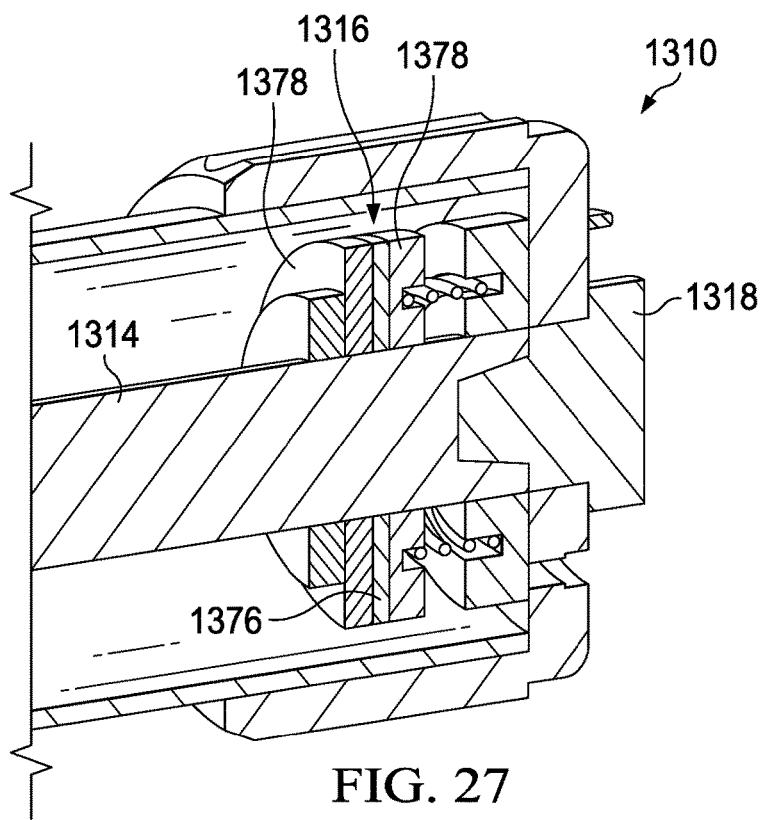
FIG. 27 is an enlarged isometric cross sectional view depicting a tensioning device, in accordance with still yet another embodiment, and with a clutch assembly shown in an under-torque condition.
Figure 28:
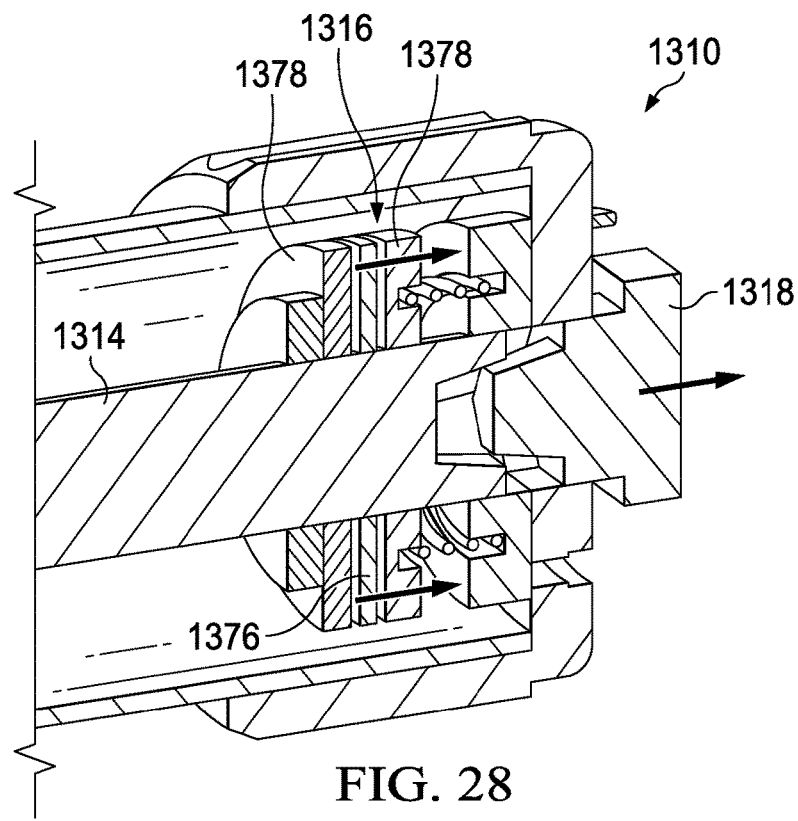
FIG. 28 is an enlarged view depicting the tensioning device of FIG. 27 but with the clutch assembly shown in an at-torque or over-torque condition.

FIGS. 27 and 28 illustrate yet another alternative embodiment of a tensioning device 1310 that can be similar to, or the same in many respects as, the tensioning device 10 illustrated in FIGS. 1 and 2. For example, the tensioning device 1310 can comprise a clutch assembly 1316. The clutch assembly 1316 can be a disc-type arrangement that includes an inner disk 1376 that is sandwiched between a pair of outer disks 1378. When the clutch assembly 1316 is in an under-torque condition, as illustrated in FIG. 27, the inner disk 1376 is engaged with the outer disks 1378 such that a drive member 1318 is engaged with a drive stem 1314 to facilitate rotation of the drive stem 1314 with the drive member 1318. When the clutch assembly 1316 is in an at-torque or over torque condition, as illustrated in FIG. 28, the outer disks separate such that the inner disk 1376 is no longer engaged with the outer disks 1378 and the drive member 1318 separates from the drive stem 1314 such that rotation of the drive member 1318 no longer rotates the drive stem 1314.

Figure 29:
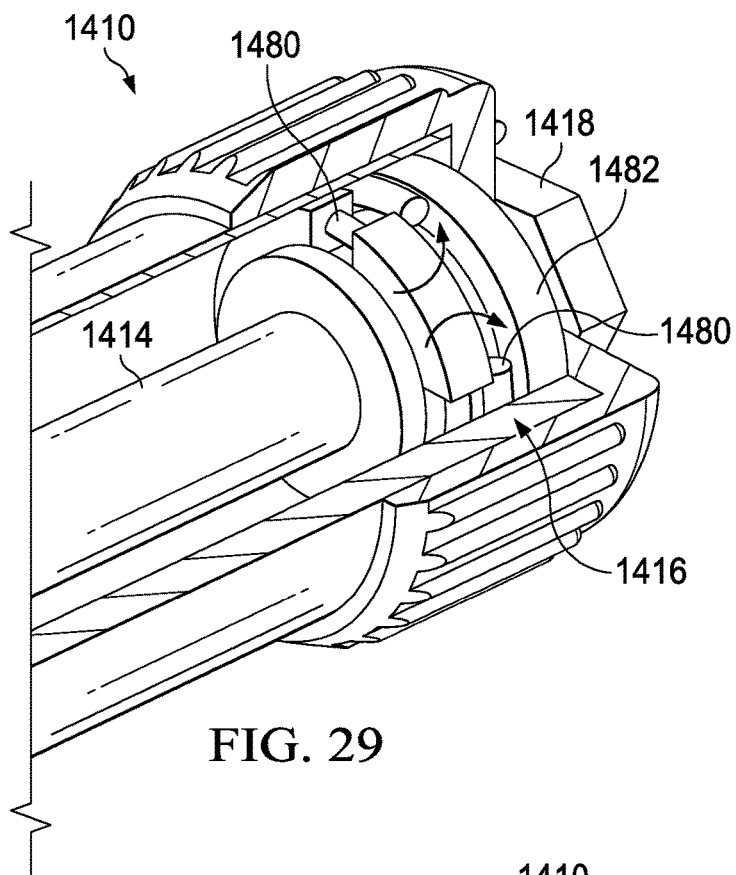
FIG. 29 is an enlarged isometric cross sectional view depicting a tensioning device, in accordance with still yet another embodiment, and with a clutch assembly shown in an under-torque condition.
Figure 30:
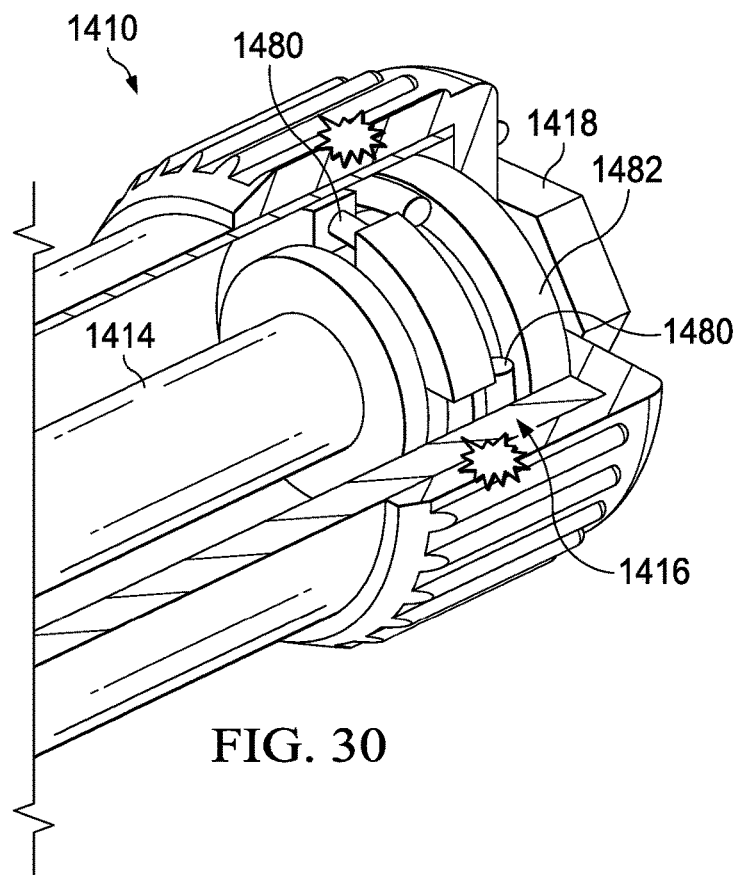
FIG. 30 is an enlarged view depicting the tensioning device of FIG. 29 but with the clutch assembly shown in an at-torque or over-torque condition.

FIGS. 29 and 30 illustrate yet another alternative embodiment of a tensioning device 1410 that can be similar to, or the same in many respects as, the tensioning device 1310 illustrated in FIGS. 26 and 27. For example, the tensioning device 1410 can comprise a clutch assembly 1416. However, the clutch assembly 1416 can be a Sprag-type clutch arrangement that includes a plurality of sprags 1480 that selectively engage an upper disk 1482. When the clutch assembly 1416 is in an under-torque condition, as illustrated in FIG. 29, the sprags 1480 are engaged with the upper disk 1482 such that a drive member 1418 is engaged with a drive stem 1414 to facilitate rotation of the drive stem 1414 with the drive member 1418. When the clutch assembly 1416 is in an at-torque or over torque condition, as illustrated in FIG. 30, the sprags 1480 disengage from the upper disk 1482 such that rotation of the drive member 1418 no longer rotates the drive stem 1414.

Figure 31:
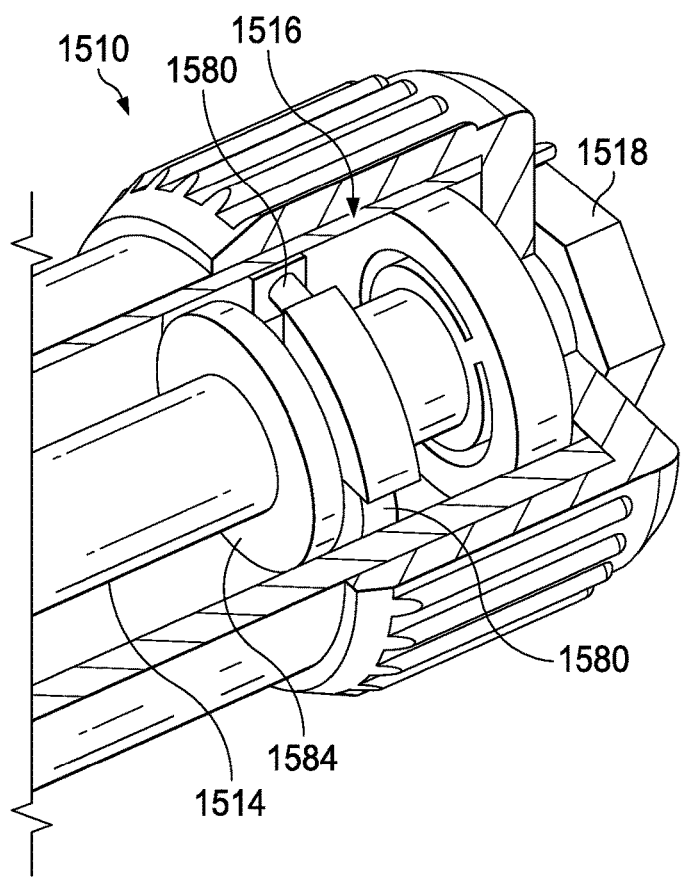
FIG. 31 is an enlarged isometric sectional view depicting a tensioning device, in accordance with still yet another embodiment, and with a clutch assembly shown in an under-torque condition.
Figure 32:
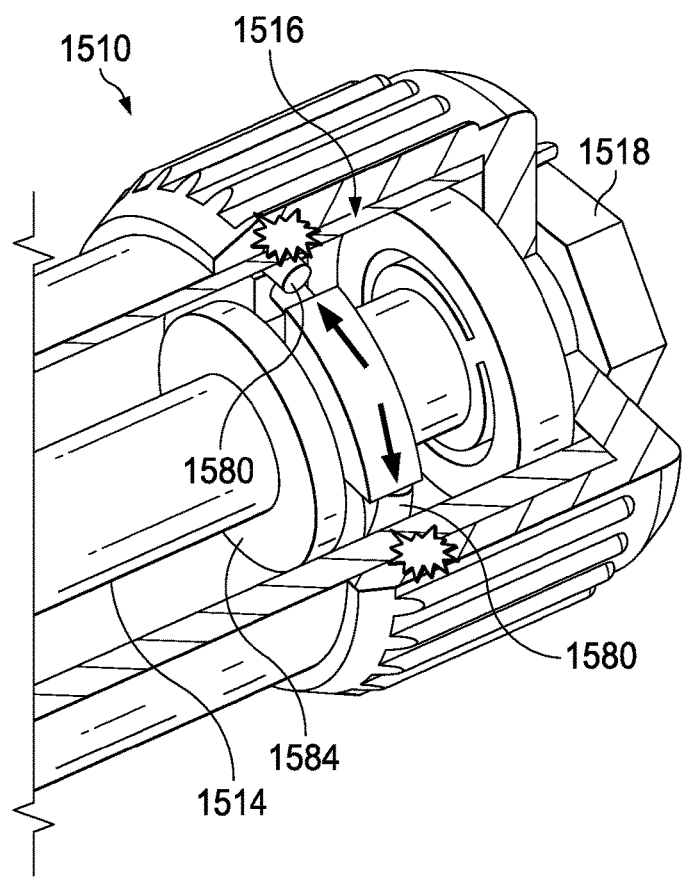
FIG. 32 is an enlarged view depicting the tensioning device of FIG. 31 but with the clutch assembly shown in an at-torque or over-torque condition.

FIGS. 31 and 32 illustrate yet another alternative embodiment of a tensioning device 1510 that can be similar to, or the same in many respects as, the tensioning device 1410 illustrated in FIGS. 28 and 29. For example, the tensioning device 1510 can comprise a clutch assembly 1516 that comprises a plurality of sprags 1580. However, the sprags 1580 selectively engage a lower disk 1584. When the clutch assembly 1516 is in an under-torque condition, as illustrated in FIG. 31, the sprags 1580 are engaged with the lower disk 1584 such that a drive member 1518 is engaged with a drive stem 1514 to facilitate rotation of the drive stem 1514 with the drive member 1518. When the clutch assembly 1516 is in an at-torque or over torque condition, as illustrated in FIG. 32, the sprags 1580 disengage from the lower disk 1584 such that rotation of the drive member 1518 no longer rotates the drive stem 1514.

Figure 33:
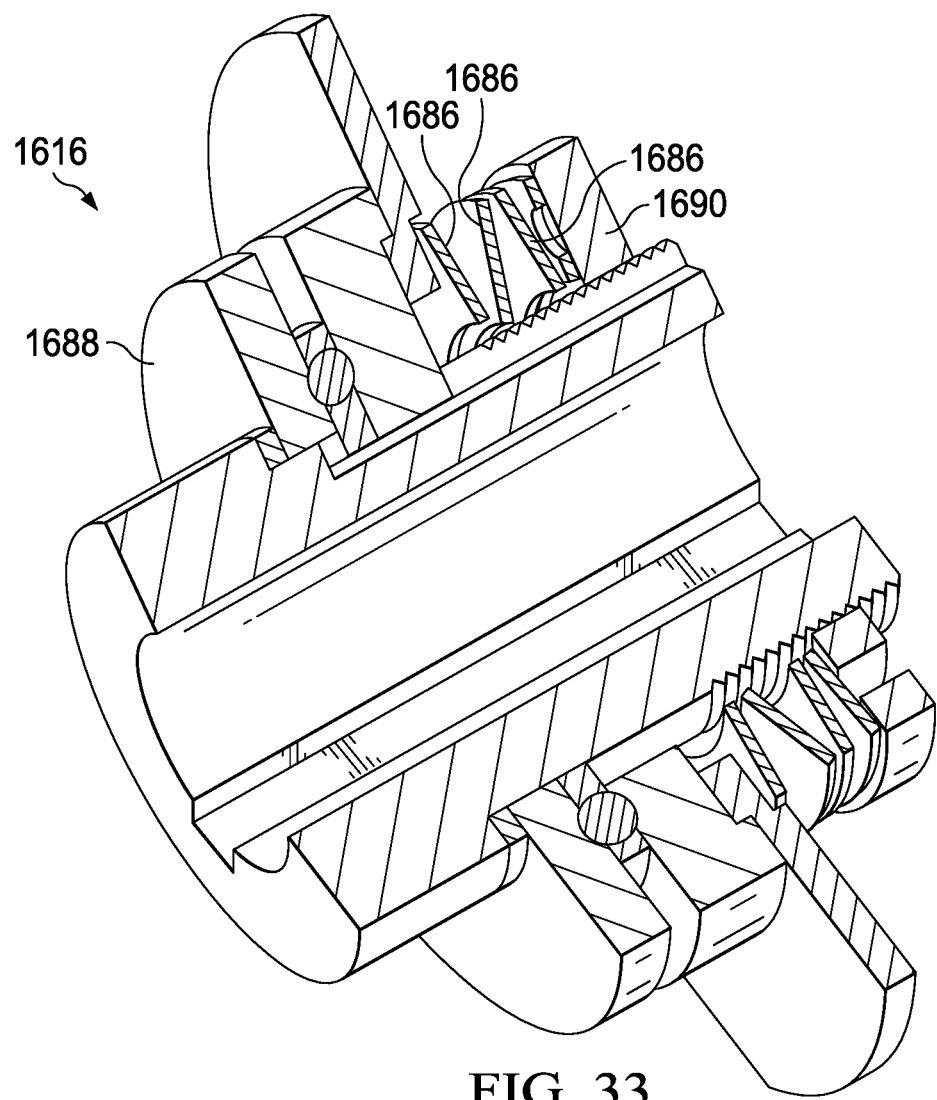
FIG. 33 is an isometric cross sectional view depicting a clutch assembly, in accordance with another embodiment.

FIG. 33 illustrates an alternative embodiment of a clutch assembly 1616 that can be similar to, or the same in many respects as, the clutch assembly 1316 illustrated in FIGS. 27 and 28. However, the clutch assembly 1616 can be a torque limiting, friction type clutch which can comprise a plurality of discs 1686 sandwiched between an upper disk 1688 and a lower disk 1690. The upper disk 1688 can be attached to a drive member (not shown) and the lower disk 1690 can be coupled with a drive stem (not shown). When the clutch assembly 1616 is in an under-torque condition, the upper disk 1688 is engaged with the lower disk 1690 such that the drive member is engaged with the drive stem to facilitate rotation of the drive stem with the drive member. When the clutch assembly 1616 is in an at-torque or over torque condition, the discs 1686 facilitate mechanical decoupling of the upper disk 1688 from the lower disk 1690 such that rotation of the drive member no longer rotates the drive stem.

Figure 34:
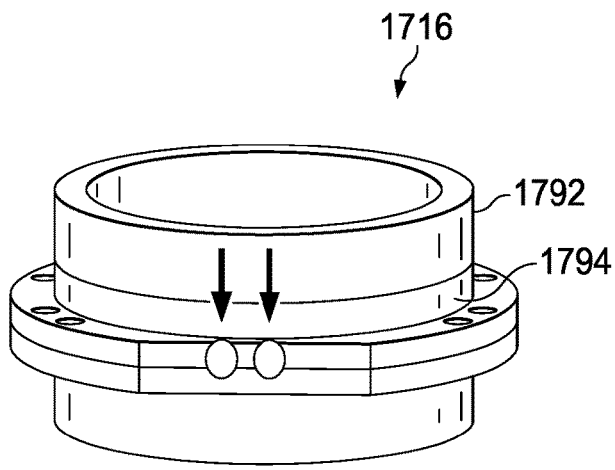
FIG. 34 is an isometric view depicting a clutch assembly, in accordance with yet another embodiment, and with the clutch assembly shown in an under-torque condition.
Figure 35:
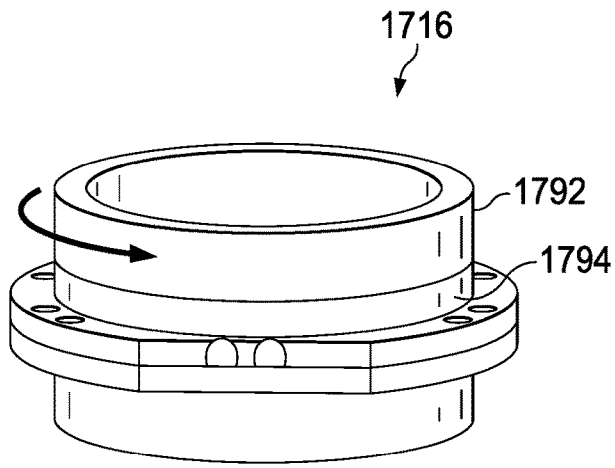
FIG. 35 is an isometric view depicting the clutch assembly of FIG. 34 but with the clutch assembly shown in an at-torque or over-torque condition.
Figure 36:
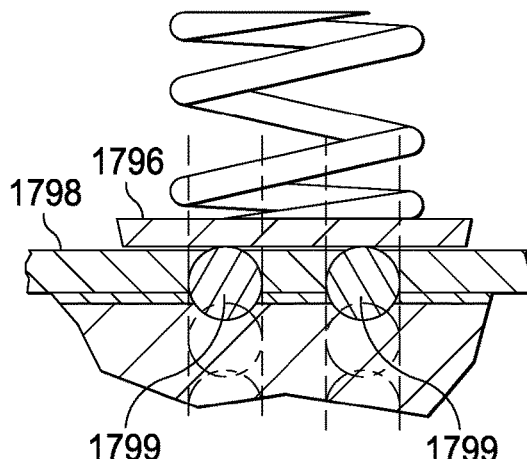
FIG. 36 is a cross sectional view of the clutch assembly taken along the line 36-36 of FIG. 34.

FIGS. 34-36 illustrate another alternative embodiment of a clutch assembly 1716 that can be similar to, or the same in many respects as, the clutch assembly 1316 illustrated in FIGS. 27 and 28. However, the clutch assembly 1716 can be a tension limiting clutch which can comprise an input flange 1792 and an output flange 1794. The input flange 1792 can be coupled with a drive member (not shown) and the output flange 1794 can be coupled with a drive stem (not shown). As illustrated in FIG. 36, the clutch assembly 1716 can include an actuation ring 1796 that is coupled with the input flange 1792 and a base element 1798 that is coupled with the output flange 1794. A plurality of engaging balls 1799 are sandwiched between the actuation ring 1796 and the base element 1798. When the clutch assembly 1716 is in an under-torque condition (FIG. 34), the engaging balls 1799 couple the actuation ring 1796 and the base element 1798 together such that the drive member is engaged with the drive stem to facilitate rotation of the drive stem with the drive member. When the clutch assembly 1716 is in an at-torque or over torque condition (FIG. 35), the engaging balls 1799 fall away from the actuation ring 1796 to decouple the actuation ring 1796 from the base element 1798 such that rotation of the drive member no longer rotates the drive stem.

Figure 37:
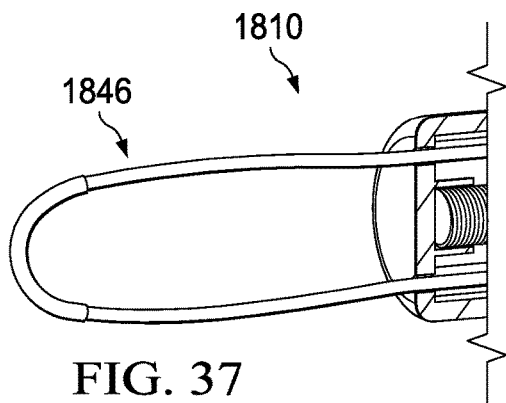
FIG. 37 is an enlarged isometric sectional view depicting a tensioning device having a cable, in accordance with still yet another embodiment.

FIG. 37 illustrates yet another alternative embodiment of a tensioning device 1810 that can be similar to, or the same in many respects as, the tensioning device 10 illustrated in FIGS. 1 and 2. For example, the tensioning device 1810 can include a cable member 1846. However, the cable member 1846 can be devoid of a clamp member (e.g., 50).

Figure 38:
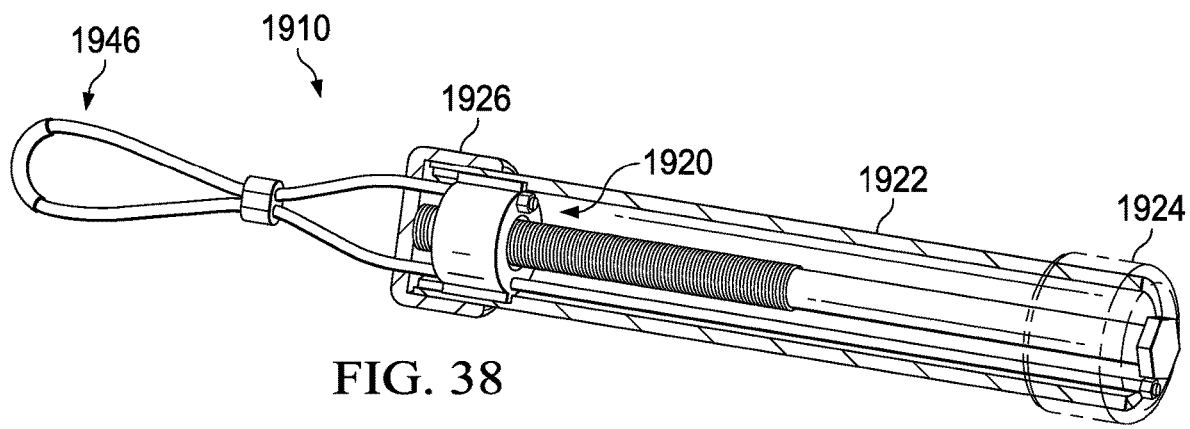
FIG. 38 is an enlarged isometric sectional view depicting a tensioning device, in accordance with still yet another embodiment.

FIG. 38 illustrates yet another alternative embodiment of a tensioning device 1910 that can be similar to, or the same in many respects as, the tensioning device 310 illustrated in FIGS. 10 and 11. For example, the tensioning device 1910 can include a housing 1922, a proximal cap 1924, and a distal cap 1926. A cable member 1946 can be routed through a driven member 1920. However, one end of the cable member 1946 can be attached to the distal cap 1926 such that sliding of the driven member 1920 within an interior 1928 only slides one end of the cable member 1946 relative to the distal cap 1926 to change the effective length of the cable member 1946.

Figure 39:
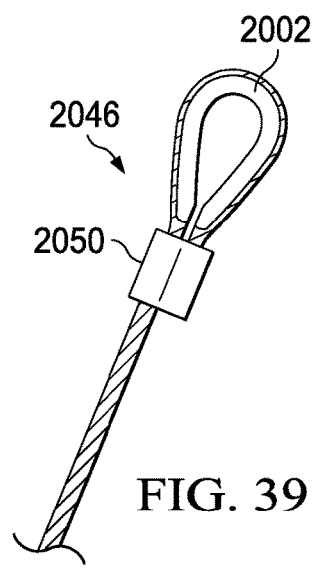
FIG. 39 is an enlarged isometric view depicting a cable, in accordance with another embodiment.
Figure 40A:
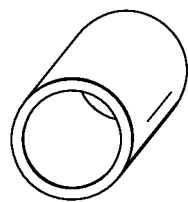
FIGS. 40A-40H are isometric sectional views of various alternative arrangements for a housing of a housing assembly of a tensioning member.
Figure 40B:
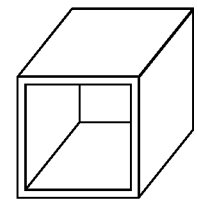
Figure 40C:
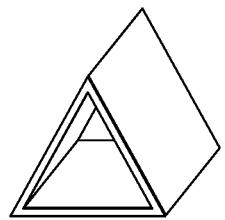
Figure 40D:
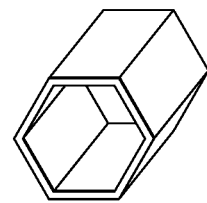
Figure 40E:
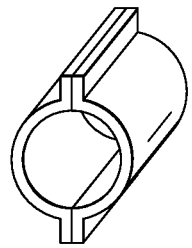
Figure 40F:
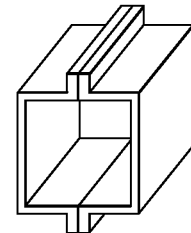
Figure 40G:
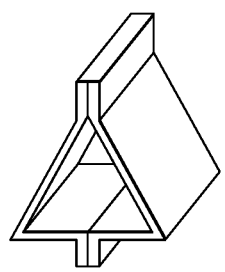
Figure 40H:
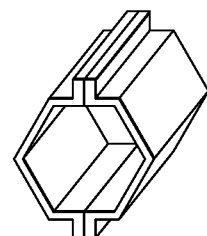

FIG. 39 illustrates an alternative embodiment of a cable member 2046 that can include a rigid thimble 2002 and a clamp member 2050 disposed adjacent to the rigid thimble 2002.

FIGS. 40A, 40B, 40C, 40D, 40E, 40F, 40G, and 40H illustrate various alternative arrangements for the housing (e.g., 22) of the housing assembly (e.g., 12). For each arrangement, an anti-rotation device (not shown) can be disposed within the housing and shaped similarly to the housing.

Figure 41:
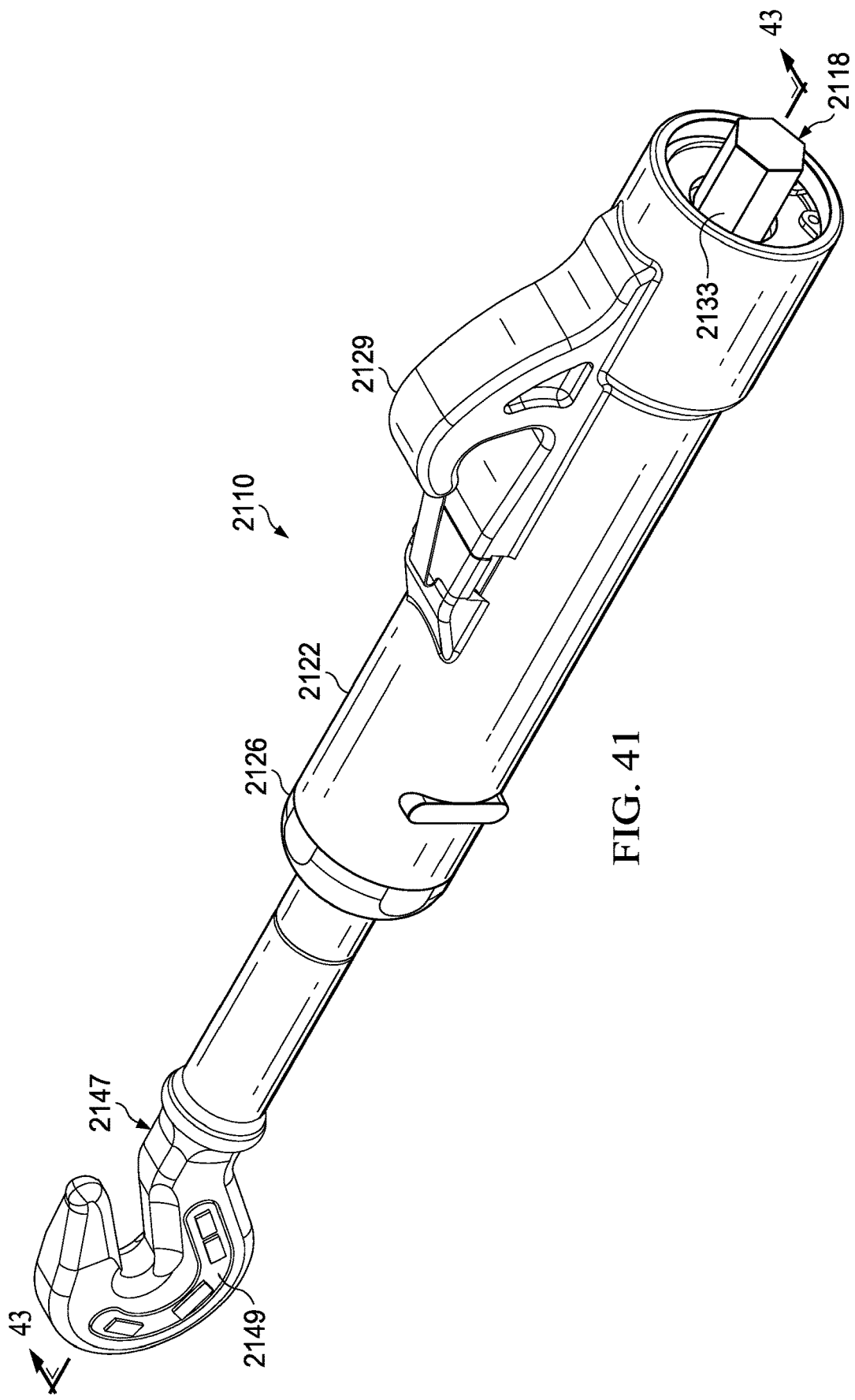
FIG. 41 is an isometric view depicting a tensioning device, in accordance with still yet another embodiment.
Figure 42:
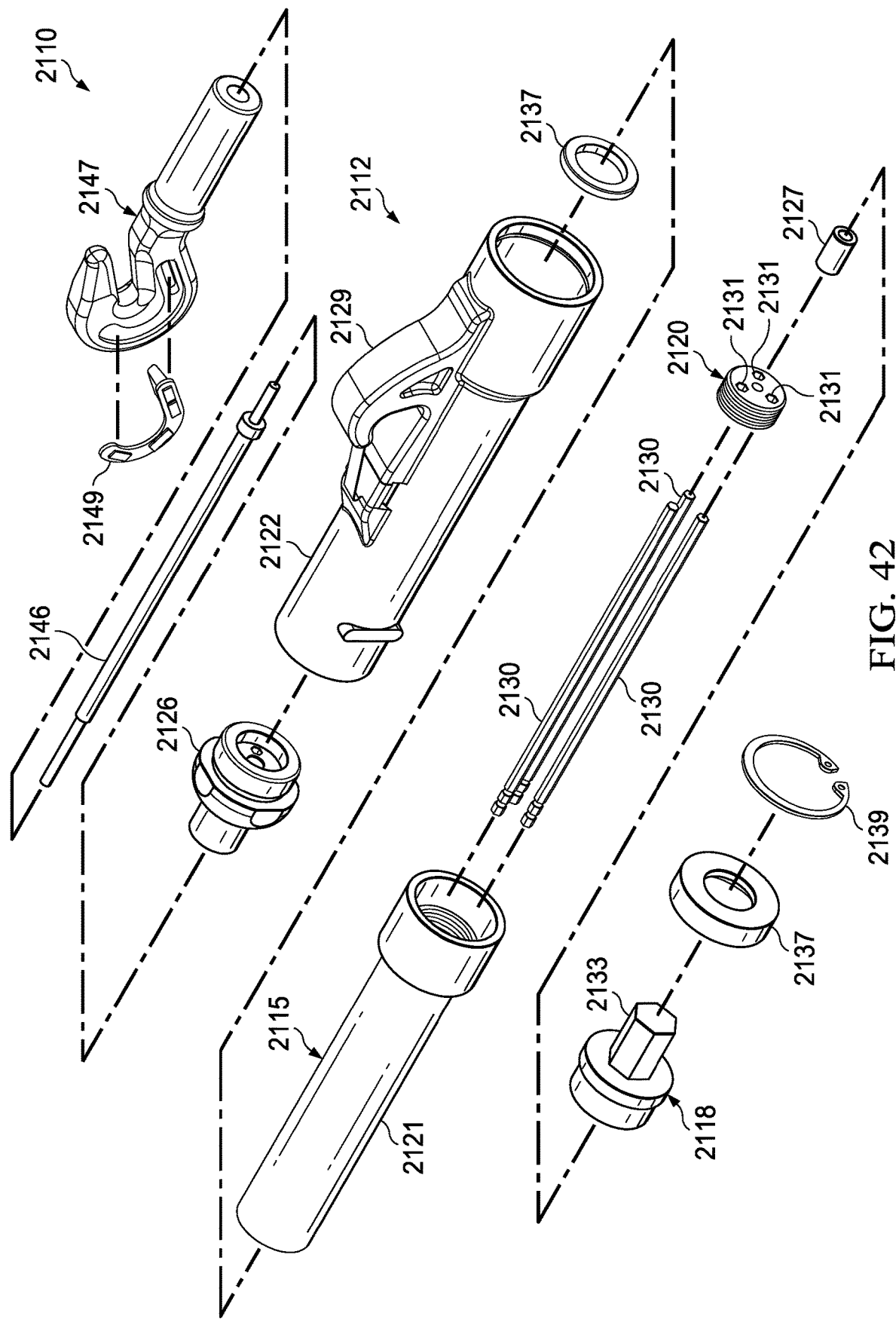
FIG. 42 is an exploded isometric view of the tensioning device of FIG. 41.
Figure 43:
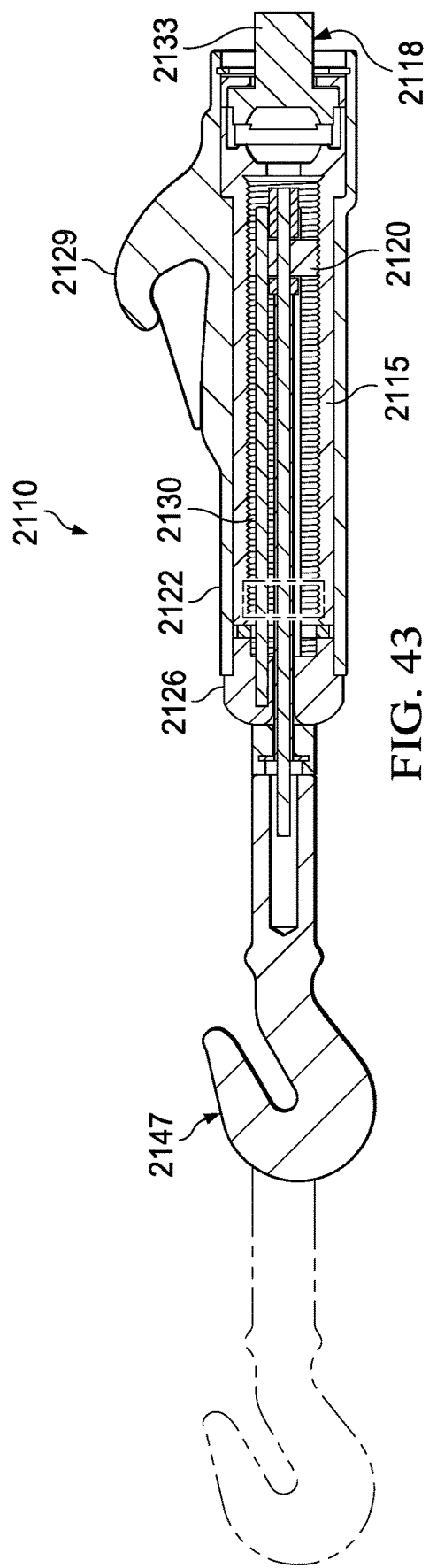
FIG. 43 is a cross sectional view of the tensioning device taken along the line 43-43 of FIG. 41.

FIGS. 41-45 illustrate another alternative embodiment of a tensioning device 2110 that can include features that are similar to, or the same in many respects as, the features of the tensioning devices described above. As illustrated in FIGS. 42 and 43, the tensioning device 2110 can include a housing assembly 2112 that includes an inner sleeve 2115, a housing 2122, and a cap 2126. The inner sleeve 2115 can be disposed within the housing 2122 and rotatably coupled with the housing 2122. In one embodiment, the inner sleeve 2115 can be journalled with respect to the housing 2122 by a pair of bearings (not shown).

A driven member 2120 can be disposed within the inner sleeve 2115, as illustrated in FIG. 43, and movably coupled with the inner sleeve 2115. In one embodiment, the inner sleeve 2115 can include a threaded portion 2121 (FIG. 42) that includes threads formed on an inner diameter of the inner sleeve 2115. The threads of the threaded portion 2121 can mate with threads on an outer diameter of the driven member 2120 such that the inner sleeve 2115 and the driven member 2120 are threadably coupled together. In such an embodiment, rotation of the inner sleeve 2115 relative to the housing 2122 facilitates linear movement (e.g., translation) of the driven member 2120 relative to the inner sleeve 2115. The inner sleeve 2115 can also include an unthreaded portion (not shown) adjacent the threaded portion 2121 to protect against over-travel of the driven member 2120 relative to the inner sleeve 2115.

Referring now to FIGS. 42 and 43, a cable member 2146 can be coupled with the driven member 2120 such that sliding of the driven member 2120 with respect to the inner sleeve 2115 can correspondingly slide the cable member 2146 relative to the housing 2122 between an extended position (shown in dashed lines in FIG. 43) and a retracted position (shown in solid lines in FIG. 43). In one embodiment, the driven member 2120 can include a crimping portion 2127 that can be crimped to the cable member 2146 to facilitate attachment therebetween. In other embodiments, the cable member 2146 can be coupled to the driven member 2120 through welding, fasteners, adhesives, or any of a variety of suitable coupling arrangements.

As illustrated in FIGS. 41-43, the housing 2122 can include a hook 2129 and the cable member 2146 can include a hook 2147 disposed at an opposite end of the cable member 2146 as the driven member 2120. The hooks 2129, 2147 can cooperate with one another to facilitate attachment of the tensioning device 2110 to a lashing member (not shown). In one embodiment, the hook 2147 can be crimped or cast on to the cable member 2146, but in other embodiments the hook 2147 can be coupled with the cable member 2146 in any of a variety of suitable alternative manners. It is to be appreciated that, although a pair of hooks 2129, 2147 are illustrated and described, any of a variety of suitable alternative attachment features can be provided on the housing 2122, the cable member 2146, and/or at other locations on the tensioning device 2110 to facilitate attachment of the tensioning device 2110 to a lashing member.

Referring now to FIGS. 42 and 43, a plurality of anti-rotation members 2130 can be disposed in the inner sleeve 2115 and can be configured to prevent rotation of the driven member 2120 during rotation of the inner sleeve 2115. Each of the anti-rotation members 2130 can be coupled at one end with the driven member 2120 and at an opposite end with the housing 2122 (see FIG. 43). For example, one end of the anti-rotation members 2130 can extend through apertures 2131 (FIG. 42) defined by the driven member 2120 to facilitate coupling therebetween. An opposite end of the anti-rotation members 2130 can extend into the cap 2126 to facilitate coupling therebetween. The ends of the anti-rotation members 2130 can be attached to the driven member 2120 or the housing 2122 via an interference fit, with adhesive, through welding, though crimping, or with any of a variety of other suitable alternative attachment arrangements. It is to be appreciated that although three anti-rotation members are illustrated, any quantity of anti-rotation members can be provided.

A drive member 2118 can be rotatably coupled with the housing 2122 and operably coupled with the inner sleeve 2115 such that rotation of the drive member 2118 facilitates rotation of the inner sleeve 2115 relative to the housing 2122. In one embodiment, the drive member 2118 can be rigidly attached to the inner sleeve 2115 through welding, with adhesives, or via an intermeshing arrangement. In another embodiment, the drive member 2118 and the inner sleeve 2115 can be provided as a unitary one-piece construction. The drive member 2118 can include a drive head 2133 that is configured to mate with a wrench or a socket to facilitate manual or powered rotation of the drive member 2118 with the tool.

The inner sleeve 2115 and the drive member 2118 can be sandwiched between a pair of thrust washers 2137 that facilitate journaling of the inner sleeve 2115 with respect to the housing 2122. It is to be appreciated that any of a variety of suitable alternative arrangements can be provided for journaling the inner sleeve 2115 and the drive member 2118 with respect to the housing 2122, such as a ball bearing or a roller bearing, for example. A retaining ring 2139 (FIG. 42) can be provided over the thrust washer 2137 located at the drive member 2118 to facilitate retention of the inner sleeve 2115, the drive member 2118, the driven member 2120, and the thrust washers 2137 within the housing 2122. In some embodiments, an O-ring, a bushing, or other suitable sealing arrangement can be provided between the inner sleeve 2115 and the housing 2122.

The drive member 2118 can accordingly be operably coupled with the driven member (via the inner sleeve 2115) such that driven member 2120 can slide along an axis (not shown) that is parallel to a rotational axis of the drive member 2118. In one embodiment, as illustrated in FIGS. 41-43, the driven member 2120 can slide along an axis that is coaxial with the rotational axis of the drive member 2118. The drive member 2118 can accordingly be rotated to facilitate selective extension and retraction of the cable member 2146 (via the driven member 2120) with respect to the housing 2122. For example, when the drive member 2118 is rotated (e.g., with a tool), the inner sleeve 2115 can correspondingly rotate with respect to the housing 2122. When the inner sleeve 2115 rotates, the anti-rotation members 2130 can prevent the driven member 2120 from rotating which can cause the driven member 2120 to move linearly relative to the inner sleeve 2115 (e.g., due to the threaded engagement between the inner sleeve 2115 and the driven member 2120) to slide the cable member 2146 between the extended position (shown in dashed lines in FIG. 43) and the retracted position (shown in solid lines in FIG. 43) depending on the direction of rotation of the drive member 2118. In one embodiment, rotation of the drive member 2118 in a clockwise direction or a counter-clockwise direction (when viewing the drive member 2118 of the tensioning device 2110) can facilitate movement of the cable member 2146 into either the retracted position or the extended position, respectively. In another embodiment, rotation of the drive member 2118 in a clockwise direction or a counter-clockwise direction can facilitate movement of the cable member 2146 into either the extended position retraction or the retracted position, respectively. It is to be appreciated that when a lashing member (not shown) is attached to the hooks 2129, 2147, retracting and extending the cable member 2146 can increase and decrease, respectively, the tension on the lashing member.

Figure 44:
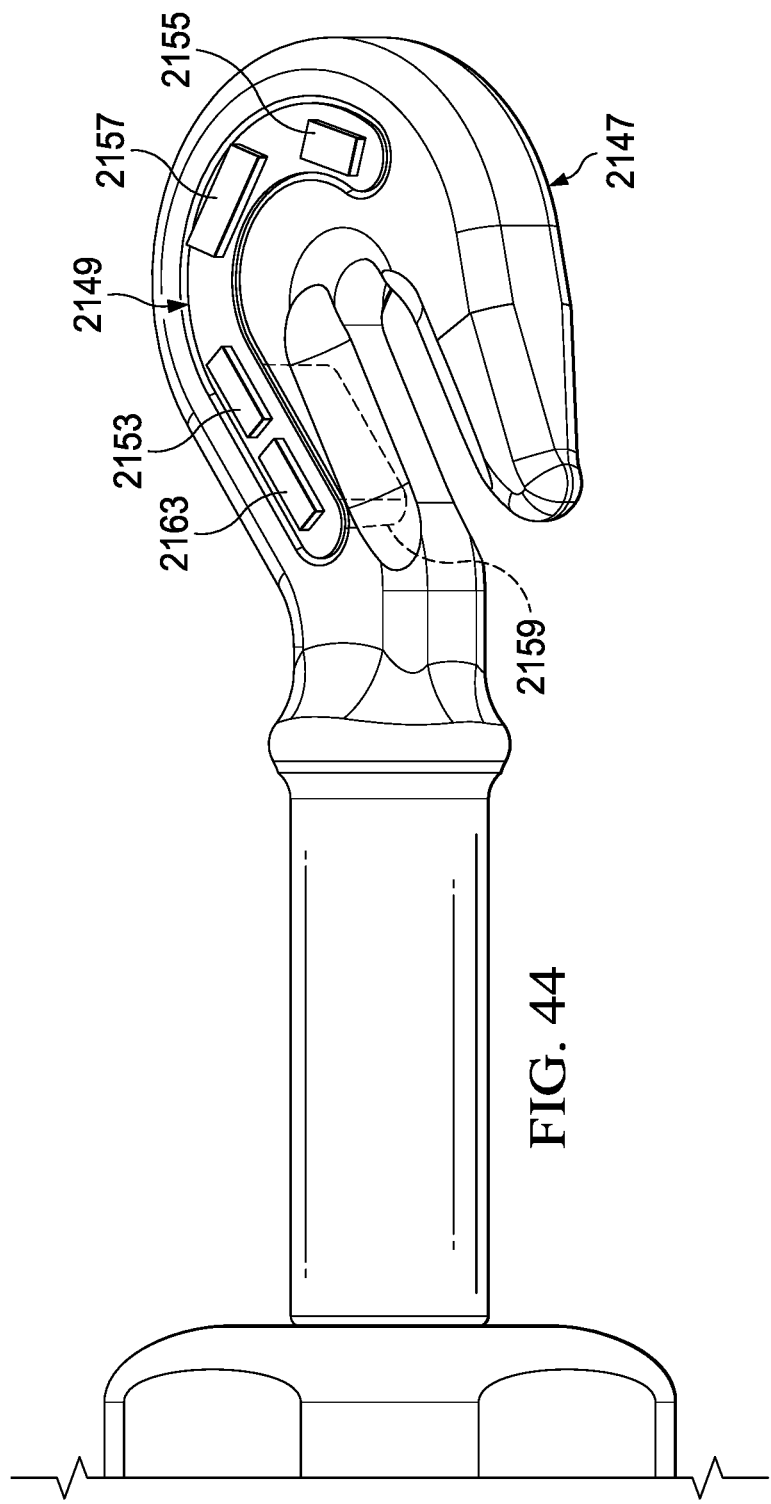
FIG. 44 is an enlarged view of a tension sensor and a hook of the tensioning device of FIG. 41.
Figure 45:
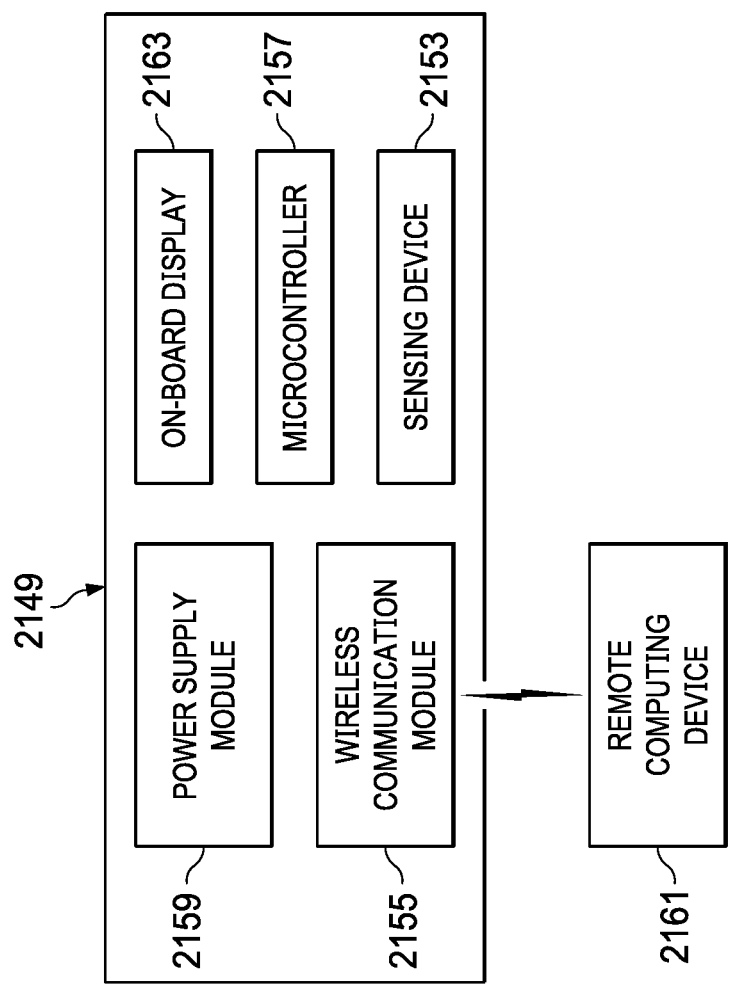
FIG. 45 is a schematic view of the tension sensor of FIG. 44.

Referring now to FIGS. 44 and 45, the hook 2147 can include a tension sensor 2149 that is configured to facilitate detection of a tension applied by the tensioning device 2110 (e.g., between the hooks 2129, 2147). As illustrated in FIGS. 44 and 45, the tension sensor 2149 can comprise a sensing device 2153, a wireless communication module 2155, a microcontroller 2157 (e.g., a control module), and a power supply module 2159. In one embodiment a cover (not shown) can be provided over the tension sensor 2149 to protect the tension sensor 2149 from environmental conditions (e.g., moisture, precipitation, or inadvertent contact). The sensing device 2153 can be configured to detect the tension applied by the tensioning device 2110 (e.g., to the lashing member) as a function of strain (or other forces) imparted on the hook 2147. In one embodiment, the sensing device 2153 can comprise a strain gage or a Hall-effect sensor. However, other sensing devices for detecting strain or other forces are contemplated.

The wireless communication module 2155 can facilitate wireless communication with a remote computing device 2161 via any of a variety of wireless communication protocols such as, for example, near field communication (e.g., Bluetooth, ZigBee), a Wireless Personal Area Network (WPAN) (e.g., IrDA, UWB). The microcontroller 2157 can gather sensor data from the sensing device 2153 for processing and can wirelessly communicate the sensor data (via the wireless communication module 2155) to the remote computing device 2161.

The remote computing device 2161 can be a smartphone (e.g., an iOS or Android device), a laptop computer, a tablet, or a desktop computer, for example. The remote computing device 2161 can have an application loaded thereon that is configured to analyze the data from the tension sensor 2149 to display a tension value and/or generate a warning, when appropriate, such that the tension sensor 2149 and the remote computing device 2161 cooperate to provide a monitoring system (e.g., an internet of things (IoT) system) for the tensioning device 2110. In some arrangements, the tension sensor 2149 can communicate directly (e.g., via a cellular connection) with a remote server (e.g., a cloud-based server) that is accessed by the remote computing device 2161. In one embodiment, the tension sensor 2149 can include an on-board display 2163 that displays a tension value to a user at the hook 2147.

The power supply module 2159 can facilitate onboard powering of the sensing device 2153, the wireless communication module 2155, and the microcontroller 2157 and can comprise an integrated power storage device such as a disposable battery, a rechargeable battery, a super capacitor or any of a variety of suitable alternative power storage arrangements. A rechargeable battery pack can be recharged through any of a variety of power sources, such as a wall plug, a solar panel, or energy harvested from a nearby communication device (e.g., a passively powered device). In one embodiment, as illustrated in FIG. 44, the power supply module 2159 can be embedded within the hook 2147.

It is to be appreciated that although a tension sensor is described, any of a variety of suitable alternative sensors are contemplated for monitoring different physical parameters of the tensioning device, such as temperature, location (e.g., GPS), inclination angle, or moisture, for example. It is also be appreciated that although the tension sensor 2149 is shown to be provided on the hook 2147, the tension sensor 2149, or any other sensor, can be provided at any of a variety of internal or external locations along the tensioning device 2110.

One example scenario of using the tensioning device 2110 to tighten a lashing member will now be described. First, the cable member 2146 of the tensioning device 2110 can be provided in the extended position (as illustrated in solid lines in FIG. 43) or near the extended position. A lashing member that has been routed around/over an article can be attached at each end to one of the hooks 2129, 2147. A user can then rotate the drive member 2118 (e.g., with a hand tool or power tool) in a tightening direction (e.g., clockwise) to begin retracting the cable member 2146 into the housing 2122 and tightening the lashing member. The tension sensor 2149 can detect the tension on the lashing member (via the hook 2147) and can display the tension to the user (either on an on-board display or a remote computing device). As the user continues to rotate the drive member 2118 to increase the tension on the lashing member increases, the user can monitor the tension value displayed to the user on the remote computing device 2161 and/or on the on-board display 2163. Once lashing has reached a desired tension, the user can stop rotating the drive member 2118. In one embodiment, the tension sensor 2149 and/or the remote computing device 2161 can be programmed with a predefined threshold tension value and can alert the user (e.g., visually or audibly) when the tension has reached or exceeded the threshold tension value. To release the lashing member, the user can rotate the drive member 2118 in a loosening direction (e.g., a counter-clock wise direction).

In one embodiment, the tensioning device 2110 can be used in the trucking industry for securing loads on a long haul trailer. In such an embodiment, the tension sensor 2149 can be configured to communicate directly with an onboard fleet management computing system. The tension detected by the tensioning member can be wirelessly transmitted to the onboard fleet management computing system (e.g., via Bluetooth) and displayed to an operator of the tractor trailer. When the tension falls below a predetermined threshold, such as due to the load shifting or breaking loose, an alarm can be presented to the operator.

Figure 46:
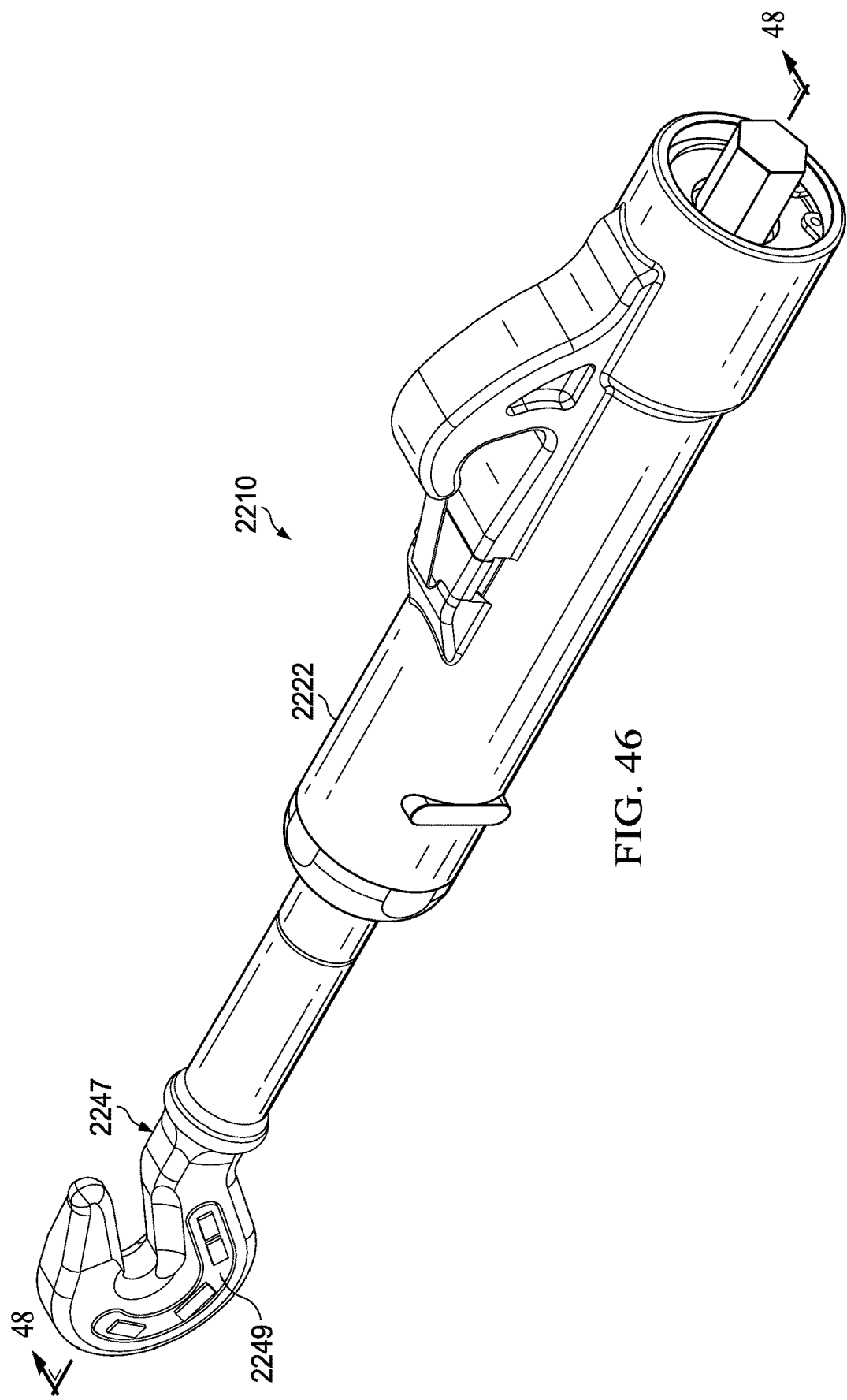
FIG. 46 is an isometric view depicting a tensioning device, in accordance with still yet another embodiment.
Figure 47:
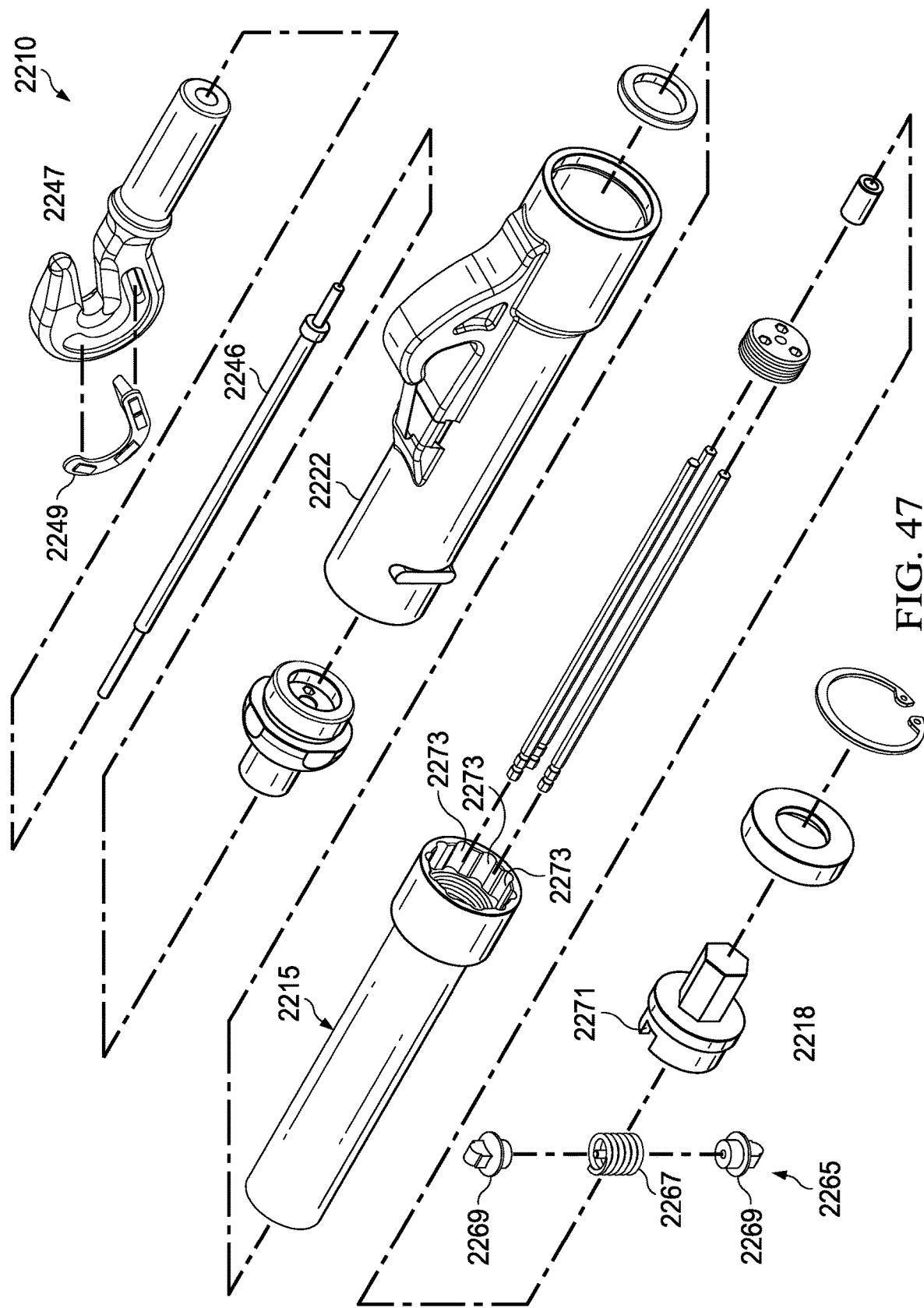
FIG. 47 is an exploded isometric view of the tensioning device of FIG. 46.
Figure 48:
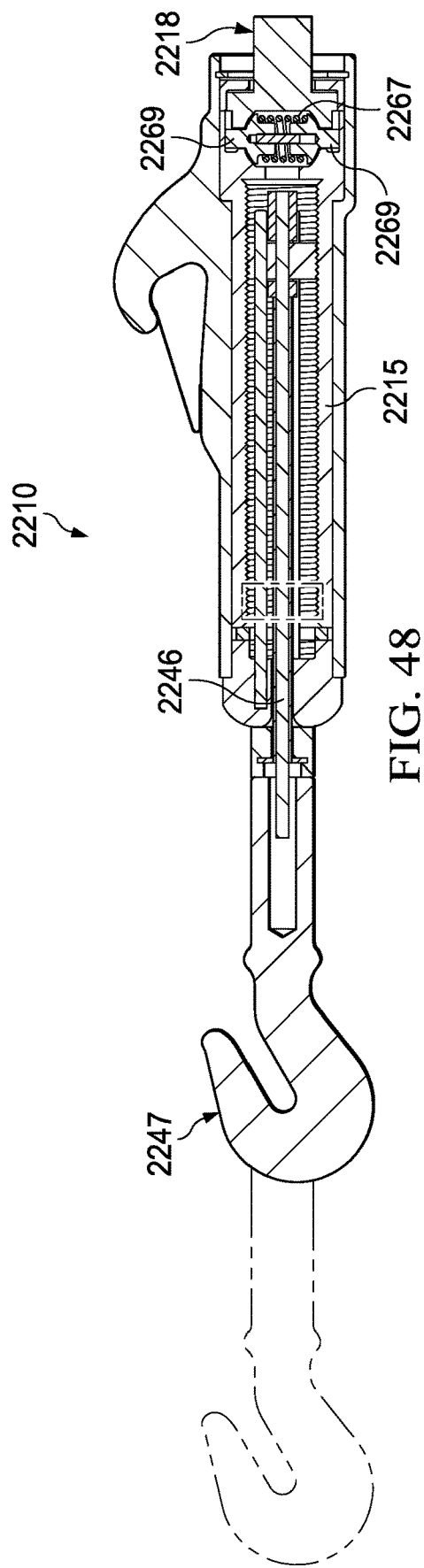
FIG. 48 is a cross sectional view of the tensioning device taken along the line 48-48 of FIG. 46.

An alternative embodiment of a tensioning device 2210 is illustrated in FIGS. 46-48 and can be similar to, or the same in many respects as, the tensioning device 2110 illustrated in FIGS. 41-45. For example, as illustrated in FIGS. 47 and 48, the tensioning device 2210 can include a housing 2222, an inner sleeve 2215, and a drive member 2218 operably coupled with the inner sleeve 2215. The tensioning device 2210 can also include a cable member 2246 coupled with a hook 2247. The hook 2247 can comprise a tension sensor 2249 (FIG. 47). However, the tensioning device 2210 can include a clutch assembly 2265 that facilitates selective, operable coupling between the drive member 2218 and the inner sleeve 2215 and includes a clutch spring 2267 sandwiched between a pair of clutch pins 2269. The clutch spring 2267 and the clutch pins 2269 can be disposed in a notch 2271 (FIG. 47) defined by the drive member 2218. The clutch pins 2269 can each reside in one of a plurality of interior slots 2273 (FIG. 47) defined by the inner sleeve 2215. During rotation of the drive member 2218, the clutch pins 2269 can extend into the interior slots 2273 to couple the drive member 2218 with the inner sleeve 2215. Once the torque applied to the drive member 2218 exceeds a predefined threshold, the clutch pins 2269 can slip out of the interior slots 2273 which can decouple the drive member 2218 from the inner sleeve 2215 (e.g., clutch out) and can provide audible and/or tactile feedback that proper cable tension has been obtained. It is to be appreciated that the predefined threshold torque can be a function of the spring constant of the clutch spring 2267, the configuration of the clutch pins 2269 and/or the configuration of the interior slots 2273. It is to also be appreciated that the tension applied by the cable member 2246 can be proportional to the torque applied to the drive member 2218 (e.g., input torque).

Figure 49:
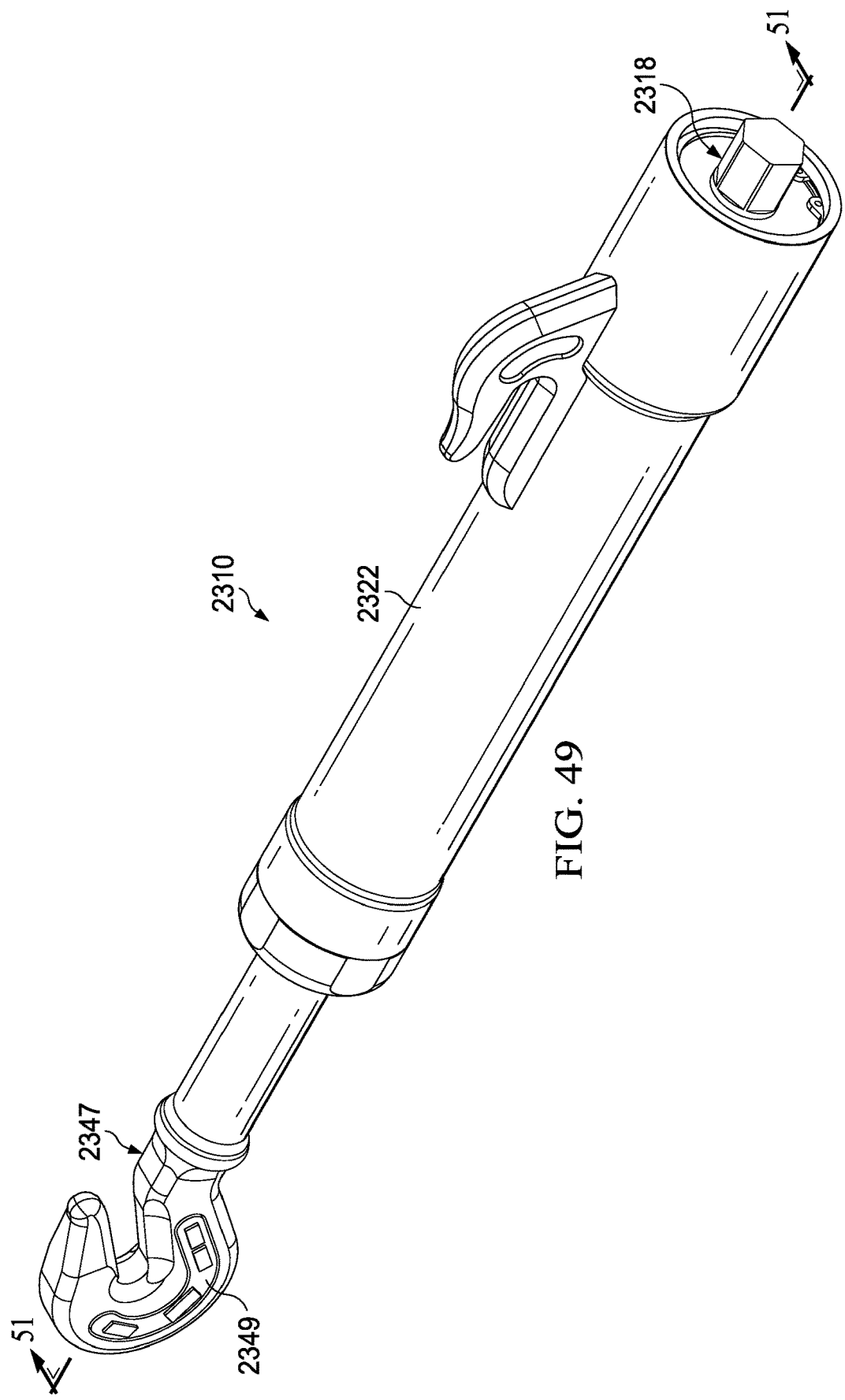
FIG. 49 is an isometric view depicting a tensioning device, in accordance with still yet another embodiment.
Figure 50:
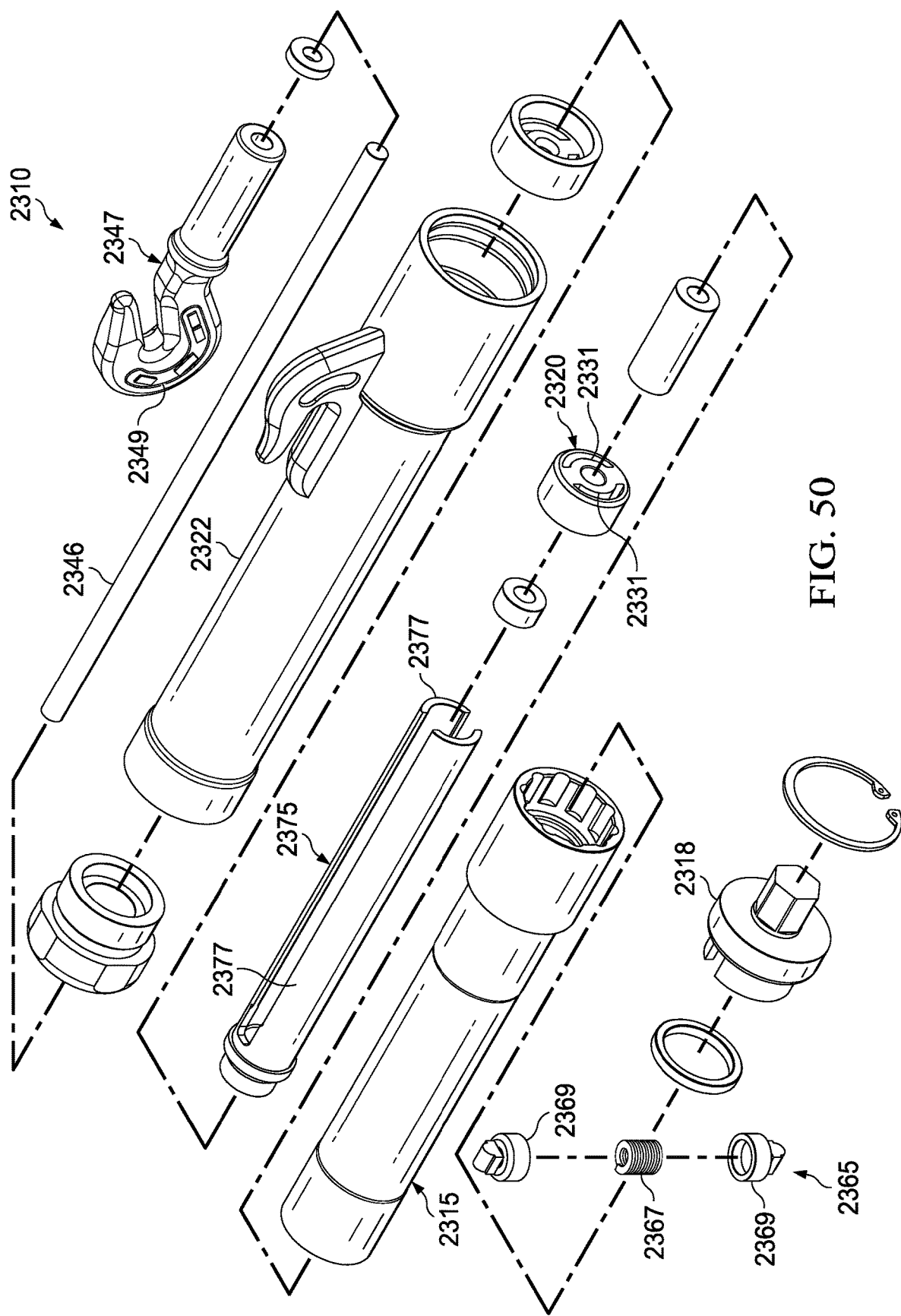
FIG. 50 is an exploded isometric view of the tensioning device of FIG. 49.
Figure 51:
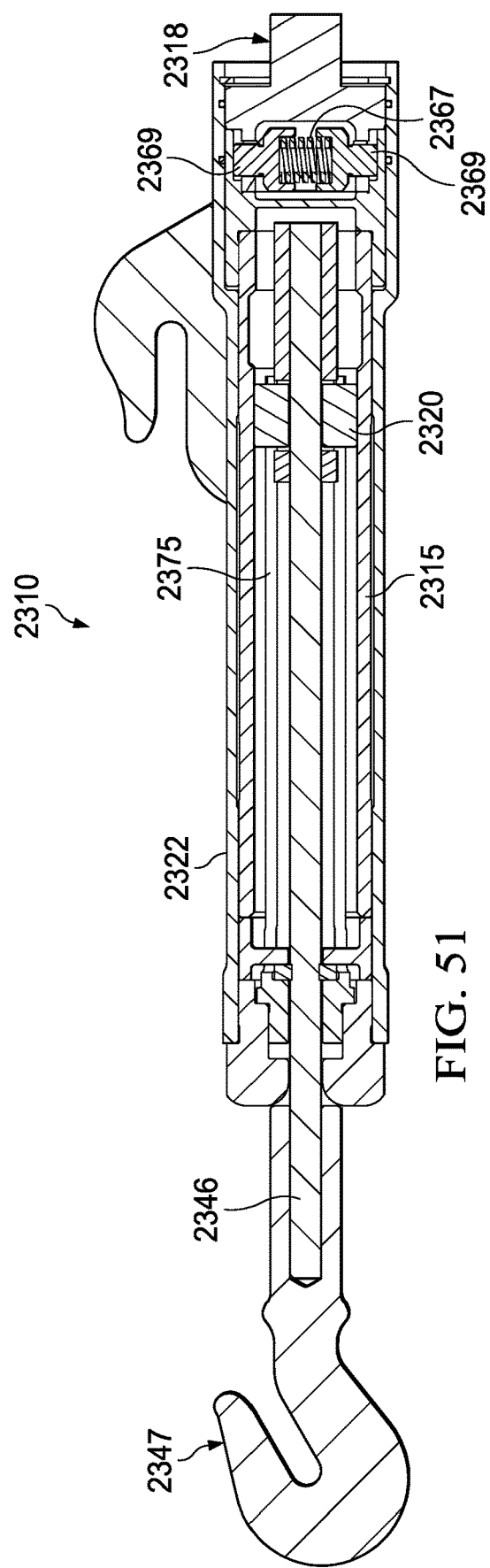
FIG. 51 is a cross sectional view of the tensioning device taken along the line 51-51 of FIG. 49.

An alternative embodiment of a tensioning device 2310 is illustrated in FIGS. 49-51 and can be similar to, or the same in many respects as, the tensioning device 2210 illustrated in FIGS. 46-48. For example, as illustrated in FIGS. 49-51, the tensioning device 2310 can include a housing 2322, an inner sleeve 2315, and a drive member 2318 operably coupled with the inner sleeve 2315. The tensioning device 2310 can also include a cable member 2346 coupled with a hook 2347. The hook 2347 can comprise a tension sensor 2349. The tensioning device 2310 can include a clutch assembly 2365 that facilitates selective operable coupling between the drive member 2318 and the inner sleeve 2315 and includes a clutch spring 2367 sandwiched between a pair of clutch pins 2369. However, the tensioning device 2310 can include an anti-rotation sleeve 2375 (in lieu of the anti-rotation members 2130 illustrated in FIGS. 42 and 43). The anti-rotation sleeve 2375 can include a pair of arms 2377 that extend through apertures 2331 in a driven member 2320. The driven member 2320 can slide along the arms 2377 without rotating when the drive member 2318 is rotated.

Figure 52:
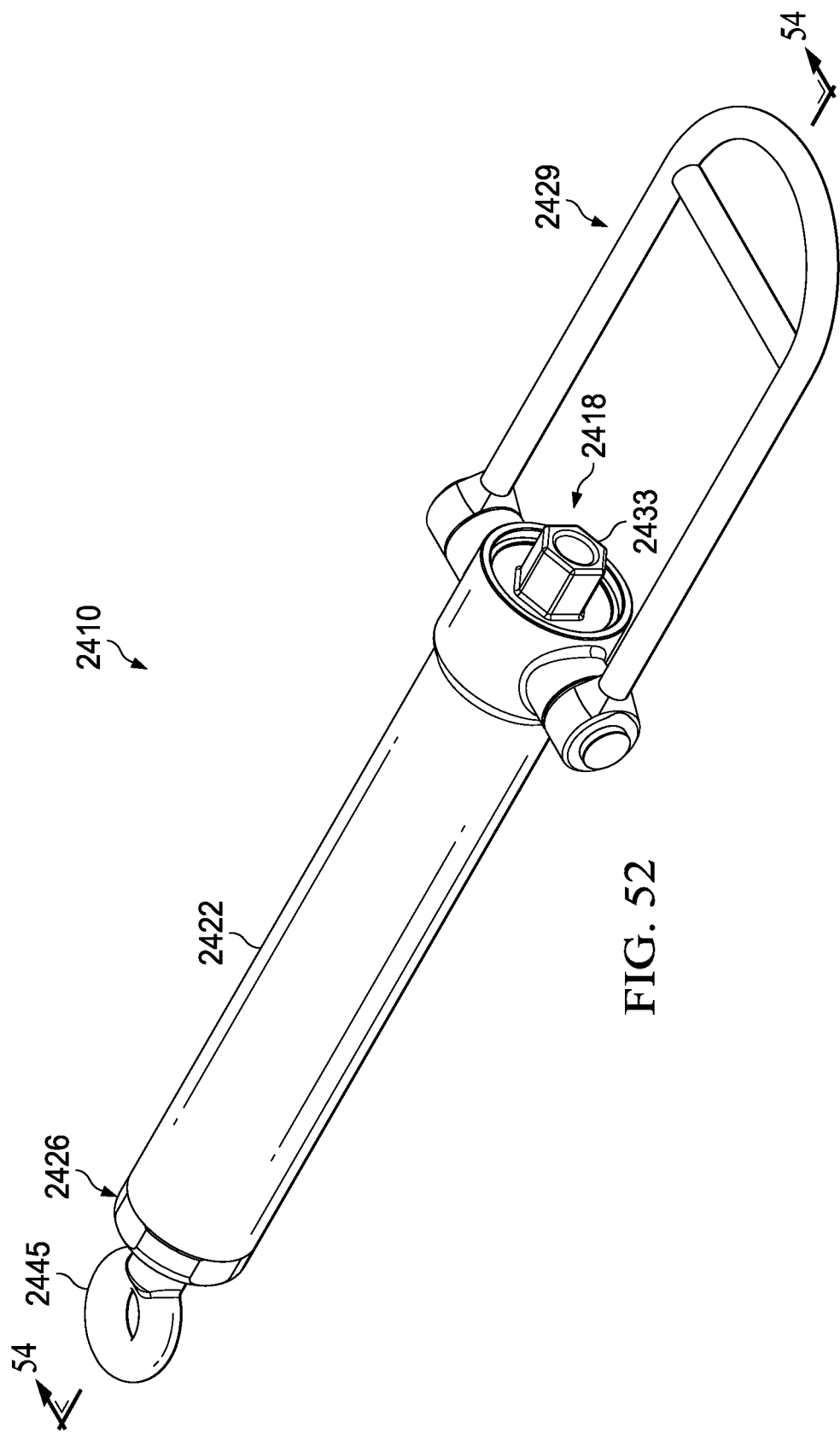
FIG. 52 is an isometric view depicting a tensioning device, in accordance with still yet another embodiment.
Figure 53:
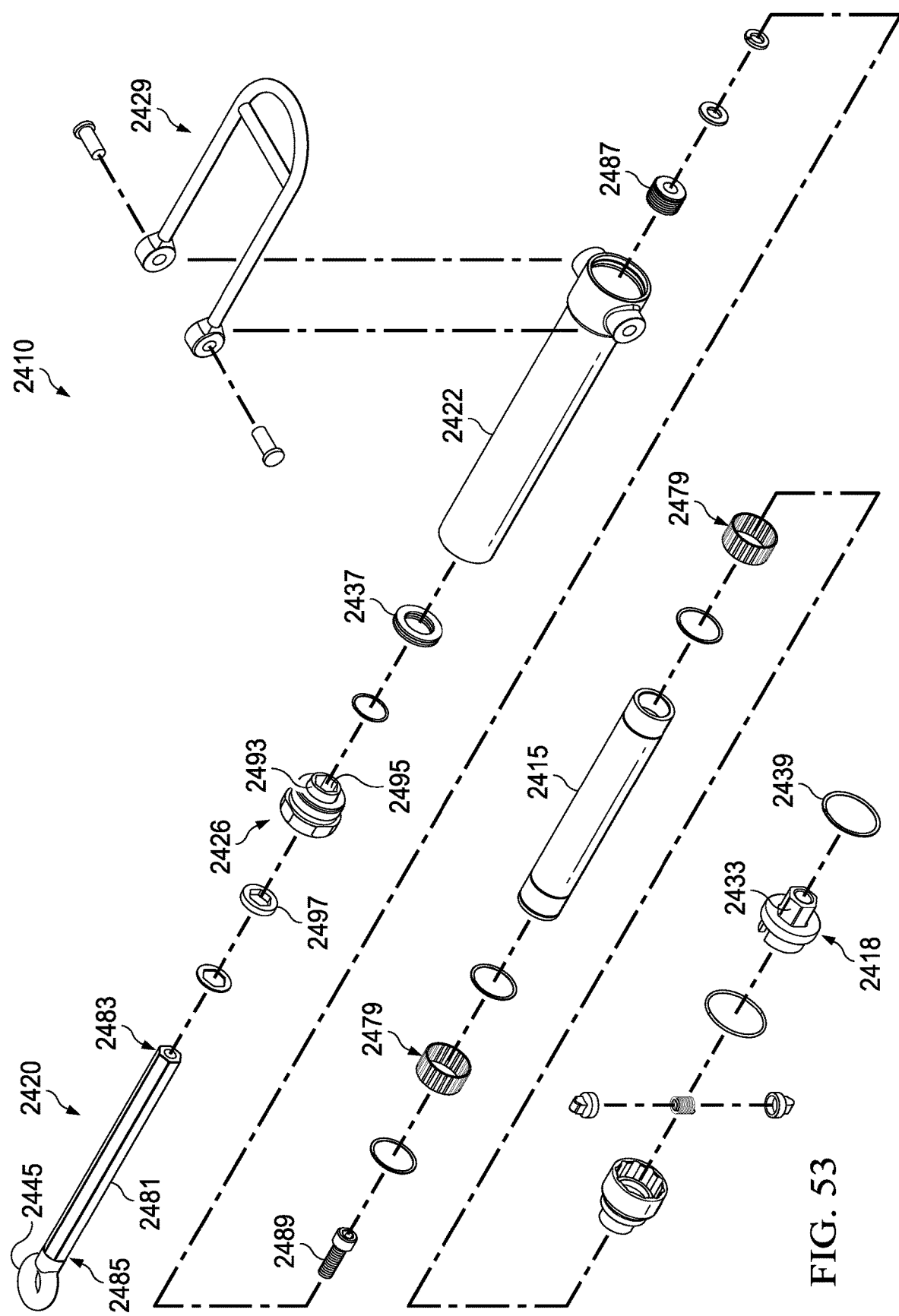
FIG. 53 is an exploded isometric view of the tensioning device of FIG. 52.
Figure 54:
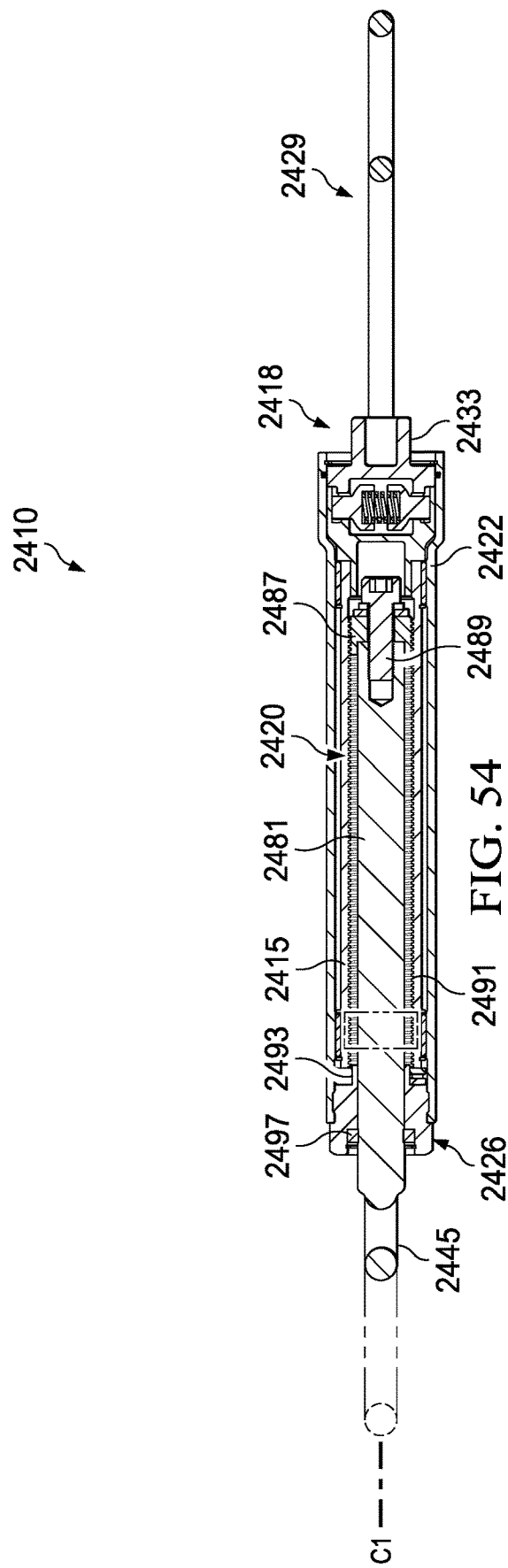
FIG. 54 is a cross sectional view of the tensioning device taken along the line 54-54 of FIG. 52.

An alternative embodiment of a tensioning device 2410 is illustrated in FIGS. 52-54 and can include features that are similar to, or the same in many respects as, various features of the tensioning devices described above, such as, for example, tensioning devices 2110, 2210, and 2310 of FIGS. 41-45, 46-48, and 49-51, respectively. As illustrated in FIGS. 52 and 53, the tensioning device 2410 can include an inner sleeve 2415 and a housing 2422. The inner sleeve 2415 can be disposed within the housing 2422 and rotatably coupled with the housing 2422. In one embodiment, a pair of roller bearings 2479 can be interposed between the housing 2422 and the inner sleeve 2415 to journal the inner sleeve 2415 relative to the housing 2422. It is to be appreciated that the inner sleeve 2415 can be rotatably coupled with the housing 2422 in any of a variety of suitable alternative arrangements.

As illustrated in FIG. 53, a driven member 2420 can include a body 2481 that includes a proximal end 2483 and a distal end 2485. A ring member 2445 can be coupled with the distal end 2485 of the body 2481. In one embodiment, the body 2481 and the ring member 2445 can be formed together in a one-piece construction (e.g., through forging) but in other embodiments, the body 2481 and the ring member 2445 can be separate components that are fastened together (e.g., through welding or with fasteners). A threaded collar 2487 can be coupled with the proximal end 2483 by a fastener 2489 or through any of a variety of suitable alternative coupling arrangements (e.g., welding or formed together with the body 2481 as a unitary one-piece construction). It is to be appreciated that, although a ring member is illustrated and described, any of a variety of suitable alternative attachment features can be provided as part of the driven member such as, for example, a hook, a bolt, a cleat, or a ring member, and/or at other locations on the driven member 2420 to facilitate attachment of the driven member 2420 to a lashing member.

The driven member 2420 can be movably coupled with the inner sleeve 2415. As illustrated in FIG. 54, the driven member 2420 can extend into the inner sleeve 2415 such that the threaded collar 2487 is disposed in the inner sleeve 2415. The inner sleeve 2415 can include an interior threaded surface 2491 (FIG. 54) that threadably engages the threaded collar 2487 such that the inner sleeve 2415 and the threaded collar 2487 are threadably coupled together. When the inner sleeve 2415 is rotated relative to the housing 2422, the interior threaded surface 2491 can rotate relative to the threaded collar 2487 to facilitate linear movement (e.g., translation) of the driven member 2420 along a centerline C1 relative to the inner sleeve 2415 and the housing 2422 between an extended position (shown in dashed lines in FIG. 54) and a retracted position (shown in solid lines in FIG. 54).

As illustrated in FIGS. 52-54, the tensioning device 2410 can include a saddle member 2429 disposed at an opposite end of the housing 2422 as the ring member 2445. The saddle member 2429 can cooperate with one another to facilitate attachment of the tensioning device 2410 to a lashing member (not shown). In one embodiment, the saddle member 2429 can be pivotally coupled with the housing 2422, but in other embodiments the saddle member 2429 be pivotally or rigidly coupled with the housing 2422 in any of a variety of suitable alternative manners. It is to be appreciated that, although a saddle member is illustrated and described, any of a variety of suitable alternative attachment features can be provided on the housing 2422 such as, for example, a hook, a bolt, a cleat, or a ring member, and/or at other locations on the tensioning device 2410 to facilitate attachment of the housing 2422 to a lashing member.

Referring now to FIGS. 53 and 54, the tensioning device 2410 can include a cap 2426 that surrounds the body 2481 of the driven member 2420 and is coupled with an end of the housing 2422. A thrust washer 2437 can be sandwiched between the inner sleeve 2415 and the cap 2426 to facilitate journaling of the inner sleeve 2415 with respect to the housing 2422. In one embodiment, the cap 2426 can be threaded into the housing 2422, but in other embodiments can be coupled with the housing 2422 in any of a variety of suitable alternative arrangements. The cap 2426 can include a guide member 2493 that defines a passageway 2495 (FIG. 53) through which the body 2481 of the driven member 2420 extends. A gasket 2497 can be provided at the interface between the body 2481 of the driven member 2420 and the guide member 2493 to provide an effective seal therebetween for restricting contaminants from being introduced into the housing 2422 between the driven member and the guide member 2493. In some embodiments, an O-ring, a bushing, or other suitable sealing arrangement (not shown) can be provided between the cap 2426 and the housing 2422 for restricting contaminants from being introduced into the housing 2422 between the housing 2422 and the cap 2426.

The body 2481 of the driven member 2420 and the passageway 2495 can each have complimentary non-circular cross-sectional shapes (taken at a cross-section that is orthogonal to the centerline C1) such that the guide member 2493 mates with the body 2481 to prevent rotation of the driven member 2420 during rotation of the inner sleeve 2415. In one embodiment, as illustrated in FIG. 53, each of the body 2481 of the driven member 2420 and the passageway 2495 can have a hexagonal cross-sectional shape. It is to be appreciated, however, that the body 2481 of the driven member 2420 and the passageway 2495 can have other non-circular cross sectional shapes, including other polygonal shapes, that facilitate mated interaction between the body 2481 of the driven member 2420 and the guide member 2493 to prevent rotation of the driven member 2420. It is also to be appreciated that the guide member 2493 can be any of a variety of suitable alternative arrangements for preventing rotation of the driven member 2420 and can be coupled with the housing in any of a variety of suitable alternative arrangements. For example, a guide member can be separate from a cap (e.g., 2426) and disposed entirely within a housing (e.g., 2422).

A drive member 2418 can be rotatably coupled with the housing 2422 and operably coupled with the inner sleeve 2415 such that rotation of the drive member 2418 facilitates rotation of the inner sleeve 2415 relative to the housing 2422. In one embodiment, the tensioning device 2410 can include a clutch assembly 2265 that facilitates selective, operable coupling between the drive member 2218 and the inner sleeve 2215 and includes a clutch spring 2267 sandwiched between a pair of clutch pins 2269. The clutch spring 2267 and the clutch pins 2269 can be disposed in a notch 2271 (FIG. 47) defined by the drive member 2218. The clutch pins 2269 can each reside in one of a plurality of interior slots 2273 (FIG. 47) defined by the inner sleeve 2215. During rotation of the drive member 2218, the clutch pins 2269 can extend into the interior slots 2273 to couple the drive member 2218 with the inner sleeve 2215. Once the torque applied to the drive member 2218 exceeds a predefined threshold, the clutch pins 2269 can slip out of the interior slots 2273 which can decouple the drive member 2218 from the inner sleeve 2215 (e.g., clutch out) and can provide audible and/or tactile feedback that proper cable tension has been obtained. It is to be appreciated that the predefined threshold torque can be a function of the spring constant of the clutch spring 2267, the configuration of the clutch pins 2269 and/or the configuration of the interior slots 2273. It is to also be appreciated that the tension applied by the cable member 2246 can be proportional to the torque applied to the drive member 2218 (e.g., input torque). In another embodiment, the drive member 2418 can be rigidly attached to the inner sleeve 2415 through welding, with adhesives, or via an intermeshing arrangement. In yet another embodiment, the drive member 2418 and the inner sleeve 2415 can be provided as a unitary one-piece construction. The drive member 2418 can include a drive head 2433 that is configured to mate with a wrench or a socket to facilitate manual or powered rotation of the drive member 2418 with the tool. A retaining ring 2439 (FIG. 53) can be provided over the drive member 2418 to facilitate retention of the inner sleeve 2415, the drive member 2418, and the driven member 2420 within the housing 2422.

The drive member 2418 can accordingly be operably coupled with the driven member (via the inner sleeve 2415) such that driven member 2420 can slide along the centerline C1 (which can be parallel to a rotational axis of the drive member 2418). In one embodiment, as illustrated in FIGS. 52-54, the driven member 2420 can slide along an axis that is coaxial with the rotational axis of the drive member 2418. The drive member 2418 can accordingly be rotated to facilitate selective extension and retraction of the ring member 2445 (via the driven member 2420) with respect to the housing 2422. For example, when the drive member 2418 is rotated (e.g., with a tool), the inner sleeve 2415 can correspondingly rotate with respect to the housing 2422. When the inner sleeve 2415 rotates, the guide member 2493 can prevent the driven member 2420 from rotating which can cause the driven member 2420 to move linearly along the inner sleeve 2415 (e.g., due to the threaded engagement between the inner sleeve 2415 and the threaded collar 2487) to slide the driven member 2420 between the extended position (shown in dashed lines in FIG. 54) and the retracted position (shown in solid lines in FIG. 54) depending on the direction of rotation of the drive member 2418. In one embodiment, rotation of the drive member 2418 in a clockwise direction or a counter-clockwise direction (when looking at the drive member 2418 of the tensioning device 2410 along the centerline C1) can facilitate movement of the driven member 2420 into either the retracted position or the extended position, respectively. In another embodiment, rotation of the drive member 2418 in a clockwise direction or a counter-clockwise direction can facilitate movement of the driven member 2420 into either the extended position retraction or the retracted position, respectively. It is to be appreciated that when a lashing member (not shown) is attached to the saddle member 2429 and the ring member 2445, retracting and extending the driven member 2420 can increase and decrease, respectively, the tension on the lashing member.

Figure 55:
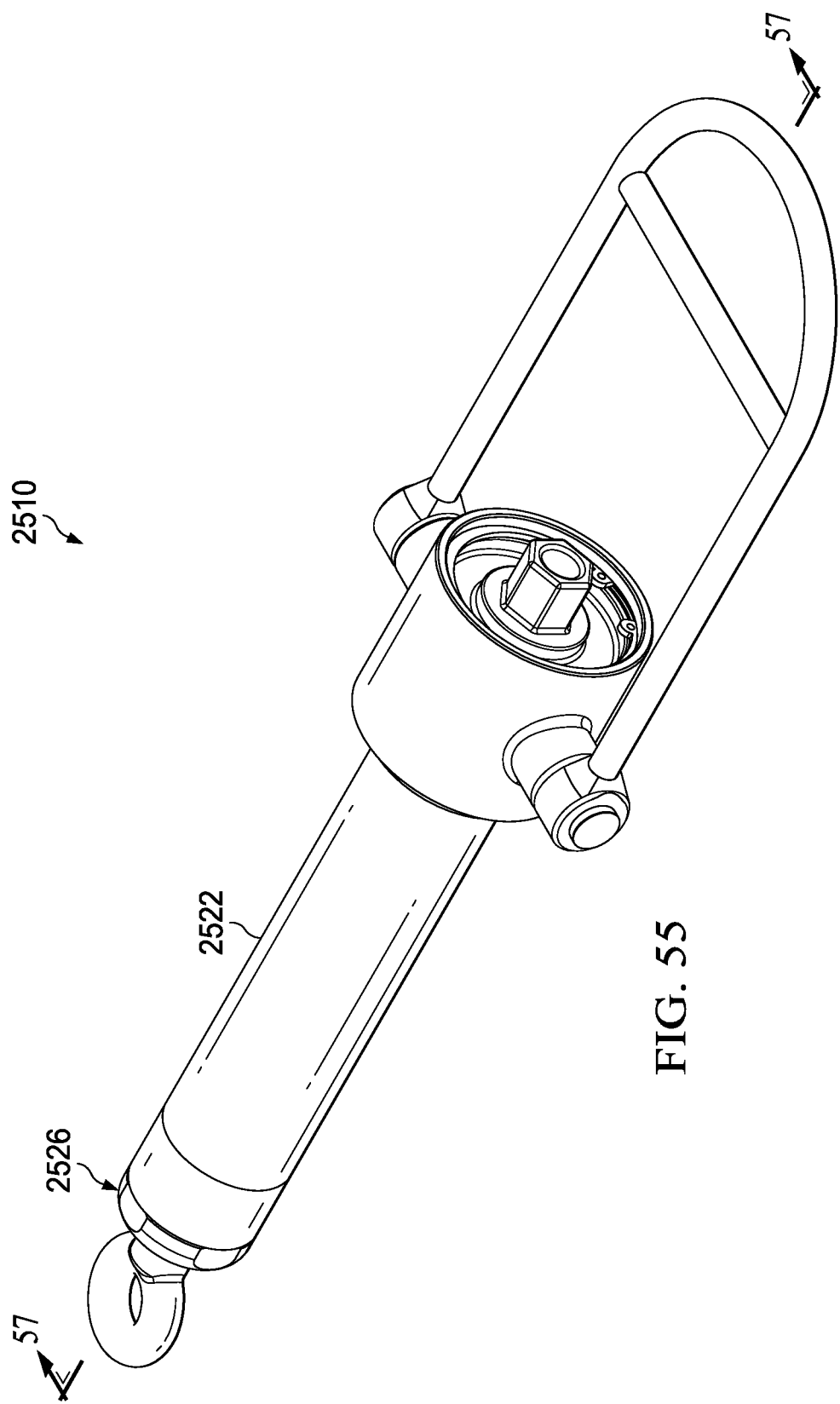
FIG. 55 is an isometric view depicting a tensioning device, in accordance with still yet another embodiment.
Figure 56:
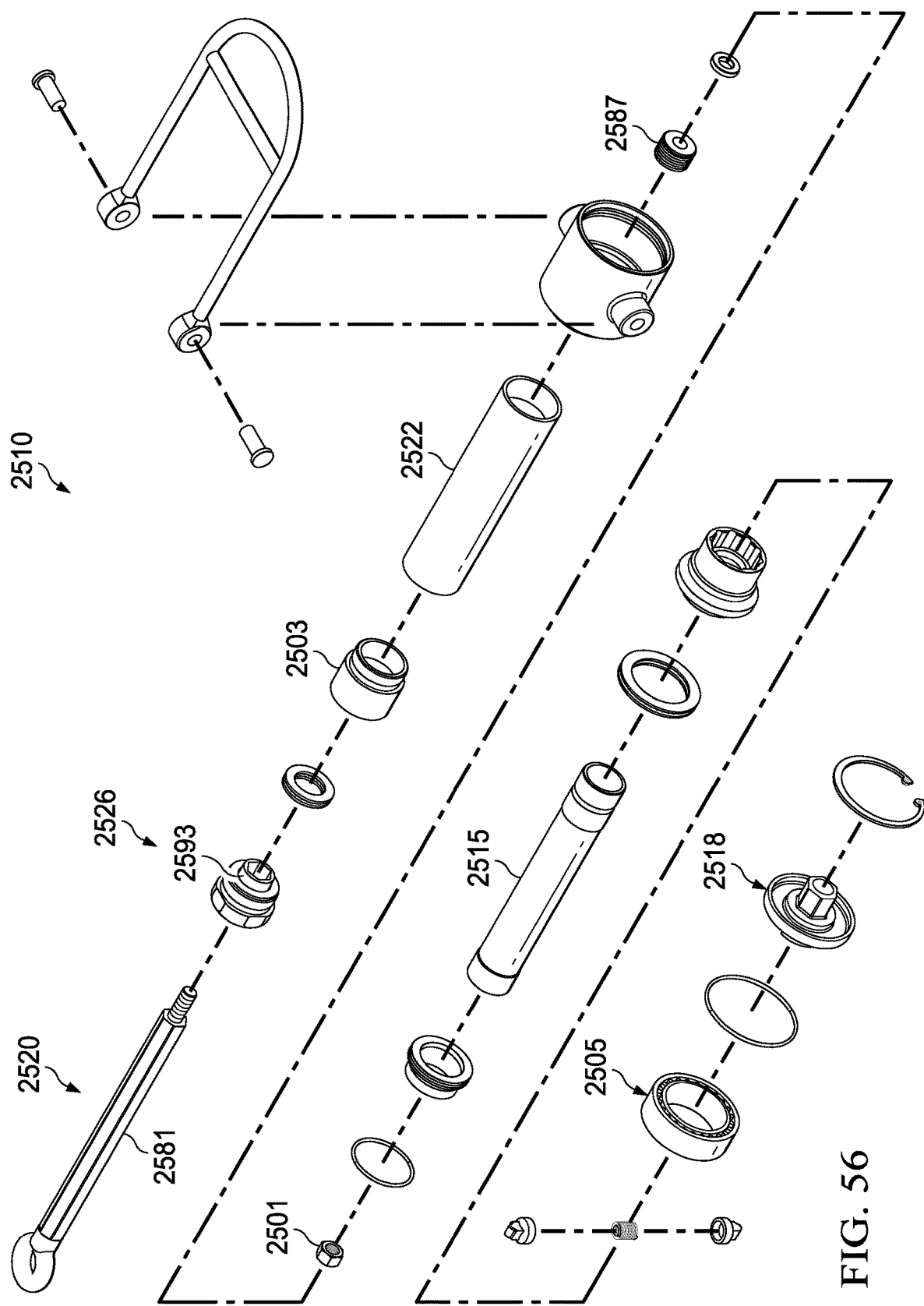
FIG. 56 is an exploded isometric view of the tensioning device of FIG. 55.
Figure 57:
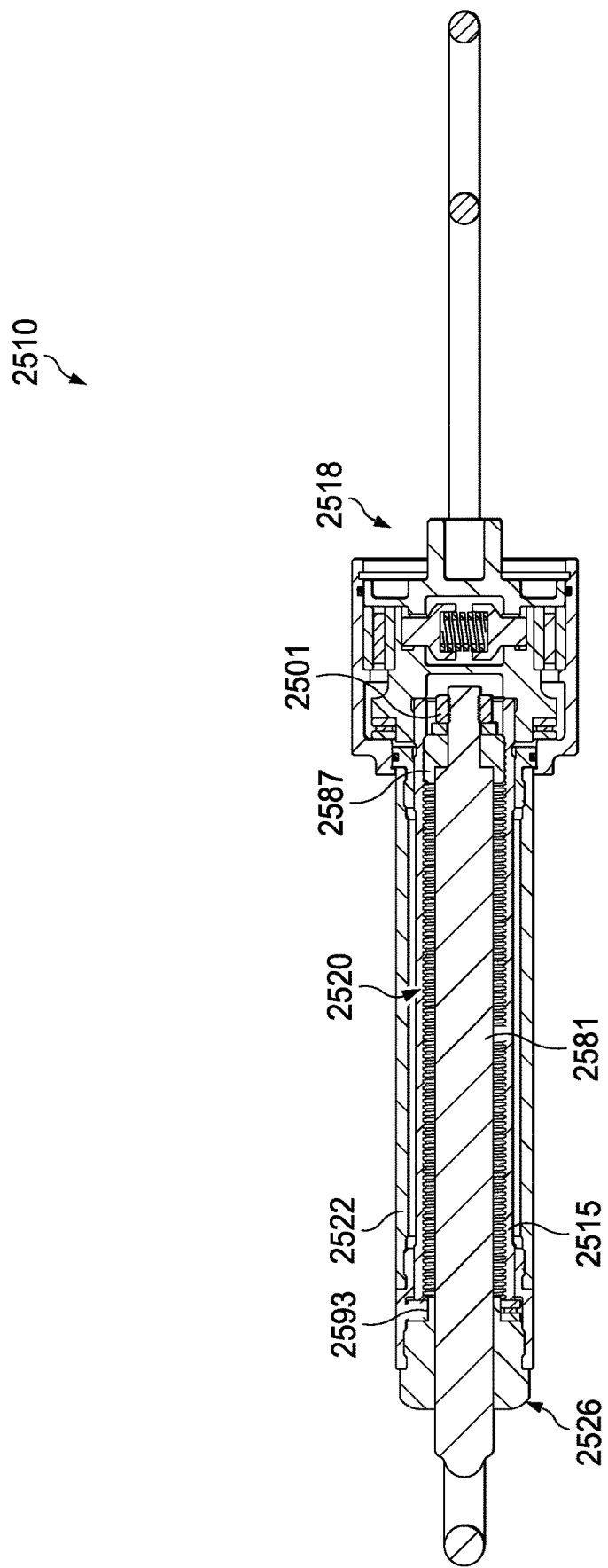
FIG. 57 is a cross sectional view of the tensioning device taken along the line 56-56 of FIG. 54.

An alternative embodiment of a tensioning device 2510 is illustrated in FIGS. 55-57 and can be similar to, or the same in many respects as, the tensioning device 2410 illustrated in FIGS. 52-54. For example, as illustrated in FIGS. 56 and 57, the tensioning device 2510 can include a housing 2522, an inner sleeve 2515, a drive member 2518 operably coupled with the inner sleeve 2515, a driven member 2520, and a cap 2526. A threaded collar 2587 can be coupled with a body 2581 of the driven member 2520. The cap 2526 can include a guide member 2593. However, the tensioning device 2510 can include nut 2501 that facilitates releasable coupling of body 2581 of the driven member 2520 with the threaded collar 2587. In an alternative embodiment, a crimped collar can be provided in lieu of the nut 2501.

The tensioning device 2510 can also include an intermediate cap 2503 that is interposed between the housing 2522 and the cap 2526 and facilitates attachment of the cap 2526 to the housing 2522. A bearing 2505 can be associated with the drive member 2518 to facilitate journaling of the drive member 2518 and other associated components with respect to the housing 2522.

Figure 58:
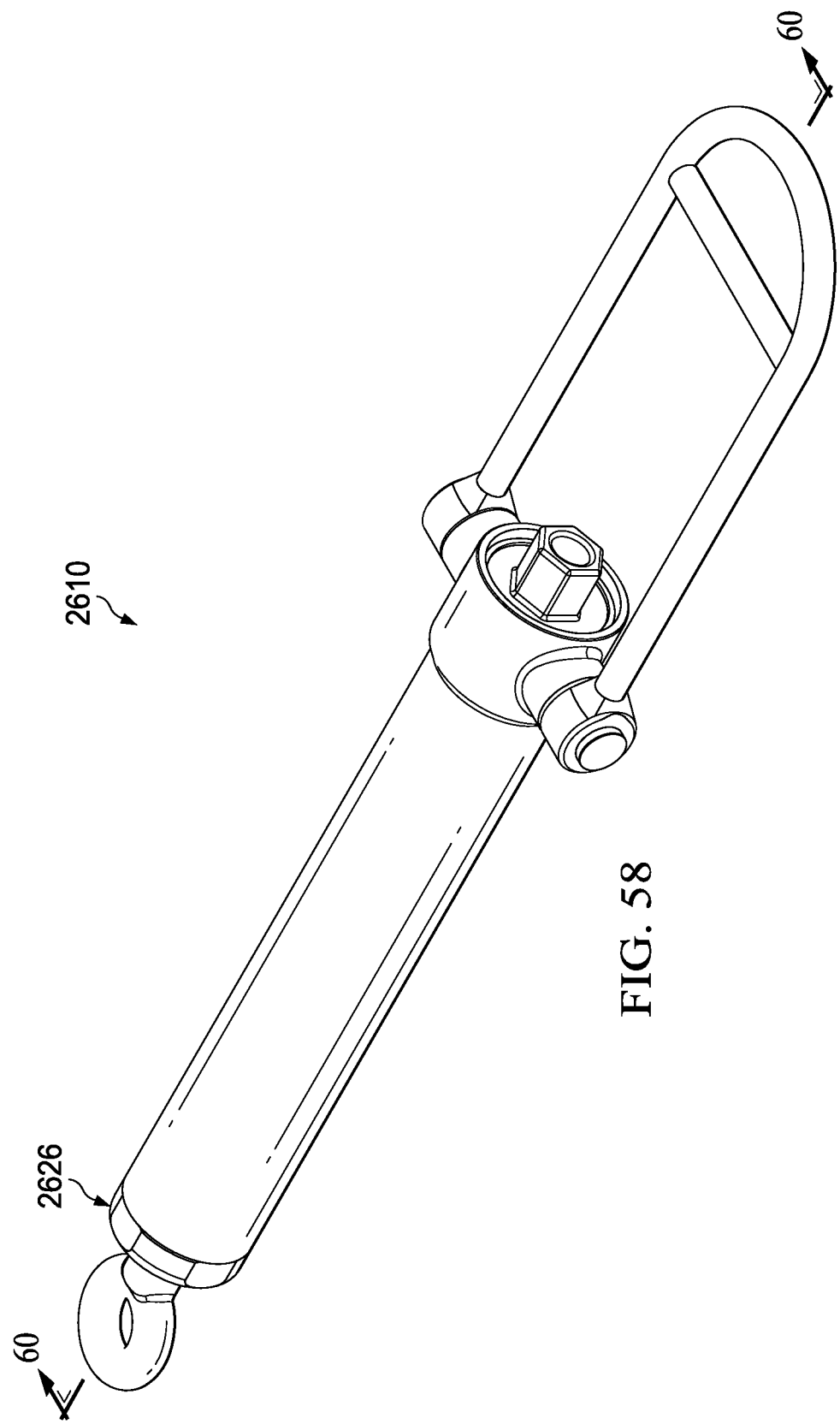
FIG. 58 is an isometric view depicting a tensioning device, in accordance with still yet another embodiment.
Figure 59:
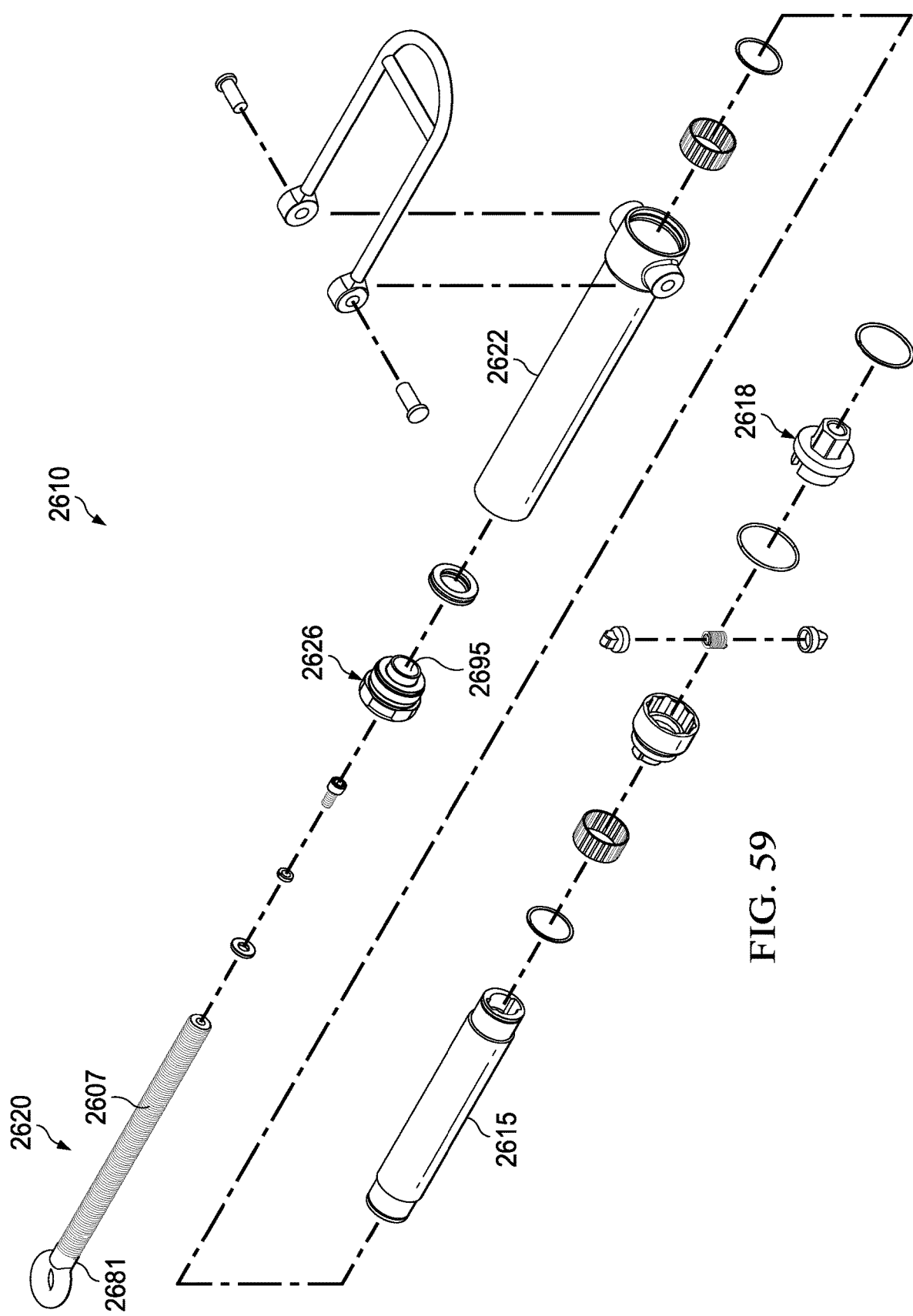
FIG. 59 is an exploded isometric view of the tensioning device of FIG. 58.
Figure 60:
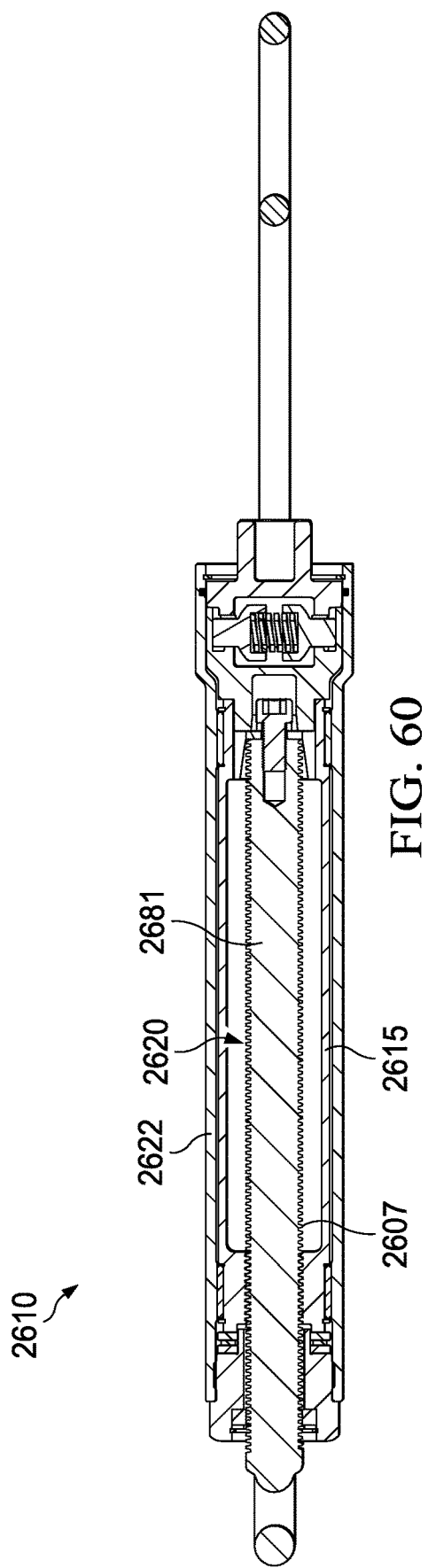
FIG. 60 is a cross sectional view of the tensioning device taken along the line 60-60 of FIG. 58.

An alternative embodiment of a tensioning device 2610 is illustrated in FIGS. 58-60 and can be similar to, or the same in many respects as, the tensioning device 2410 illustrated in FIGS. 52-54. For example, as illustrated in FIGS. 59 and 60, the tensioning device 2610 can include a housing 2622, an inner sleeve 2615, a drive member 2618 operably coupled with the inner sleeve 2615, a driven member 2620, and a cap 2626. The inner sleeve 2615 can include an interior threaded surface 2491 (FIG. 59). The cap 2626 can define a passageway 2695. However, a body 2681 of the driven member 2620 can include an exterior threaded surface 2607 that is threadably engaged with the interior threaded surface 2691 such that rotation of the inner sleeve 2615 facilitates sliding of the driven member 2620 between a retracted position and an extended position. The body 2681 of the driven member 2620 and the passageway 2695 can have a substantially circular cross-sectional shape to allow the exterior threaded surface 2607 of the body to pass through the cap 2626 during sliding of the driven member 2620.

Figure 61:
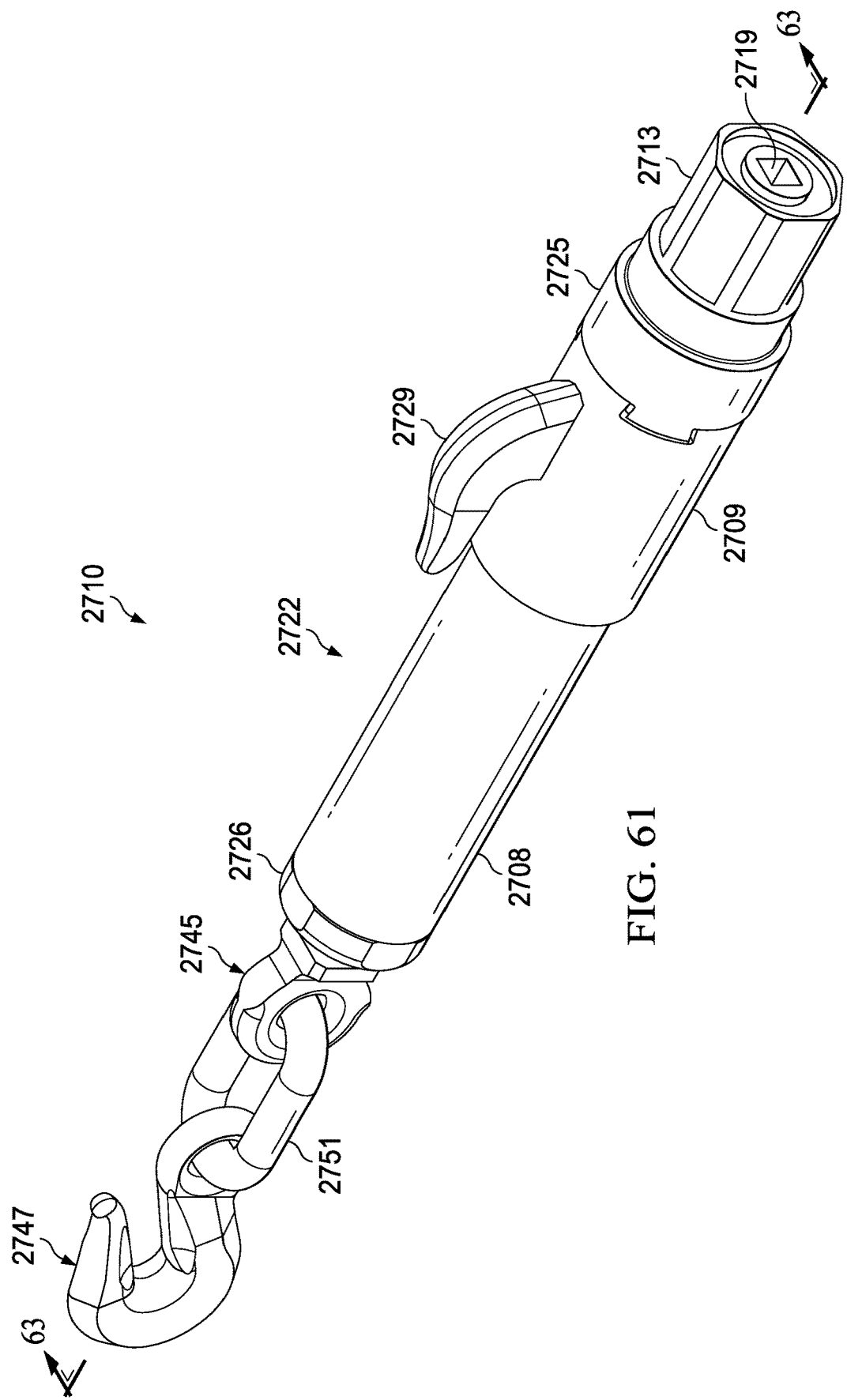
FIG. 61 is an isometric view depicting a tensioning device, in accordance with still yet another embodiment.
Figure 62:
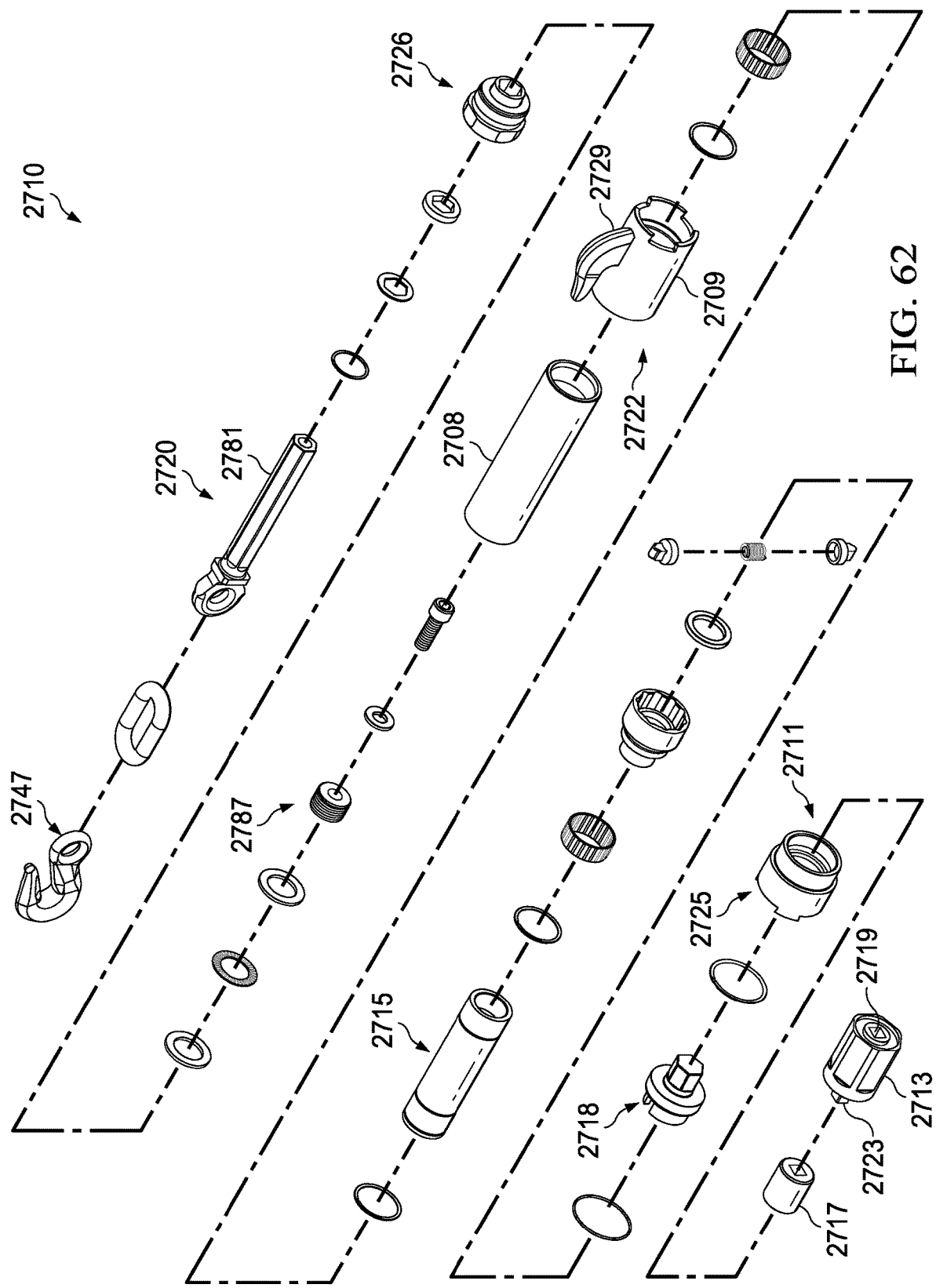
FIG. 62 is an exploded isometric view of the tensioning device of FIG. 61.
Figure 63:
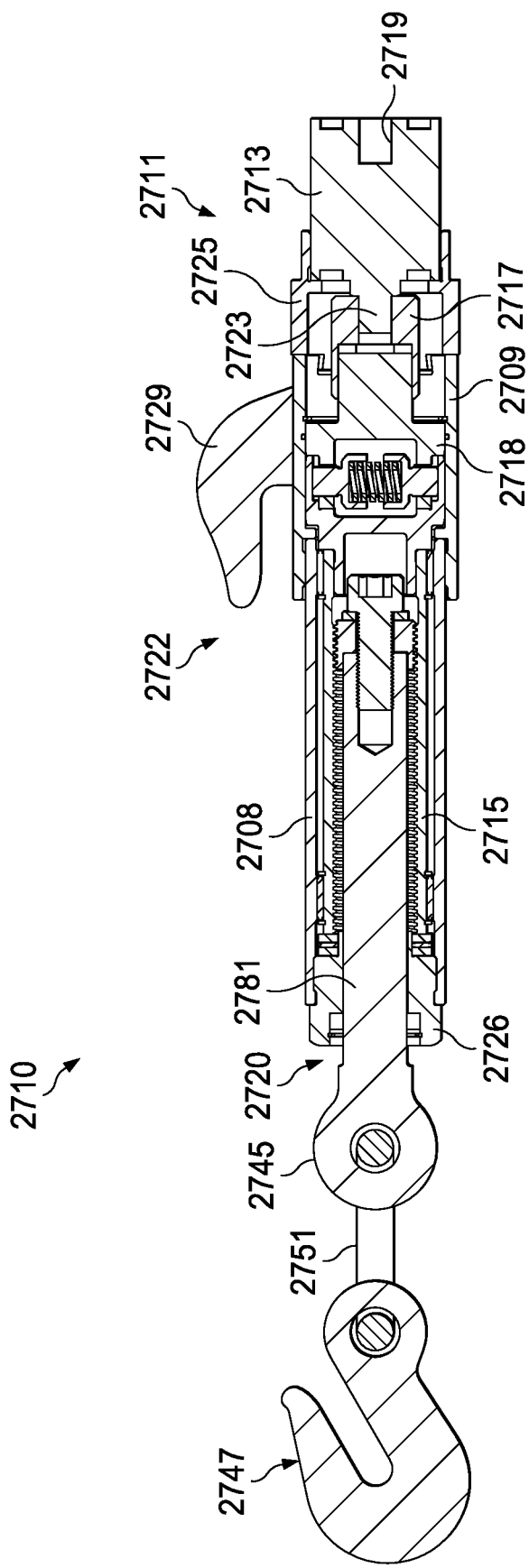
FIG. 63 is a cross sectional view of the tensioning device taken along the line 63-63 of FIG. 61.

An alternative embodiment of a tensioning device 2710 is illustrated in FIGS. 61-63 and can be similar to, or the same in many respects as, the tensioning devices 2410, 2510, 2610, illustrated in FIGS. 52-54, 55-57, and 58-60, respectively. For example, as illustrated in FIGS. 56 and 57, the tensioning device 2710 can include an inner sleeve 2715, a drive member 2718, a driven member 2720, a housing 2722, and a cap 2726. The driven member 2720 can include a body 2781 and a ring member 2745. The housing 2722 can include a hook 2729. A threaded collar 2787 can be coupled with the body 2781. However, the tensioning device 2710 can include a hook 2747 that is coupled to the ring member 2745 via a link 2751. The housing 2722 can include a main body 2708 and a rear interface portion 2709 that is coupled with the main body 2708 (e.g., threadably coupled or welded thereto). The hook 2729 can be coupled with the rear interface portion 2709.

A torque amplifier assembly 2711 can be operably coupled with the drive member 2718. As illustrated in FIGS. 62 and 63, the torque amplifier assembly 2711 can include a torque amplifier 2713 and a coupler 2717. The torque amplifier 2713 can include an input 2719 and an output 2723 that are rotatably coupled together such that rotation of the input 2719 facilitates rotation of the output 2723. The output 2723 can be coupled with the drive member 2718 via the coupler 2717. The torque amplifier 2713 can be rotatably coupled with a sleeve 2725 that is interlocked with the rear interface portion 2709 of the housing 2722. The input 2719 can have square shape (or another shape) to allow a tool, such as a male end of a torque wrench or a ratchet, to interface therewith to facilitate rotation of the input 2719. It is to be appreciated that the input 2719 can alternatively have a male interface that can interface with a wrench, a socket or other tool configured to engage a male interface.

Rotation of the input 2719 (e.g., with a tool) can rotate the output 2723 which can rotate the drive member 2718 (via the coupler 2717) to facilitate extension or retraction of the driven member 2720. During rotation of the input 2719 with the tool, the sleeve 2725 and the rear interface portion 2709 of the housing 2722 can remain interlocked to prevent slippage between the torque amplifier assembly 2711 and the housing 2722. The input 2719 and the output 2723 can be rotatably coupled with each other via a transmission (not shown) that defines a gear ratio between the input 2719 and the output 2723 that reduces the amount of rotational torque that would otherwise be required to rotate the drive member 2718 directly (e.g., a reduction gear set).

Figure 64:
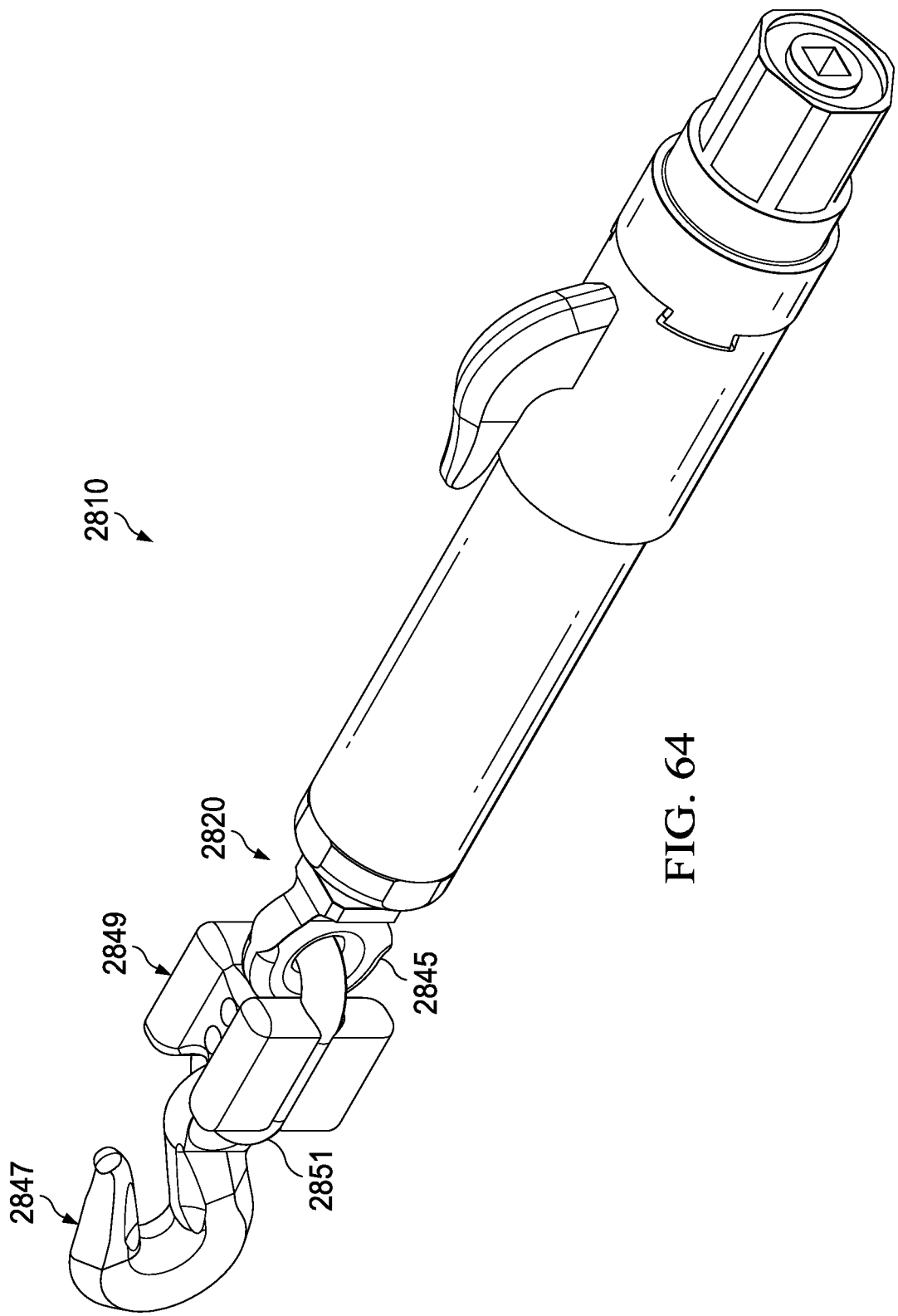
FIG. 64 is an isometric view depicting a tensioning device, in accordance with still yet another embodiment.
Figure 65:
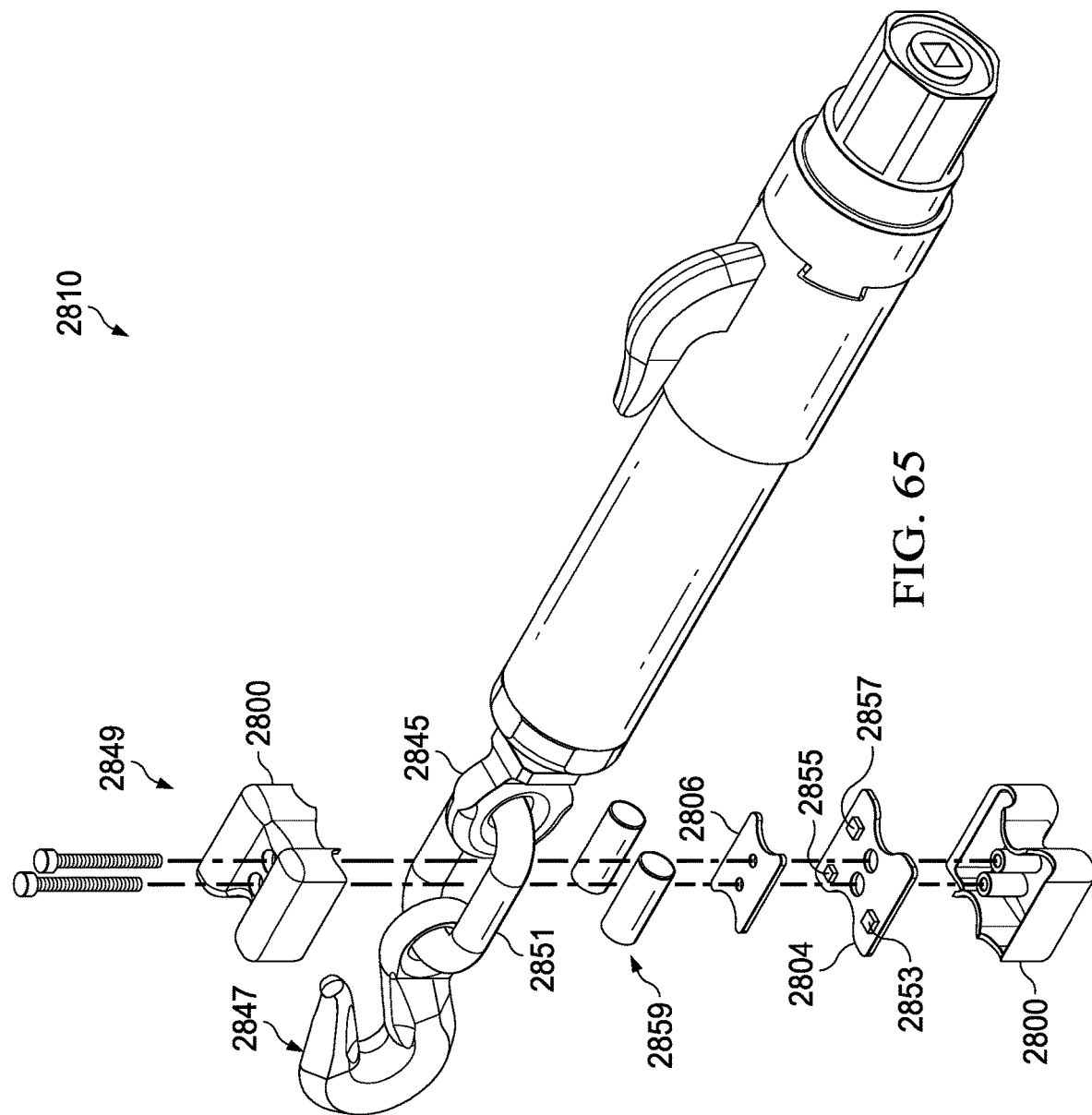
FIG. 65 is a partially exploded isometric view of the tensioning device of FIG. 64.

An alternative embodiment of a tensioning device 2810 is illustrated in FIGS. 64 and 65 and can be similar to, or the same in many respects as, the tensioning device 2710 illustrated in FIGS. 61-63, respectively. For example, the tensioning device 2810 can comprise a ring member 2845, a hook 2847, and a link 2851 that couples the hook 2847 to the ring member 2845. The tensioning device 2810 can include a tension sensor 2849 that is coupled with the link 2851 and is configured to facilitate detection of tension applied to a lashing member coupled to the tensioning device 2810 (via the link 2851). The tension sensor 2849 can be similar to, or the same in many respects as, the tension sensors 2149, 2249, 2349 illustrated in FIGS. 41-45, 46-48, and 49-51, respectively. For example, as illustrated in FIG. 65, the tension sensor 2849 can comprise a PCB board 2804 that includes a sensing device 2853, a wireless communication module 2855, a microcontroller 2857 (e.g., a control module), and a power supply 2859 (e.g., batteries). A guide plate 2806 can be disposed within the link 2851 and can be associated with the PCB board 2804. The tension sensor 2849 can include a pair of covers 2800 that can be provided over the tension sensor 2849 to protect the tension sensor 2849 from environmental conditions (e.g., moisture, precipitation, or inadvertent contact). The sensing device 2853 can be configured to detect the tension on the lashing member as a function of strain (or other forces) imparted to the guide plate 2806 from the link 2851.

Figure 66:
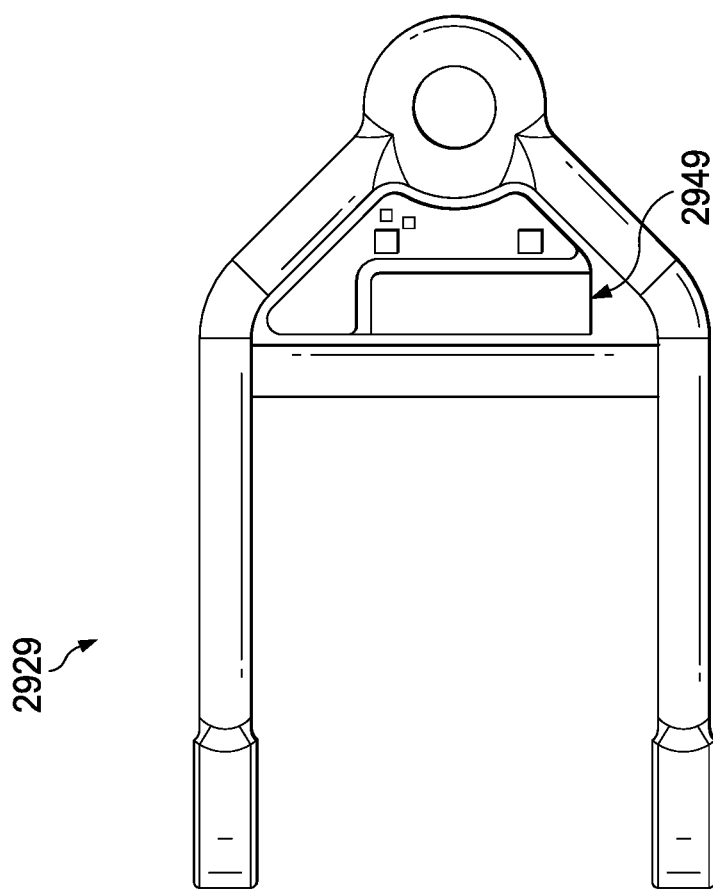
FIG. 66 is a top plan view of a saddle member, in accordance with one embodiment.

An alternative embodiment of a saddle member 2929 is illustrated in FIG. 66 and can be similar to, or the same in many respects as, the saddle members (e.g., 2429) illustrated in FIGS. 52-60. The saddle member 2929 can include a tension sensor 2949 that facilitates detection of tension applied to a lashing member coupled to a tensioning device. The tension sensor 2849 can be similar to, or the same in many respects as, the tension sensors 2149, 2249, 2349, 2849 illustrated in FIGS. 41-45, 46-48, 49-51, and 64-65, respectively.

Figure 67:
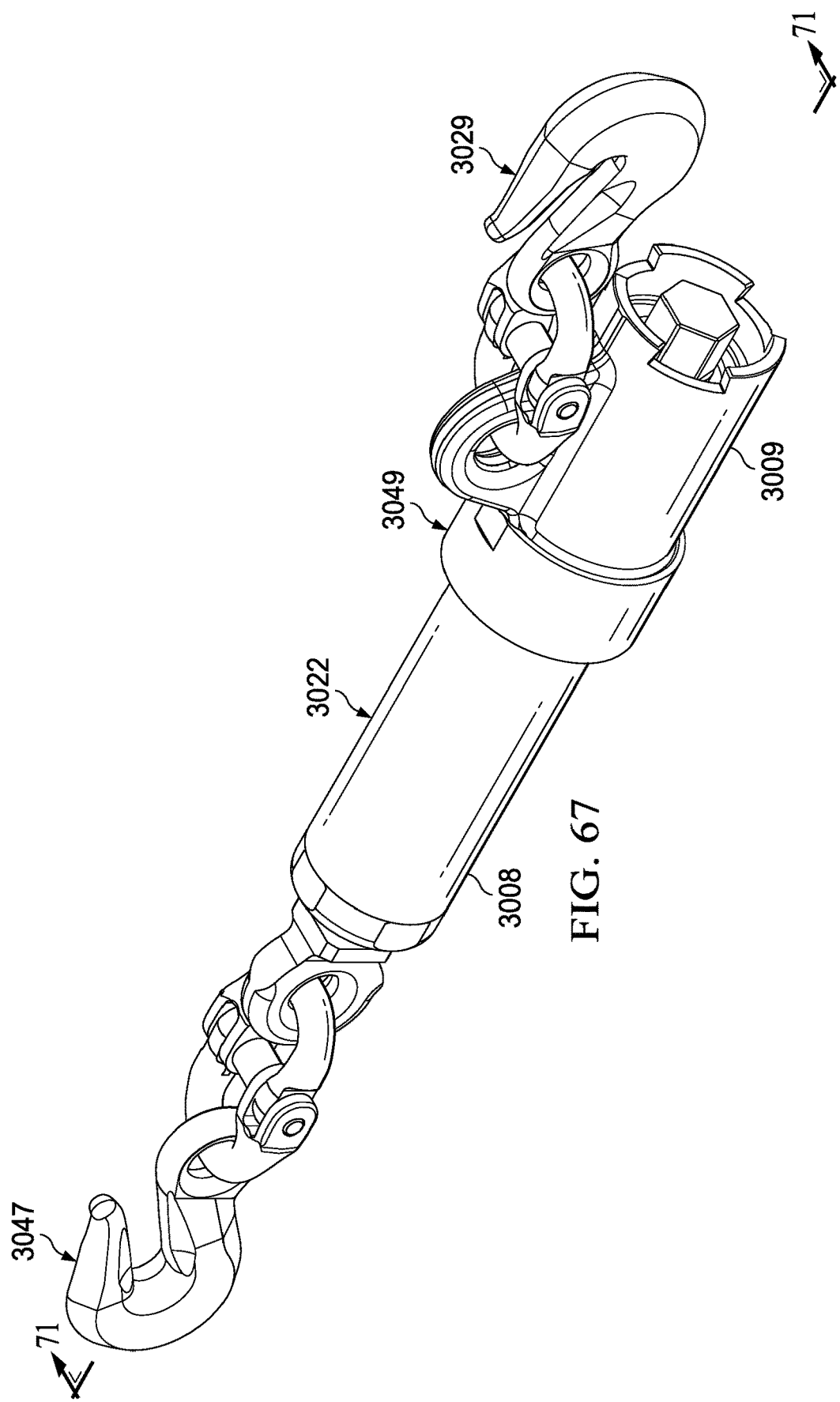
FIG. 67 is an isometric view depicting a tensioning device, in accordance with still yet another embodiment.
Figure 68:
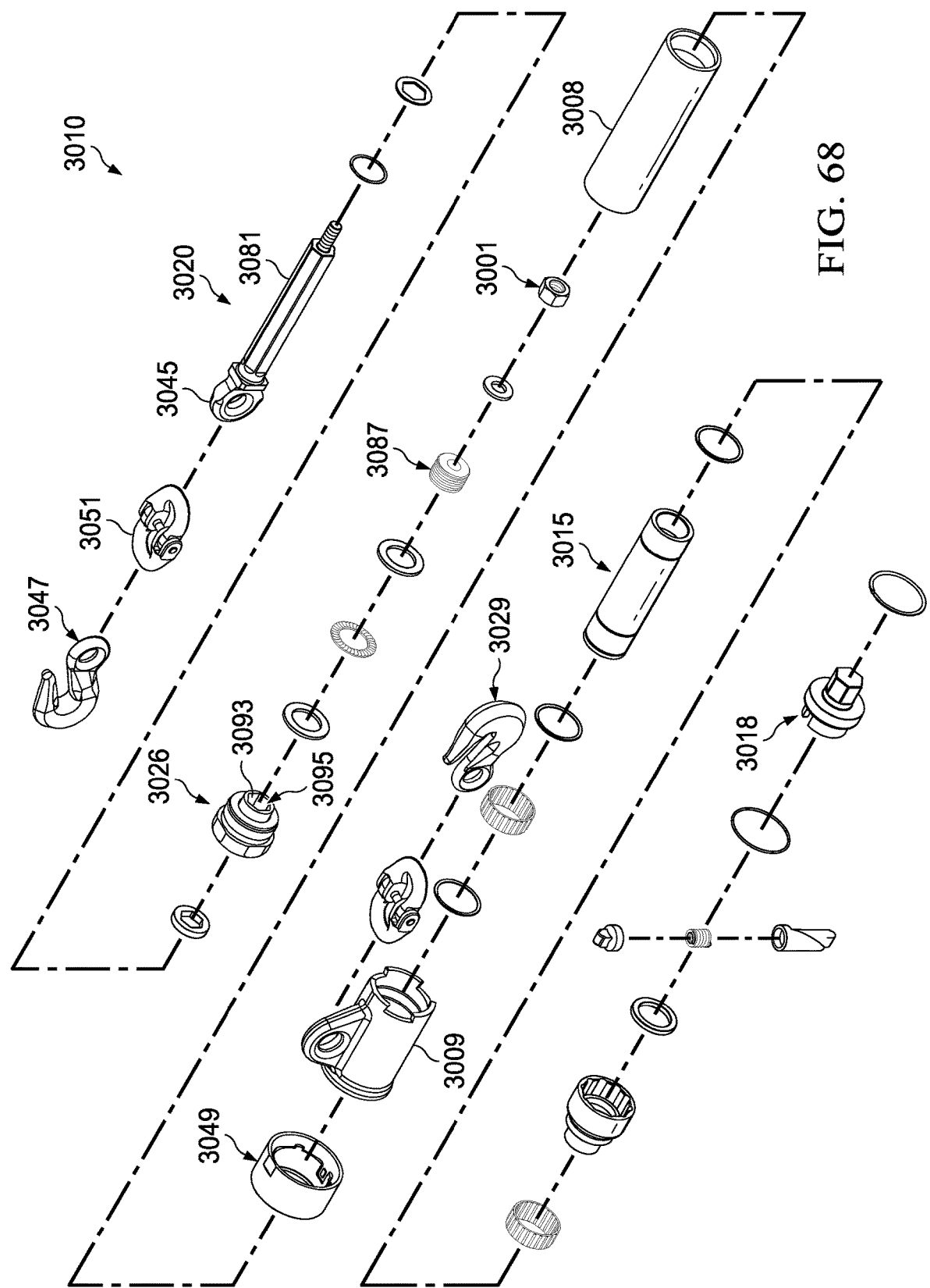
FIG. 68 is an exploded isometric view of the tensioning device of FIG. 67.

An alternative embodiment of a tensioning device 3010 is illustrated in FIGS. 67-71 and can be similar to, or the same in many respects as, the tensioning device 2710 illustrated in FIGS. 61-63. For example, as illustrated in FIGS. 67 and 68, the tensioning device 3010 can include a housing 3022, an inner sleeve 3015, a drive member 3018 operably coupled with the inner sleeve 3015, a driven member 3020, a cap 3026, and a tension sensor 3049 coupled with the housing 3022. The housing 3022 can include a main body 3008 and a rear interface portion 3009 that is coupled with the main body 3008 (e.g., threadably coupled or welded thereto). The tension sensor 3049 can be coupled with the housing 3022 and can surround at least a portion of each of the main body 3008 and the rear interface portion 3009. A hook 3029 can be coupled with the rear interface portion 3009. The driven member 3020 can include a body 3081 and a ring member 3045. A hook 3047 can be coupled with the ring member 3045 via a link 3051. A threaded collar 3087 can be coupled with a body 3081 of the driven member 3020. The cap 3026 can include a guide member 3093 that defines a passageway 3095. The tensioning device 3010 can include a nut 3001 that facilitates releasable coupling of the body 3081 of the driven member 3020 with the threaded collar 3087.

Figure 69:
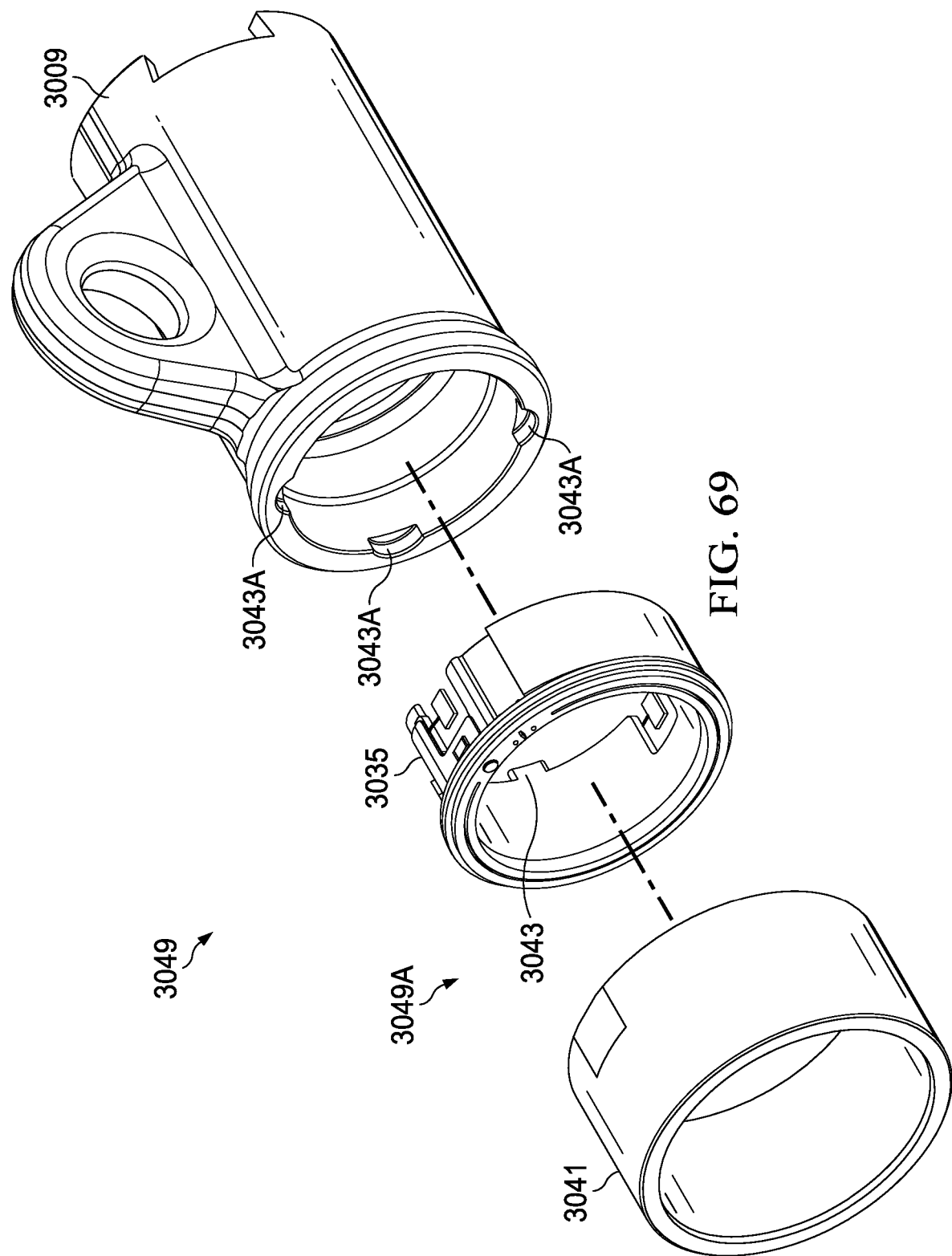
FIG. 69 is an exploded isometric view of a tension sensor and a rear interface portion of the tensioning device of FIG. 68.

Referring now to FIG. 69, the tension sensor 3049 can comprise an annular housing 3049A that at least partially surrounds the housing 3022 and includes an inner annular sleeve 3035 and an outer annular sleeve 3041 that at least partially surrounds the inner annular sleeve 3035. The inner annular sleeve 3035 can include a plurality of tabs 3043 (one shown) and the rear interface portion 3009 can define a plurality of notches 3043A that are each substantially aligned with one of the tabs 3043. The inner annular sleeve 3035 can be inserted into the rear interface portion 3009 to facilitate coupling therebetween. When the inner annular sleeve 3035 is inserted into the rear interface portion 3009, each of the tabs 3043 can interface with respective ones of the notches 3043A to ensure proper alignment of the tension sensor 3049 on the rear interface portion 3009 as well as to prevent rotation of the tension sensor 3049 with respect to the rear interface portion 3009. The outer annular sleeve 3041 can be installed over the inner annular sleeve 3035 and can be coupled to the rear interface portion 3009 via welding, adhesive, a frictional fit, or any of a variety of suitable alternative methods. In one embodiment, the tension sensor 3049 can be assembled onto the housing 3022 during manufacturing of the tensioning device 3010. In another embodiment, the tension sensor 3049 can be retrofit onto an existing tensioning device (e.g., 3010) that does not have tension detection capability.

Figure 70:
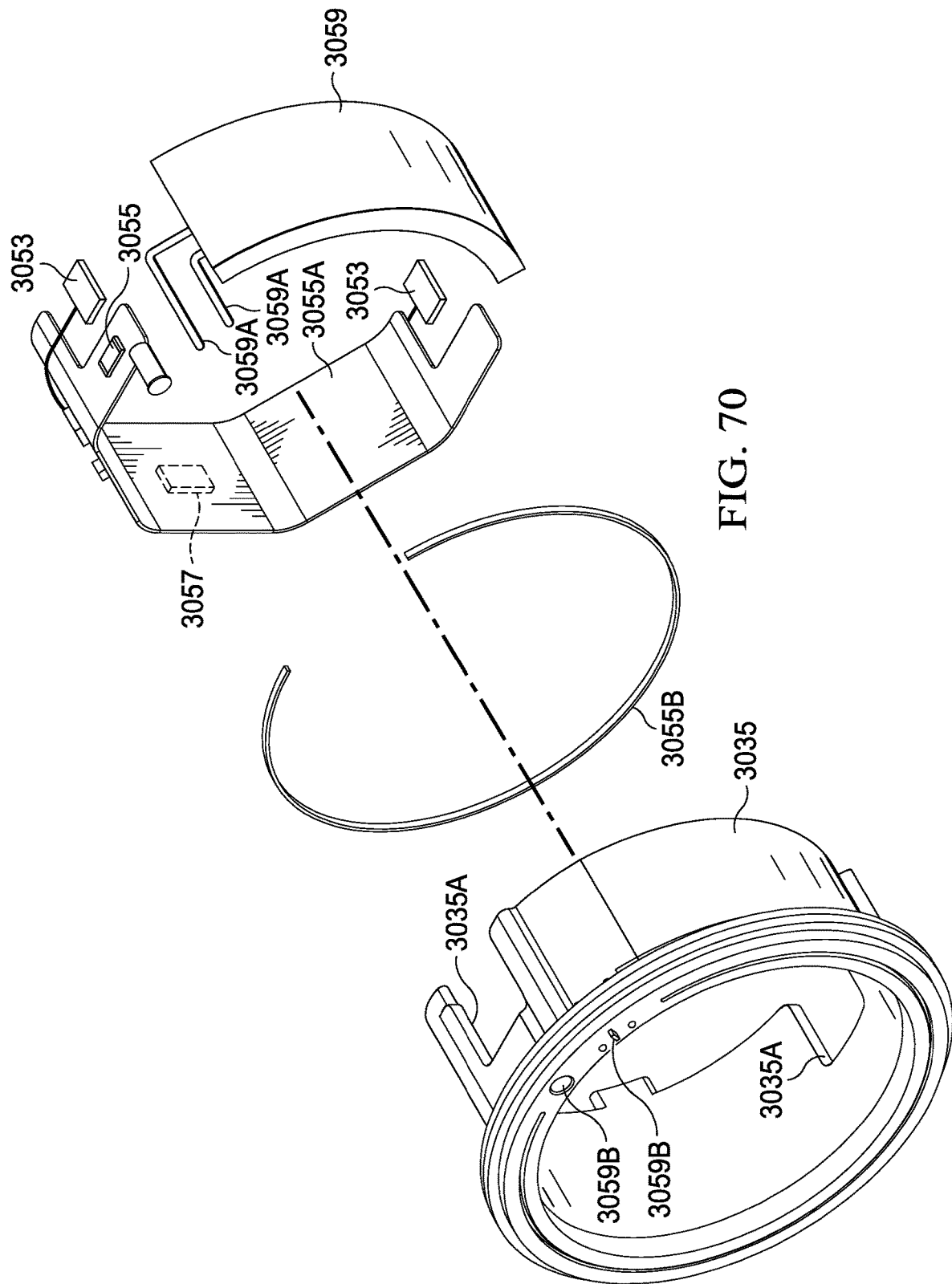
FIG. 70 is an exploded isometric view of the tension sensor of FIG. 69.

Referring now to FIG. 70, the tension sensor 3049 can comprise a pair of sensing devices 3053, a wireless communication module 3055, a control module 3057, and a power supply module 3059 (e.g., a battery). The wireless communication module 3055 and the control module 3057 can be mounted on a printed circuit board 3055A. The printed circuit board 3055A and the power supply module 3059 can be provided on opposite sides of the inner annular sleeve 3035 and can be contoured to match the shape of the inner annular sleeve 3035 to allow the outer annular sleeve 3041 to fit over the printed circuit board 3055A and the power supply module 3059 such that the wireless communication module 3055, the control module 3057, and the power supply module 3059 are disposed between the inner annular sleeve 3035 and the outer annular sleeve 3041.

The inner annular sleeve 3035 can define a pair of notches 3035A and each of the sensing devices 3053 can be disposed in respective ones of the notches 3035A (see FIG. 69). The notches 3035A can be disposed on opposite sides of the inner annular sleeve 3035 such that the sensing devices 3053 are circumferentially opposite one another (e.g., about 180 degrees from each other). A pair of charging pins 3059A can be electrically coupled with the power supply module 3059 and can facilitate charging of the power supply module 3059 with an external power source (not shown). The charging pins 3059A can extend through a pair of holes 3059B defined by the inner annular sleeve 3035 and to an exterior of the inner annular sleeve 3035 to serve as a charging port for the power supply module 3059.

Still referring to FIG. 70, the tension sensor 3049 can include an antenna 3055B that is communicatively coupled with the wireless communication module 3055 and facilitates wireless communication therewith. The antenna 3055B can be substantially annular shaped and thus contoured to substantially match the shape of the inner annular sleeve 3035. In one embodiment, the antenna 3055B can be disposed between the inner annular sleeve 3035 and the outer annular sleeve 3041 and concealed thus from view. It is to be appreciated however than any of a variety of suitable alternative antenna arrangements and/or locations are contemplated.

Figure 71:
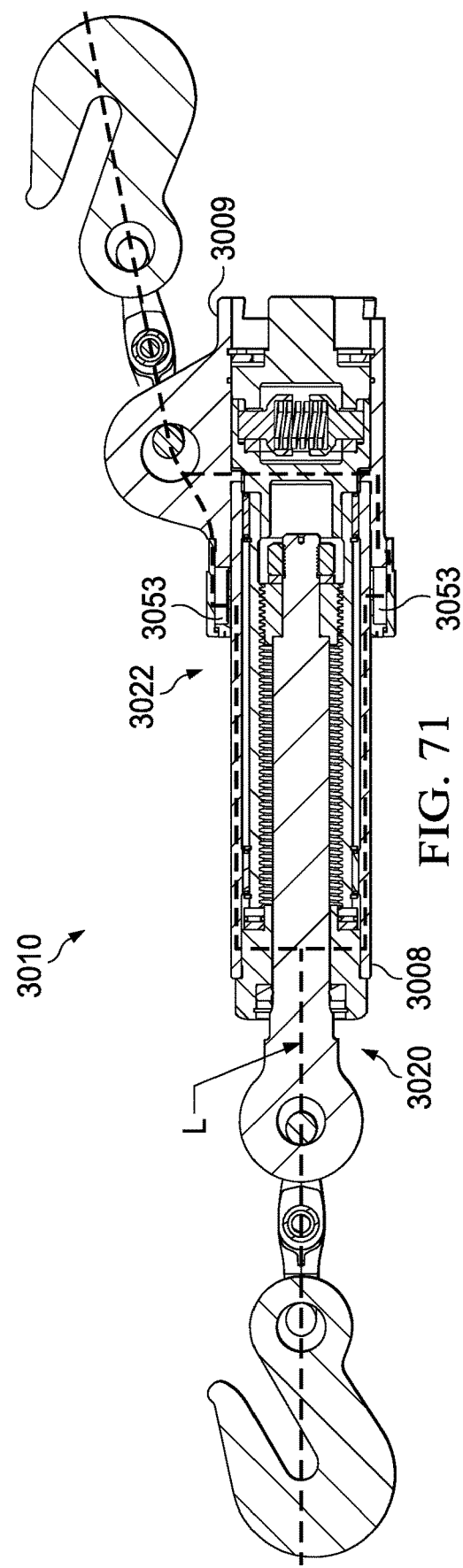
FIG. 71 is a cross sectional view of the tensioning device taken along the line 71-71 of FIG. 67.

Referring now to FIG. 71, the driven member 3020 and the housing 3022 can cooperate to define a load path L through at least part of the tensioning device 3010. The sensing devices 3053 can be located along the load path L and configured to detect the tension applied by the tensioning device 3010 as a function of a loading force transmitted along the load path L. In one embodiment, the sensing devices 3053 can comprise strain gages that are configured to detect the tension on the tensioning device 3010 as a function of strain (e.g., a loading force) on the main body 3008. In such an embodiment, the sensing devices 3053 can be attached directly to the main body 3008 (e.g., with an adhesive), adjacent to the interface between the main body 3008 and the rear interface portion 3009. When the tensioning device 3010 is placed under tension, the resulting strain on the main body 3008 is transmitted through the sensing devices 3053. The strain detected by the sensing devices 3053 can be correlated to a tension (e.g., by the control module 3057) and then transmitted to a local display and/or a remote computing device for use in metering, alarming (e.g., when the tension exceeds a predefined threshold), or any of a variety of other suitable purposes. It is to be appreciated that although two sensing devices (e.g., 3053) are described, the tension sensor 3049 can have any quantity of sensing devices (e.g., one or more than two). However, the use of two or more sensing devices (e.g., 3053) that are distributed along the circumference of the housing 3022 (as illustrated in FIGS. 67-71) can provide a more precise measurement and detection of the tension on the tensioning device 3010.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather, it is hereby intended that the scope be defined by the claims appended hereto. Also, for any methods claimed and/or described, regardless of whether the method is described in conjunction with a flow diagram, it should be understood that unless otherwise specified or required by context, any explicit or implicit ordering of steps performed in the execution of a method does not imply that those steps must be performed in the order presented and may be performed in a different order or in parallel.

What is claimed is:

1. A tensioning device comprising:
   a housing;
   a first attachment feature coupled with the housing;
   a sleeve that is rotatably coupled with the housing;
   a drive member rotatably coupled with the housing and operably coupled with the sleeve such that rotation of the drive member facilitates rotation of the sleeve;
   a driven member movably coupled with the sleeve and comprising a second attachment feature; and
   a guide member coupled with the housing and mated with the driven member to prevent rotation of the driven member when the sleeve is rotated, wherein:
   rotation of the sleeve relative to the driven member facilitates linear movement of the driven member relative to the sleeve between an extended position and a retracted position along a centerline; and
   the first attachment feature is pivotally coupled with the housing, and the second attachment feature and the driven member are formed together as a one-piece construction.

2. The tensioning device of claim 1 wherein the guide member defines a passageway and the driven member extends through the passageway to facilitate mating therebetween.

3. A tensioning device comprising:
   a housing;
   a first attachment feature coupled with the housing;
   a sleeve that is rotatably coupled with the housing;
   a drive member rotatably coupled with the housing and operably coupled with the sleeve such that rotation of the drive member facilitates rotation of the sleeve;
   a driven member movably coupled with the sleeve and comprising a second attachment feature;
   a guide member coupled with the housing and mated with the driven member to prevent rotation of the driven member when the sleeve is rotated; and
   a cap that includes the guide member, the cap being coupled with an end of the housing, wherein:
   rotation of the sleeve relative to the driven member facilitates linear movement of the driven member relative to the sleeve between an extended position and a retracted position along a centerline; and
   the guide member defines a passageway and the driven member extends through the passageway to facilitate mating therebetween.

4. The tensioning device of claim 3 further comprising a clutch assembly that facilitates selective coupling between the drive member and the sleeve.

5. The tensioning device of claim 3 further comprising a pair of bearings, each bearing of the pair of bearings being interposed between the housing and the sleeve to journal the sleeve relative to the housing.

6. A tensioning device comprising:
a housing;
a first attachment feature coupled with the housing;
a sleeve that is rotatably coupled with the housing;
a drive member rotatably coupled with the housing and operably coupled with the sleeve such that rotation of the drive member facilitates rotation of the sleeve;
a driven member movably coupled with the sleeve and comprising a second attachment feature; and
a guide member coupled with the housing and mated with the driven member to prevent rotation of the driven member when the sleeve is rotated; wherein:
the guide member defines a passageway and the driven member extends through the passageway to facilitate mating therebetween; and
each of the passageway and the driven member have substantially matching non-circular cross-sectional shapes taken at a cross-section that is orthogonal to the centerline.

7. The tensioning device of claim 6 wherein the non-circular cross-sectional shape of each of the passageway and the driven member comprises a polygonal cross-sectional shape.

8. The tensioning device of claim 7 wherein the polygonal shape of each of the passageway and the driven member comprises a hexagonal cross-sectional shape.

9. A tensioning device comprising:
a housing;
a first attachment feature coupled with the housing;
a sleeve that is rotatably coupled with the housing;
a drive member rotatably coupled with the housing and operably coupled with the sleeve such that rotation of the drive member facilitates rotation of the sleeve;
a driven member movably coupled with the sleeve and comprising a second attachment feature; and
a guide member coupled with the housing and mated with the driven member to prevent rotation of the driven member when the sleeve is rotated, wherein:
rotation of the sleeve relative to the driven member facilitates linear movement of the driven member relative to the sleeve between an extended position and a retracted position along a centerline; and
the guide member entirely surrounds the driven member.

10. A tensioning device comprising:
a housing;
a first attachment feature coupled with the housing;
a sleeve that is rotatably coupled with the housing;
a drive member rotatably coupled with the housing and operably coupled with the sleeve such that rotation of the drive member facilitates rotation of the sleeve;
a driven member movably coupled with the sleeve and comprising a second attachment feature;
a threaded collar coupled with a proximal end of the driven member and interposed between the sleeve and the driven member, the threaded collar being threadably coupled with the sleeve such that rotation of the sleeve facilitates translation of the driven member between an extended position and a retracted position; and
a guide member coupled with the housing and mated with the driven member to prevent rotation of the driven member during translation of the driven member between the extended position and the retracted position along a centerline.

11. The tensioning device of claim 10 further comprising a clutch assembly that facilitates selective coupling between the drive member and the sleeve.

12. The tensioning device of claim 10 wherein the first attachment feature is pivotally coupled with the housing, and the second attachment feature and the driven member are formed together as a one-piece construction.

13. The tensioning device of claim 10 wherein the guide member defines a passageway and the driven member extends through the passageway to facilitate mating therebetween.

14. The tensioning device of claim 13 further comprising a cap that includes the guide member, the cap being coupled with an end of the housing.

15. The tensioning device of claim 13 wherein each of the passageway and the driven member have substantially matching non-circular cross-sectional shapes taken at a cross-section that is orthogonal to the centerline.

16. The tensioning device of claim 15 wherein the non-circular cross-sectional shape of each of the passageway and the driven member comprises a polygonal cross-sectional shape.

17. The tensioning device of claim 16 wherein the polygonal shape of each of the passageway and the driven member comprises a hexagonal cross-sectional shape.

18. The tensioning device of claim 10 further comprising a pair of bearings, each bearing of the pair of bearings being interposed between the housing and the sleeve to journal the sleeve relative to the housing.

* * * * *